(12) United States Patent
Gong et al.

(10) Patent No.: US 12,095,694 B2
(45) Date of Patent: *Sep. 17, 2024

(54) SEQUENCE DETERMINING METHOD AND APPARATUS

(71) Applicant: HUAWEI TECHNOLOGIES CO., LTD., Guangdong (CN)

(72) Inventors: Mingxin Gong, Beijing (CN); Hao Sun, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,572

(22) Filed: Oct. 16, 2023

(65) Prior Publication Data

US 2024/0063966 A1 Feb. 22, 2024

Related U.S. Application Data

(63) Continuation of application No. 18/183,742, filed on Mar. 14, 2023, now Pat. No. 11,902,200, which is a
(Continued)

(30) Foreign Application Priority Data

| Nov. 26, 2017 | (CN) | 201711199378.9 |
| Nov. 29, 2017 | (CN) | 201711228826.3 |

(Continued)

(51) Int. Cl.
*H04W 72/21* (2023.01)
*H04J 11/00* (2006.01)
(Continued)

(52) U.S. Cl.
CPC .......... *H04L 5/0048* (2013.01); *H04J 11/005* (2013.01); *H04J 13/10* (2013.01); *H04L 5/0007* (2013.01); *H04W 72/21* (2023.01)

(58) Field of Classification Search
CPC .............. H04L 5/0048; H04L 5/0007; H04W 72/0413; H04J 13/10; H04J 11/005
See application file for complete search history.

(56) References Cited

U.S. PATENT DOCUMENTS 10,911,285 B2 * 2/2021 Liu .................. H04L 5/0044
11,032,050 B2 6/2021 Zhang
(Continued)

FOREIGN PATENT DOCUMENTS

| CA | 2773382 | 3/2011 |
| CN | 101179819 | 5/2008 |

(Continued)

OTHER PUBLICATIONS

3GPP TS 36.211 V14.4.0, "3rd Generation Partnership Project; Technical Specification Group Radio Access Network; Evolved Universal Terrestrial Radio Access (E-UTRA); Physical Channels and Modulation (Release 14)," Sep. 2017, 197 pages.
(Continued)

*Primary Examiner* — Syed Ali
(74) *Attorney, Agent, or Firm* — Fish & Richardson P.C.

(57) ABSTRACT

Embodiments of the present disclosure provide, among other implementations, sequence determining methods. One example method includes: determining an index v of a sequence group, where the sequence group comprises a sequence $\{x_n\}$ and a sequence $\{y_m\}$; generating a second sequence based on the index v of the sequence group, where the second sequence is at least one of a second sequence $\{f_n\}$
(Continued)

or a second sequence $\{g_m\}$; and transmitting uplink control information or a reference signal based on the second sequence.

20 Claims, 5 Drawing Sheets

Related U.S. Application Data continuation of application No. 17/227,077, filed on Apr. 9, 2021, now Pat. No. 11,646,843, which is a continuation of application No. 16/566,207, filed on Sep. 10, 2019, now Pat. No. 10,979,188, which is a continuation of application No. 16/352,475, filed on Mar. 13, 2019, now Pat. No. 10,439,779, which is a continuation of application No. PCT/CN2018/096897, filed on Jul. 24, 2018.

(30) Foreign Application Priority Data

Dec. 29, 2017 (CN) .......................... 201711487326.1
Feb. 13, 2018 (CN) .......................... 201810150435.2

(51) Int. Cl.
*H04J 13/10* (2011.01)
*H04L 5/00* (2006.01)

(56) References Cited

U.S. PATENT DOCUMENTS

| | | | |
|---|---|---|---|
| 11,251,924 | B2 | 2/2022 | Yi |
| 2009/0186625 | A1 | 7/2009 | Qu et al. |
| 2010/0098012 | A1 | 4/2010 | Bala et al. |
| 2013/0072241 | A1 | 3/2013 | Sorrentino |
| 2013/0083751 | A1 | 4/2013 | Papasakellariou |
| 2013/0195041 | A1 | 8/2013 | Papasakellariou et al. |
| 2013/0258978 | A1 | 10/2013 | Aiba et al. |
| 2014/0204885 | A1 | 7/2014 | Qu et al. |
| 2014/0372825 | A1 | 12/2014 | Jeong et al. |
| 2015/0131586 | A1 | 5/2015 | Noh et al. |
| 2015/0289292 | A1 | 10/2015 | Sun et al. |
| 2015/0327232 | A1 | 11/2015 | Chang et al. |
| 2016/0182199 | A1 | 6/2016 | Webb et al. |
| 2016/0295561 | A1 | 10/2016 | Papasakellariou |
| 2016/0337157 | A1 | 11/2016 | Papasakellariou |
| 2017/0187499 | A1 | 6/2017 | Hwang et al. |
| 2017/0238344 | A1 | 8/2017 | McGowan et al. |
| 2017/0367084 | A1 | 12/2017 | Cheng et al. |
| 2017/0374658 | A1 | 12/2017 | Kim et al. |
| 2018/0124790 | A1 | 5/2018 | Yerramalli |
| 2018/0124815 | A1 | 5/2018 | Papasakellariou |
| 2018/0255586 | A1* | 9/2018 | Einhaus .................... H04L 5/00 |
| 2018/0287761 | A1* | 10/2018 | You ...................... H04L 5/0053 |
| 2019/0007175 | A1 | 1/2019 | Kwak et al. |
| 2019/0007248 | A1 | 1/2019 | Takeda et al. |
| 2019/0081838 | A1 | 3/2019 | Qu et al. |
| 2019/0200298 | A1 | 6/2019 | Park et al. |
| 2019/0260624 | A1 | 8/2019 | Park et al. |
| 2019/0274168 | A1 | 9/2019 | Hwang |
| 2019/0274169 | A1 | 9/2019 | Tsai et al. |
| 2019/0349163 | A1 | 11/2019 | Shao et al. |
| 2020/0052939 | A1 | 2/2020 | Xiong et al. |
| 2020/0092062 | A1* | 3/2020 | Yum ...................... H04W 72/23 |
| 2020/0153588 | A1 | 5/2020 | Hwang et al. |
| 2020/0177201 | A1 | 6/2020 | Chen et al. |
| 2020/0245200 | A1 | 7/2020 | Xiong et al. |
| 2021/0105091 | A1* | 4/2021 | Lomayev .............. H04L 5/0048 |
| 2021/0152316 | A1 | 5/2021 | Kwak et al. |
| 2021/0185706 | A1 | 6/2021 | Park et al. |
| 2021/0195532 | A1 | 6/2021 | Ouchi et al. |
| 2021/0281374 | A1 | 9/2021 | Kim et al. |
| 2021/0337597 | A1 | 10/2021 | Yoshimura et al. |
| 2024/0154846 | A1* | 5/2024 | Yoon ..................... H04L 5/0051 |

FOREIGN PATENT DOCUMENTS

| | | |
|---|---|---|
| CN | 102017462 A | 4/2011 |
| CN | 102598537 | 7/2012 |
| CN | 102696193 | 9/2012 |
| CN | 103139916 | 6/2013 |
| CN | 103907298 | 7/2014 |
| CN | 105684324 | 6/2016 |
| CN | 103430615 B | 11/2016 |
| CN | 106105085 | 11/2016 |
| CN | 106465411 | 2/2017 |
| CN | 107370701 A | 11/2017 |
| CN | 107395314 | 11/2017 |
| CN | 110089094 | 8/2019 |
| EP | 2068455 | 6/2009 |
| IN | 2750 | 8/2009 |
| JP | 2021502764 | 1/2021 |
| WO | 2013023148 | 2/2013 |
| WO | 2015005739 A1 | 1/2015 |
| WO | 2017137731 | 8/2017 |

OTHER PUBLICATIONS

3GPP TS 38.211 V1 .2.0 (Nov. 2017); "3rd Generation Partnership Project; Technical Specification Group Radio Access Network; NR; Physical channels and modulation (Release 15)," 59 pages.
Extended European Search Report issued in European Application No. 18882146.6 on Jan. 21, 2020, 7 pages.
Huawei et al., "Design of DL/UL DMRS for Data Transmission," 3GPP TSG RAN WG1 Meeting #91, R1-1719444, Reno, USA, Nov. 27-Dec. 1, 2017, 15 pages.
Huawei, HiSilicon,"Design of UL DMRS sequence for data transmission",3GPP TSG RAN WG1 Meeting #91, R1-1720635, Reno, USA, Nov. 27-Dec. 1, 2017, 11 pages.
Intel Corporation, "Further discussion on SRS for NR," 3GPP TSG RAN WG1 NR Ad-Hoc meeting, R1-1700356, Spokane, USA, Jan. 16-20, 2017, 10 pages.
International Search Report and Written Opinion issued in International Application No. PCT/CN2018/096897 on Oct. 18, 2018, 5 pages.
Mitsubishi Electric, "Views on SRS designs," 3GPP TSG RAN WG1#91, R1-1719519, USA, Nov. 27-Dec. 1, 2017, 9 pages.
Office Action in Chinese Appln. No. 10-2020-7018263, dated Jan. 5, 2023, 10 pages (with English translation).
Office Action issued in Chinese Application No. 201880002134.3 on Dec. 9, 2019, 8 pages (with English translation).
Office Action issued in Chinese Application No. 202011101932.7 on Jan. 10, 2022, 4 pages.
Office Action issued in Chinese Application No. 202011101932.7 on May 25, 2021, 12 pages (with English translation).
Office Action issued in Chinese Application No. 202011102157.7 on May 24, 2021, 10 pages (with English translation).
Office Action issued in Indian Application No. 202037023726 on Jun. 25, 2021, 5 pages.
Office Action issued in Japanese Application No. 2020-528880 on Sep. 6, 2021, 25 pages (with English translation).
Search Report issued in Chinese Application No. 201880002134.3 on Nov. 29, 2019, 2 pages.
Shao Daojiong, "Research and DSP Implementation of Reference Signal Technology in TD-LTE Uplink," University of Electronic Science and Technology of China, Master Dissertation, Dec. 31, 2011, 87 pages (with English abstract).
ZTE, Sanechips, "On short PUCCH for up to 2 bits UCI," 3GPP TSG RAN WG1 meeting 91, R1-1719672, USA, Nov. 27-Dec. 1, 2017, 12 pages.

* cited by examiner

SEQUENCE DETERMINING METHOD AND APPARATUS

CROSS-REFERENCE TO RELATED APPLICATIONS

This application is a continuation of U.S. patent application Ser. No. 18/183,742, filed on Mar. 14, 2023, which is a continuation of U.S. patent application Ser. No. 17/227,077, filed on Apr. 9, 2021, now U.S. Pat. No. 11,646,843, which is a continuation of U.S. patent application Ser. No. 16/566,207, filed on Sep. 10, 2019, now U.S. Pat. No. 10,979,188, which is a continuation of U.S. patent application Ser. No. 16/352,475, filed on Mar. 13, 2019, now U.S. Pat. No. 10,439,779, which is a continuation of International Application No. PCT/CN2018/096897, filed on Jul. 24, 2018, which claims priority to Chinese Patent Application No. 201711199378.9, filed on Nov. 26, 2017, Chinese Patent Application No. 201711228826.3, filed on Nov. 29, 2017, Chinese Patent Application No. 201711487326.1, filed on Dec. 29, 2017, and Chinese Patent Application No. 201810150435.2, filed on Feb. 13, 2018. All of aforementioned applications are incorporated herein by reference in their entireties.

TECHNICAL FIELD

Embodiments of the present invention relate to the communication field, and more specifically, to a sequence determining method and apparatus.

BACKGROUND

In a Long Term Evolution (LTE) system, uplink control information (UCI) is sent by using a physical uplink control channel (PUCCH). One PUCCH occupies a plurality of orthogonal frequency division multiplexing (OFDM) or discrete Fourier transform-spread-orthogonal frequency division multiplexing (DFT-s-OFDM) symbols in one slot.

In the LTE system, to improve coverage performance of the PUCCH, a demodulation reference signal (DMRS) of the PUCCH is generated based on a Zadoff-Chu (ZC) sequence. For a given length, the LTE system includes a plurality of sequences. Inter-cell interference may be reduced to some extent when terminal devices of different cells use different sequences with a same length at the same time. However, if two terminal devices in neighboring cells send, on a same time-frequency resource, signals generated based on sequences of different lengths, a signal generated based on a relatively long sequence may cause relatively large interference to a signal generated based on a relatively short sequence, and in this case, how to reduce inter-cell interference needs to be further considered. A concept of a sequence group is introduced to the LTE system. Each sequence group includes sequences of different lengths, and there is relatively high cross-correlation between sequences in a same group.

In the LTE system, an index v of the sequence group is calculated according to a predefined rule, where $v \in \{0, 1, \ldots, 29\}$. When a length of a DMRS sequence is greater than or equal to 36, q is determined based on the index v of the sequence group and the following formula:

$$q = \lfloor \bar{q} + 1/2 \rfloor + h \cdot (-1)^{\lfloor 2\bar{q} \rfloor}$$

$$\bar{q} = N_{ZC} \cdot (v+1)/31$$

where h is equal to 0 or h is equal to 0 and 1, and $N_{ZC}$ is a largest prime number smaller than the length of the DMRS sequence.

Further, a ZC sequence $\{k_q\}$ is determined based on the following formula:

$$k_q(i) = e^{-j\frac{\pi q i (i+1)}{N_{ZC}}},$$

where $0 \leq i \leq N_{ZC} - 1$.

When the length of the DMRS sequence is greater than or equal to 36, a base sequence $\{\bar{r}_n\}$ of the DMRS sequence is determined based on the following formula:

$$\bar{r}(n) = x_q(n \bmod N_{ZC}), 0 \leq n < M,$$

where M indicates the length of the DMRS sequence.

A reference signal sequence (such as a DMRS sequence) is defined as a cyclic shift sequence of the base sequence.

As such, inter-cell interference can be reduced to some extent when at least two terminal devices in neighboring cells use sequences in different sequence groups at the same time.

In a New Radio (NR) system, demodulation reference signals (DMRS) of PUCCHs in different formats are also generated based on sequences. On all OFDM/DFT-s-OFDM symbols for transmitting the DMRS, the DMRS is generated based on a computer generated sequence (CGS) or a Zadoff-Chu (ZC) sequence. However, currently there is no solution for reducing inter-cell interference in the NR system.

SUMMARY

Embodiments of the present invention provide a sequence determining method and apparatus.

According to a first aspect, a sequence determining method is provided. In this method, a wireless apparatus determines a first sequence or an index of the first sequence in a sequence group based on an index of the sequence group, where the sequence group includes a sequence $\{x_n\}$ and a sequence $\{y_m\}$. The wireless apparatus generates a second sequence based on the first sequence or generates a second sequence based on the index of the first sequence, where if the first sequence is the sequence $\{x_n\}$, the second sequence is a sequence $\{f_n\}$, or if the first sequence is the sequence $\{y_m\}$, the second sequence is a sequence $\{g_m\}$.

According to a second aspect, a sequence determining wireless apparatus is provided, including a processor and a memory coupled to the processor.

The processor is configured to determine a first sequence or an index of the first sequence in a sequence group based on an index of the sequence group, where the sequence group includes a sequence $\{x_n\}$ and a sequence $\{y_m\}$; and the processor is configured to generate a second sequence based on the first sequence or generate a second sequence based on the index of the first sequence, where if the first sequence is the sequence $\{x_n\}$, the second sequence is a sequence $\{f_n\}$, or if the first sequence is the sequence $\{y_m\}$, the second sequence is a sequence $\{g_m\}$.

According to a third aspect, a sequence determining method is provided. In this method, a wireless apparatus determines a sequence index based on an index of a sequence group. Further, the wireless apparatus generates a second sequence based on the sequence index. The sequence group includes a sequence $\{x_n\}$ and a sequence $\{y_m\}$, and the second sequence is a sequence $\{f_n\}$ or the second sequence is a sequence $\{g_m\}$.

According to a fourth aspect, a sequence determining wireless apparatus is provided, including a processor and a memory coupled to the processor.

The processor is configured to determine a sequence index based on an index of a sequence group. Further, the processor is further configured to generate a second sequence based on the sequence index. The sequence group includes a sequence $\{x_n\}$ and a sequence $\{y_m\}$, and the second sequence is a sequence $\{f_n\}$ or the second sequence is a sequence $\{g_m\}$.

$f_n$ is an element in the sequence $\{f_n\}$, $g_m$ is an element in the sequence $\{g_m\}$, a length of the sequence $\{f_n\}$ is N, a length of the sequence $\{g_m\}$ is M, n and m are integers, $0 \leq n \leq N-1$, m is an integer, and $0 \leq m \leq M-1$;

the element $f_n$ in the sequence $\{f_n\}$ satisfies $f_n = A \cdot x_n \cdot e^{j \cdot \alpha \cdot n}$;

the element g m in the sequence $\{g_m\}$ satisfies $g_m = A \cdot y_m \cdot e^{j \cdot \alpha \cdot m}$;

A is a non-zero complex number, a is a real number, and $j = \sqrt{-1}$;

an element $x_n$ in the sequence $\{x_n\}$ satisfies $x_n = u \cdot e^{\pi \cdot j \cdot s_n / 4}$, u is a non-zero complex number, and $s_n$ is an element in a sequence $\{s_n\}$; and an element $y_m$ in the sequence $\{y_m\}$ satisfies $$y_m = k_q(m \bmod M_{prime}), k_q(i) = e^{-j \frac{\pi \cdot q \cdot i \cdot (i+1)}{M_{prime}}},$$

i is an integer, $0 \leq i \leq M_{prime}-1$, and $M_{prime}$ is a largest prime smaller than M.

The sequence index or an index of a first sequence is n or q.

According to a fifth aspect, a communication apparatus is provided. The communication apparatus is configured to perform the foregoing method. Functions of the communications apparatus may be implemented by hardware, or may be implemented by hardware executing corresponding software. The hardware or the software includes one or more units corresponding to the foregoing functions.

According to a sixth aspect, a computer storage medium that includes an instruction is provided. When the computer storage medium is run on a computer, the computer performs the foregoing method.

According to a seventh aspect, a computer program product that includes an instruction is provided. When the computer program product is run on a computer, the computer performs the methods in the foregoing aspects.

DESCRIPTION OF EMBODIMENTS

The following describes the technical solutions in the embodiments of the present invention with reference to the accompanying drawings in the embodiments of the present invention. It should be noted that the technical solutions and features in the embodiments of the present invention may be mutually combined in the case of no conflict.

In the embodiments of the present invention, "one" means an individual, but this does not indicate that "one" can only be the individual and cannot be applied to another individual. For example, in the embodiments of the present invention, "one terminal device" is described for a specific terminal device, but this does not mean that "one terminal device" can be applied only to a particular terminal device. The terms "system" and "network" may be interchangeably used in this application.

In this application, "one embodiment" (or "one implementation") or "an embodiment" (or "an implementation") means that a particular characteristic, structure, feature, and the like that are described in combination with an embodiment are included in at least one embodiment. Therefore, "in one embodiment" or "in an embodiment" that appears throughout this specification does not represent a same embodiment.

Further, in the embodiments of the present invention, the terms "and/or" and "at least one" used in cases of "A and/or B" and "at least one of A and B" include any one of three solutions: a solution in which A is included but B is excluded, a solution in which B is included but A is excluded, and a solution in which both options A and B are included. For another example, such phrases in cases of "A, B, and/or C" and "at least one of A, B, and/or C" include any one of seven solutions: a solution in which A is included but B and C are excluded, a solution in which B is included but A and C are excluded, a solution in which C is included but A and B are excluded, a solution in which A and B are included but C is excluded, a solution in which B and C are included but A is excluded, a solution in which A and C are included but B is excluded, and a solution in which all the three options A, B, and C are included. As easily understood by a person of ordinary skill in the art and a related art, all other similar descriptions can be understood in the foregoing manner in the embodiments of the present invention.

Figure 1:
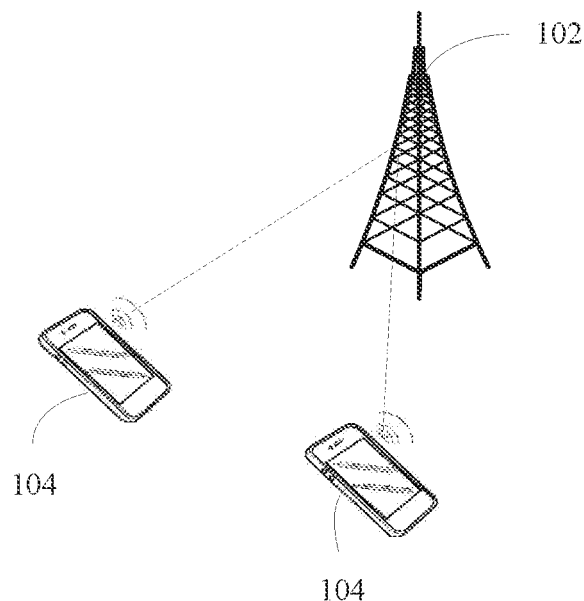
FIG. 1 is a schematic diagram of a wireless communication system applied to an embodiment of the present invention.

FIG. 1 is a schematic communication diagram of a wireless device and a wireless communication system. The wireless communication system may include systems using various radio access technologies (RAT), for example, a Code Division Multiple Access (CDMA) system, a Time Division Multiple Access (TDMA) system, a Frequency Division Multiple Access (FDMA) system, an orthogonal frequency division multiple access (OFDMA) system, and a single carrier frequency division multiple access (SC-FDMA) system. For example, the wireless communication system may be a Long Term Evolution (LTE) system, a CDMA system, a Wideband Code Division Multiple Access (WCDMA) system, a Global System for Mobile Communications (GSM) system, a wireless local area network (WLAN) system, a New Radio (NR) system, various evolved or convergent systems, and a system oriented to a future communication technology. A system architecture and a service scenario that are described in the embodiments of the present invention are intended to more clearly describe the technical solutions in the embodiments of the present invention, and constitute no limitation on the technical solutions provided in the embodiments of the present invention. A person of ordinary skill in the art may learn that as the network architecture evolves and a new service scenario emerges, the technical solutions provided in the embodiments of the present invention are also applicable to a similar technical problem.

For brevity, FIG. 1 shows communication between one network device (for example, an access network device) 102 and two wireless devices (for example, terminal devices) 104. Generally, the wireless communication system may include any quantity of network devices and terminal devices. The wireless communication system may further include one or more core network devices, a device configured to carry a virtualized network function, or the like. The access network device 102 may provide services for the wireless devices by using one or more carriers. In this application, both the access network device and the terminal device are referred to as a wireless apparatus.

In this application, the access network device 102 is an apparatus that is deployed in a radio access network to provide a wireless communication function for the terminal devices. The access network device may include a macro base station (BS), a micro base station (also referred to as a small cell), a relay node, an access point, or the like that is in various forms. A device with a radio access function may have different names in systems using different radio access technologies. For example, the device having the radio access function is referred to as an evolved NodeB (eNB or eNodeB) in an LTE system, and is referred to as a NodeB in a 3rd Generation (3G) system. For ease of description, in this application, the device having the radio access function is referred to as an access network device, and is also referred to as a base station sometimes.

The wireless device in the embodiments of the present invention may include various handheld devices, in-vehicle devices, wearable devices, or computing devices that have a wireless communication function, or another processing device connected to a wireless modem. The wireless device may be referred to as a terminal device, or may be referred to as a mobile station (MS), a terminal, user equipment (UE), or the like. The wireless device may include a subscriber unit, a cellular phone, a smartphone, a wireless data card, a personal digital assistant (PDA) computer, a tablet computer, a modem or a modem processor, a handheld device, a laptop computer, a netbook, a cordless phone or a wireless local loop (WLL) station, a Bluetooth device, a machine type communication (MTC) terminal, and the like. For ease of description, these devices are referred to as a terminal device or UE in this application.

The wireless device may support one or more wireless technologies for wireless communication, such as 5G, LTE, WCDMA, CDMA, 1x, Time Division-Synchronous Code Division Multiple Access (TD-SCDMA), GSM, and 802.11. The wireless device may also support a carrier aggregation technology.

A plurality of wireless devices may perform a same service or different services, for example, a mobile broadband service, an Enhanced Mobile Broadband (eMBB) service, or an ultra-reliable and low latency communication (URLLC) service for a terminal device.

Figure 2:
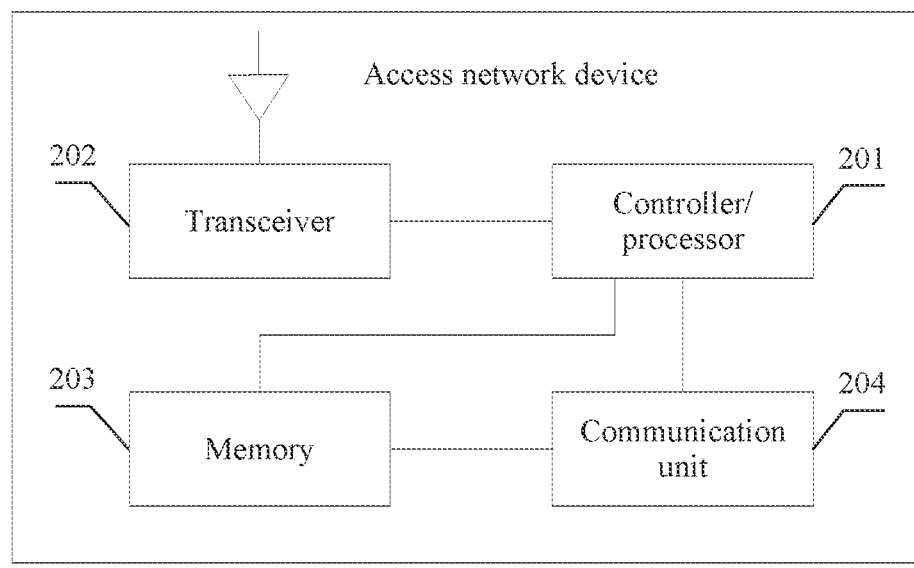
FIG. 2 is a possible schematic structural diagram of an access network device in the foregoing wireless communication system.

Further, a possible schematic structural diagram of the access network device 102 may be shown in FIG. 2. The access network device 102 can perform a method provided in the embodiments of the present invention. The access network device 102 may include a controller or a processor 201 (the processor 201 is used as an example below for description) and a transceiver 202. The controller/processor 201 is also referred to as a modem processor sometimes. The modem processor 201 may include a baseband processor (BBP) (not shown). The baseband processor processes a digitized received signal, to extract an information or data bit conveyed in the signal. In this way, as required or as expected, the BBP is usually implemented in one or more digital signal processors (DSP) in the modem processor 201, or is implemented as separate integrated circuits (IC).

The transceiver 202 may be configured to: support to receive or send information between the access network device 102 and the terminal devices, and support radio communication between the terminal devices. The processor 201 may be further configured to perform various functions of communication between the terminal device and other network devices. In an uplink, an uplink signal from the terminal device is received by using an antenna, demodulated by the transceiver 202, and further processed by the processor 201, to retrieve service data and/or signaling information that are/is sent by the terminal device. In a downlink, service data and/or a signaling message are/is processed by the processor 201 and modulated by the transceiver 202, to generate a downlink signal, and the downlink signal is transmitted to the UE by using the antenna. The access network device 102 may further include a memory 203 that may be configured to store program code and/or data of the access network device 102. The transceiver 202 may include an independent receiving circuit and an independent transmitting circuit, or may include one circuit for implementing sending and receiving functions. The access network device 102 may further include a communication unit 204 configured to support communication between the access network device 102 and another network entity. For example, the communication unit 204 is configured to support communication between the access network device 102 and a network device in a core network.

Optionally, the access network device may further include a bus. The transceiver 202, the memory 203, and the communication unit 204 may be connected to the processor 201 by using the bus. For example, the bus may be a peripheral component interconnect (PCI) bus, or an extended industry standard architecture (EISA) bus. The bus may include an address bus, a data bus, a control bus, and the like.

Figure 3:
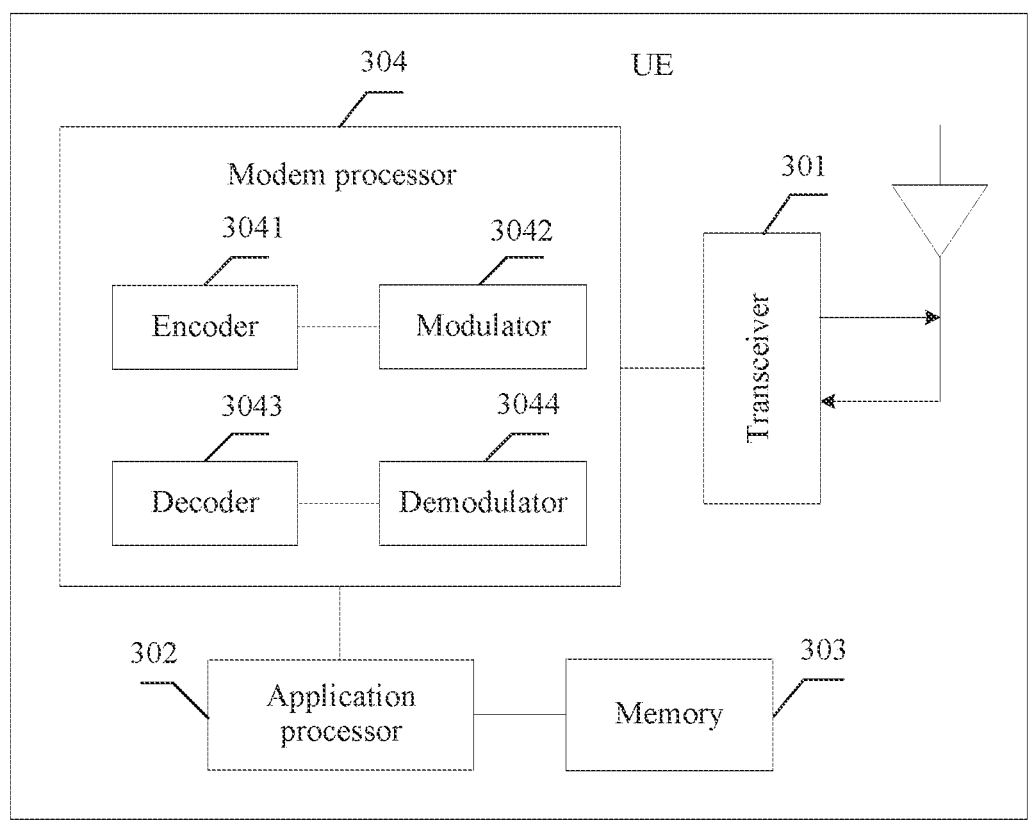
FIG. 3 is a possible schematic structural diagram of a terminal device in the foregoing wireless communication system.

FIG. 3 is a possible schematic structural diagram of the terminal device in the foregoing wireless communication system. The terminal device can perform the method provided in the embodiments of the present invention. The terminal device may be either of the two terminal devices 104. The terminal device includes a transceiver 301, an application processor 302, a memory 303, and a modem processor 304.

The transceiver 301 may adjust (for example, perform analog conversion, filtering, amplification, and up-conversion on) output samples, and generate an uplink signal. The uplink signal is transmitted to the base station in the foregoing embodiment by using an antenna. In a downlink, the antenna receives a downlink signal transmitted by the access network device. The transceiver 301 may adjust (for example, perform filtering, amplification, down-conversion, and digitization on) the signal received from the antenna, and provide input samples.

The modem processor 304 is also referred to as a controller or a processor sometimes, and may include a baseband processor (baseband processor, BBP) (not shown). The baseband processor processes a digitized received signal, to extract an information or data bit conveyed in the signal. As required or as expected, the BBP is usually implemented in one or more digital signal processors in the modem processor 304, or is implemented as separate integrated circuits (IC).

In a design, the modem processor 304 may include an encoder 3041, a modulator 3042, a decoder 3043, and a demodulator 3044. The encoder 3041 is configured to encode a to-be-sent signal. For example, the encoder 3041 may be configured to: receive service data and/or a signaling message that are/is to be sent in an uplink, and process (for example, format, encode, or interleave) the service data and the signaling message. The modulator 3042 is configured to modulate an output signal of the encoder 3041. For example, the modulator may perform processing such as symbol mapping and/or modulation on the output signal (data and/or signaling) of the encoder, and provide output samples. The demodulator 3044 is configured to perform demodulation processing on an input signal. For example, the demodulator 3044 processes input samples and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the combined modem processor 304. These units perform processing based on a radio access technology used in a radio access network.

The modem processor 304 receives, from the application processor 302, digitized data that may represent voice, data, or control information, and processes the digitized data for transmission. The modem processor may support one or more of a plurality of wireless communication protocols in a plurality of communication systems, such as LTE, New Radio, Universal Mobile Telecommunications System (UMTS), and High Speed Packet Access (HSPA). Optionally, the modem processor 304 may further include one or more memories.

Optionally, the modem processor 304 and the application processor 302 may be integrated into one processor chip.

The memory 303 is configured to store program code (also referred to as a program, an instruction, software, or the like sometimes) and/or data that are/is used to support communication of the terminal device.

It should be noted that the memory 203 or the memory 303 may include one or more storage units. For example, the storage unit may be an internal storage unit of the processor 201, the modem processor 304, or the application processor 302 for storing program code, or may be an external storage unit independent of the processor 201, the modem processor 304, or the application processor 302, or may be an internal storage unit of the processor 201, the modem processor 304, or the application processor 302 and an external storage unit independent of the processor 201, the modem processor 304, or the application processor 302.

The processor 201 and the modem processor 304 may be processors of a same type, or may be processors of different types. For example, the processor 201 and the modem processor 304 may be implemented in a central processing unit (CPU), a general processor, a digital signal processor (DSP), an application-specific integrated circuit (ASIC), a field programmable gate array (FPGA) or another programmable logic device, a transistor logic device, a hardware component, another integrated circuit, or any combination thereof. The processor 201 and the modem processor 304 may implement or execute various example logic blocks, modules, and circuits described with reference to the content disclosed in the embodiments of the present invention. Alternatively, the processor may be a combination of components implementing a computing function, for example, a combination including one or more microprocessors, a combination of a DSP and a microprocessor, or a system-on-a-chip (SOC).

A person skilled in the art can understand that various explanatory logical blocks, modules, circuits, and algorithms described with reference to the various aspects disclosed in this application may be implemented as electronic hardware, an instruction that is stored in a memory or another computer readable medium and that is executed by a processor or another processing device, or a combination thereof. For example, the device described in this specification may be used in any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality. How to implement such functionality depends on specific applications, design selection, and/or design constraints imposed on an entire system. A person skilled in the art may use different manners to implement the described functionality for each particular application, but it should not be considered that such implementation goes beyond the scope of the present invention.

Currently, an NR system already supports that channel estimation is based on DMRS for both a physical uplink control channel (PUCCH) and a physical uplink shared channel (PUSCH). In a time-domain symbol for sending a DMRS corresponding to the PUSCH, the DMRS is mapped to equally-spaced frequency-domain subcarriers. For example, a spacing may be a one-subcarrier spacing. In a time-domain symbol for sending a DMRS corresponding to the PUCCH, the DMRS is mapped to consecutive frequency-domain subcarriers.

In the embodiments of the present invention, further consideration is taken for cross-correlation between a sending signal obtained by equally-spaced mapping of an existing sequence, and a sending signal obtained by continuous mapping of another sequence.

An embodiment of the present invention provides a sequence group, and the sequence group includes a sequence $\{x_n\}$ and a sequence $\{y_m\}$.

In this embodiment, $x_n$ represents an element in the sequence $\{x_n\}$, $x_n$ satisfies $$x_n = u \cdot e^{\pi \cdot j \cdot s_n / 4},$$

where u is a non-zero complex number, and $s_n$ is an element in a sequence $\{s_n\}$. $y_m$ represents an element in the sequence $\{y_m\}$, $y_m$ satisfies $$y_m = k_q(m \bmod M_{prime}), k_q(i) = e^{-j\frac{\pi \cdot q \cdot i \cdot (i+1)}{M_{prime}}},$$

i is an integer, $0 \leq i \leq M_{prime} - 1$, and $M_{prime}$ is a largest prime number smaller than M.

Further, a length of the sequence $\{x_n\}$ is N, a length of the sequence $\{y_m\}$ is M, n and m are integers, $0 \leq n \leq N-1$, and $0 \leq m \leq M-1$.

Optionally, N=12 and M=36.

When M=36, $y_m$ satisfies $y_m = k_q$ (m mod 31), $$k_q(i) = e^{-j\frac{\pi \cdot q \cdot i \cdot (i+1)}{31}},$$

i is an integer, and $0 \leq i \leq 30$.

It should be noted that the sequence group in this embodiment may further include a sequence with another length. For example, the sequence group may further include a sequence with another length that is an integer multiple of 12, such as a sequence with a length 48. A structure of this sequence may refer to a base sequence generation manner of a reference signal sequence with a corresponding length in an LTE system. Details are not described herein. Therefore, a value of M may be an integer multiple of 12. Further, M may be a positive integer that is greater than or equal to 36 and that is an integer multiple of 12.

It should be noted that the sequence group may include a sequence $\{x_n\}$ with a length N=6 and does not include a sequence $\{x_n\}$ with a length N=12, 18, or 24; or may include a sequence $\{x_n\}$ with a length N=12 and does not include a sequence $\{x_n\}$ with a length N=6, 18, or 24; or may include a sequence $\{x_n\}$ with a length N=18 and does not include a sequence $\{x_n\}$ with a length N=6, 12, or 24; or may include a sequence $\{x_n\}$ with a length N=24 and does not include a sequence $\{x_n\}$ with a length N=6, 18, or 12; or may include a sequence $\{x_n\}$ with a length N=6 and a sequence $\{x_n\}$ with a length N=12 and does not include a sequence $\{x_n\}$ with a length N=18 or 24; or may include a sequence $\{x_n\}$ with a length N=6 and a sequence $\{x_n\}$ with a length N=18 and does not include a sequence $\{x_n\}$ with a length N=12 or 24; or may include a sequence $\{x_n\}$ with a length N=6 and a sequence $\{x_n\}$ with a length N=24 and does not include a sequence $\{x_n\}$ with a length N=12 or 18; or may include a sequence $\{x_n\}$ with a length N=12 and a sequence $\{x_n\}$ with a length N=18 and does not include a sequence $\{x_n\}$ with a length N=6 or 24; or may include a sequence $\{x_n\}$ with a length N=12 and a sequence $\{x_n\}$ with a length N=24 and does not include a sequence $\{x_n\}$ with a length N=6 or 18; or may include a sequence $\{x_n\}$ with a length N=12, a sequence $\{x_n\}$ with a length N=18, and a sequence $\{x_n\}$ with a length N=24, and does not include a sequence $\{x_n\}$ with a length N=6; or may include a sequence $\{x_n\}$ with a length N=6, a sequence $\{x_n\}$ with a length N=18, and a sequence $\{x_n\}$ with a length N=24, and does not include a sequence $\{x_n\}$ with a length N=12; or may include a sequence $\{x_n\}$ with a length N=6, a sequence $\{x_n\}$ with a length N=12, and a sequence $\{x_n\}$ with a length N=24, and does not include a sequence $\{x_n\}$ with a length N=18; or may include a sequence $\{x_n\}$ with a length N=6, a sequence $\{x_n\}$ with a length N=12, and a sequence $\{x_n\}$ with a length N=18, and does not include a sequence $\{x_n\}$ with a length N=24; or may include a sequence $\{x_n\}$ with a length N=6, a sequence $\{x_n\}$ with a length N=12, a sequence $\{x_n\}$ with a length N=18, and a sequence $\{x_n\}$ with a length N=24. Certainly, the sequence group may further include a sequence $\{x_n\}$ with another length.

In addition, the sequence $\{y_m\}$ included in the sequence group may be a sequence $\{y_m\}$ with any length M, for example, M=60; or may be sequences $\{y_m\}$ with a plurality of lengths M that satisfy the foregoing condition, for example, sequences $\{y_m\}$ with lengths M=36, 48, and 60. This is not limited in this embodiment of the present invention. M may be a positive integer that is greater than or equal to 36 and that is an integer multiple of 12.

Further, the value of M may be a value in a first set, and the first set includes a part or all of the following integers: 36, 48, 60, 72, 84, 96, 108, 120, 144, 156, 168, 180, 192, 216, 228, 240, 264, 288, 312, 336, 360, 384, 396, 408, 432, 456, 480, 504, 528, 552, 576, 624, 648, 672, 720, 768, 792, 816.

$M_{prime}$ is the largest prime number smaller than M.

It should be noted that a first sequence and a second sequence may be a same sequence.

In the foregoing embodiment, composition of the sequence $\{s_n\}$ may be shown in Table 1.

TABLE 1

Composition of the sequence {sn} with a length N = 12

| Index | s(0), . . . , s(11) |   |   |   |   |   |   |   |   |   |   |
|---|---|---|---|---|---|---|---|---|---|---|---|
| 0  |  1 | -1 |  3 |  1 |  1 | -1 | -1 | -1 |  1 |  3 | -3 |  1 |
| 1  | -1 | -1 | -1 | -1 |  1 | -3 | -1 |  3 |  3 | -1 | -3 |  1 |
| 2  | -3 |  1 | -3 | -3 | -3 |  3 | -3 | -1 |  1 |  1 |  1 | -3 |
| 3  | -3 |  3 |  1 |  3 | -3 |  1 |  1 |  1 |  1 |  3 | -3 |  3 |
| 4  | -3 |  1 |  3 | -1 | -1 | -3 | -3 | -1 | -1 |  3 |  1 | -3 |
| 5  | -1 |  1 |  1 | -1 |  1 |  3 |  3 | -1 | -1 | -3 |  1 | -3 |
| 6  | -3 | -3 | -1 |  3 |  3 |  3 | -3 |  3 | -3 |  1 | -1 | -3 |
| 7  | -3 |  3 | -3 |  3 |  3 | -3 | -1 | -1 |  3 |  3 |  1 | -3 |
| 8  | -3 | -1 | -3 | -1 | -1 | -3 |  3 |  3 | -1 | -1 |  1 | -3 |
| 9  | -3 |  3 |  3 |  3 | -1 | -3 | -3 | -1 | -3 |  1 |  3 | -3 |
| 10 |  1 |  3 | -3 |  1 |  3 |  3 |  3 |  1 | -1 |  1 | -1 |  3 |
| 11 | -1 | -3 |  3 | -1 | -3 | -3 | -3 | -1 |  1 | -1 |  1 | -3 |
| 12 |  3 |  1 |  3 |  1 |  3 | -3 | -1 |  1 |  3 |  1 | -1 |  3 |
| 13 | -3 | -3 |  3 |  3 |  3 | -3 | -1 |  1 | -3 |  3 |  1 | -3 |
| 14 | -3 | -1 |  1 | -3 |  1 |  3 |  3 |  3 | -1 | -3 |  3 |  3 |
| 15 | -3 | -3 |  3 |  1 | -3 | -3 | -3 | -1 |  3 | -1 |  1 |  3 |
| 16 | -1 |  1 |  3 | -3 |  1 | -1 |  1 | -1 | -1 | -3 |  1 | -1 |
| 17 | -3 | -1 | -1 |  1 |  3 |  1 |  1 | -1 |  1 | -1 | -3 |  1 |
| 18 | -3 | -1 |  3 | -3 | -3 | -1 | -3 |  1 | -1 | -3 |  3 |  3 |
| 19 | -3 | -3 |  3 | -3 | -1 |  3 |  3 |  3 | -1 | -3 |  1 | -3 |
| 20 | -3 |  1 | -1 | -1 |  3 |  3 | -3 | -1 | -1 | -3 | -1 | -3 |
| 21 | -3 |  1 |  3 |  3 | -1 | -1 | -3 |  3 |  3 | -3 |  3 | -3 |
| 22 | -3 | -1 | -1 | -3 | -3 | -1 | -3 |  3 |  1 |  3 | -1 | -3 |
| 23 | -3 | -1 |  3 |  1 | -3 | -1 | -3 |  3 |  1 |  3 |  3 |  1 |
| 24 | -3 |  3 |  3 |  1 | -3 |  3 | -1 |  1 |  3 | -3 |  3 | -3 |
| 25 |  3 | -1 | -3 |  3 | -3 | -1 |  3 |  3 |  3 | -3 | -1 | -3 |
| 26 |  1 | -1 |  3 | -1 | -1 | -1 | -3 | -1 |  1 |  1 |  1 | -3 |
| 27 | -3 |  3 |  1 | -3 |  1 |  3 | -1 | -1 |  1 |  3 |  3 |  3 |
| 28 | -3 |  3 | -3 |  3 | -3 | -3 |  3 | -1 | -1 |  1 |  3 | -3 |
| 29 | -3 |  3 |  1 | -1 |  3 |  3 | -3 |  1 | -1 |  1 | -1 |  1 |

The first column in Table 1 represents indexes of the sequence $\{s_n\}$, and s(0), . . . , and s(11) represent elements in the sequence $\{s_n\}$.

TABLE 2

Composition of the sequence {sn} with a length N = 18

| Index | s(0), . . . , s(17) |   |   |   |   |   |   |   |   |   |   |   |   |   |   |   |   |   |
|---|---|---|---|---|---|---|---|---|---|---|---|---|---|---|---|---|---|---|
| 0 |  3 | -3 |  3 | -1 |  1 |  3 | -3 | -1 | -3 | -3 | -1 | -3 |  3 |  1 | -1 |  3 | -3 |  3 |
| 1 |  3 | -3 |  1 |  1 |  3 | -1 |  1 | -1 | -1 | -3 |  1 |  1 | -1 |  3 |  3 | -3 |  3 | -1 |
| 2 | -3 |  3 | -1 | -3 | -1 | -3 |  1 |  1 | -3 | -3 | -1 | -1 |  3 | -3 |  1 |  3 |  1 |  1 |

TABLE 2-continued

Composition of the sequence {sn} with a length N = 18

| Index | s(0), ..., s(17) |
|---|---|
| 3  | 1  1  -1 -1 -3 -1  1 -3 -3 -3  1 -3 -1 -1  1 -1  3  1 |
| 4  | 1  1 -3  3  3  1  3 -3  3 -1  1  1 -1  1 -3 -3 -1  3 |
| 5  | -3 -3  1 -3  3  3  3 -1  3  1  1 -3 -3 -3  3 -3 -1 -1 |
| 6  | -1  3 -1 -3  3  1 -3 -1  3 -3 -1 -1  1  1  1 -1 -1 -1 |
| 7  | -3  1 -3 -3  1 -3 -3  3  1 -3 -1 -3 -3 -3 -1  1  1  3 |
| 8  | 1 -3 -1 -3  3  3 -1 -3  1 -3 -3 -1 -3 -1  1  3  3  3 |
| 9  | -3  3  1 -1 -1 -1 -1  1 -1  3  3 -3 -1  1  3 -1  3 -1 |
| 10 | -3 -3  1 -1 -1  1  1 -3 -1  3  3  3  3 -1  3  1  3  1 |
| 11 | -3 -3  3  3 -3  1  3 -1 -3  1 -1 -3  3 -3 -1 -1  -1  3 |
| 12 | -3 -3  3  3  3  1 -3  1  3  3  1 -3 -3  3 -1 -3 -1  1 |
| 13 | -3  3 -1  1  3  1 -3 -1  1  1 -3  1  3  3 -1 -3 -3 -3 |
| 14 | -3  1 -3 -1 -1  3  1 -3 -3 -3 -1 -3 -3  1  1  1 -1 -1 |
| 15 | -3 -3  3  3  3 -1 -1 -3 -1 -1 -1  3  1 -3  3 -1  3 -1 |
| 16 | -3 -1  3  3 -1  3 -1 -3 -1  1 -1 -3 -1 -1 -1  3  3  1 |
| 17 | -3 -1 -3 -1 -3  1  3 -3 -1  3  3  3  1 -1 -3  3 -1 -3 |
| 18 | -3  3  1 -1 -1  3 -3 -1  1  1  1  1  1 -1  3 -1 -3 -1 |
| 19 | 3 -1 -3  1 -3 -3 -3  3  3 -1  1 -3  1  1  3  3 |
| 20 | 3  3  3 -3 -1 -3 -1  3 -1  1 -1  1 -3 -3 -1  3  3 |
| 21 | 3 -1  3  1 -3 -3 -1  1 -3  3  3  3  1  3 -3  3 -3 |
| 22 | -3  1  1 -3  1  1  3 -3 -1 -3 -1  3 -3  3 -1 -1 -1 -3 |
| 23 | -3 -1 -1 -3  1 -3  3 -1 -1 -3  3  3 -3 -1  3 -1 -1 -1 |
| 24 | -3 -3 -3  1 -3  3  1  1  3 -3 -3  1  3 -1 -3 -3 -3  3 |
| 25 | 1  1 -3 -3 -3 -3  1  3 -3  3  3  1 -3 -1  3 -1 -3  1 |
| 26 | 3 -1 -1  1 -3 -1 -3 -1 -3 -3 -1 -3  1  1  1 -3 -3  3 |
| 27 | 3  1 -3  1 -3  3  3 -1 -3 -1 -3 -3  3 -3 -1  1  3 |
| 28 | -1 -3  1 -3 -3 -3  1  1  3  3 -3  3  3 -3 -1  3 -3  1 |
| 29 | -3 -1 -3 -3  1  1 -1 -3 -1 -3 -1 -1  3  3 -1  3  1  3 |

The first column in Table 2 represents indexes of the sequence {s_n}, and s(0), ..., and s(17) represent elements in the sequence {s_n}.

The first column in Table 3 represents indexes of the sequence {s_n}, and s(0), ..., and s(23) represent elements in the sequence {s_n}.

TABLE 3

Composition of the sequence {sn} with a length N = 24

| Index | s(0), ..., s(23) |
|---|---|
| 0  | -1 -3  3  1  1 -3  1 -3 -3  1 -3 -1 -1  3 -3  3  3  3 -3  1  3  3 -3 -3 |
| 1  | -1 -3  3 -1  3  1  3 -1  1 -3 -1 -3 -1  1  3 -1 -3  3  3  3 -3 -3 -3 |
| 2  | -3  3  1  3 -1  1 -3  1 -3  1 -1 -3 -3 -3 -3 -3 -1 -1 -1  1  1 -3 -3 |
| 3  | 3 -1  3 -1  1 -3  1  1 -3 -3  3 -3 -1 -1 -1 -1 -3 -3 -1  1  1 -3 -3 |
| 4  | 1 -3  3 -1 -3 -1  3  3  1 -1  1  1  3 -3 -1 -3 -3 -3 -1  3 -3 -1 -3 -3 |
| 5  | 3 -1  1 -1  3 -3  1  1  3 -1 -3  3  1 -3  3 -1 -1 -1 -1  1 -3 -3 -3 -3 |
| 6  | -3  3 -1  3  1 -1 -1 -1  3  3  1  1  3  3  1 -3 -3 -1  1 -3  1  3 -3 |
| 7  | -3 -1  1 -3 -3  1  1 -3  3 -1 -1 -3  1  3  1 -3 -1 -3  1 -3 -3 -3 -3 |
| 8  | -3  1 -3  1 -3 -3  1 -3  1 -3 -3 -3 -3 -3  1 -3 -3  1  1 -3  1  1 -3 -3 |
| 9  | 3 -3 -3 -1  3  3 -3 -1  3  1  1  1  3 -1  3 -3 -1  3 -1  3  1 -1 -3 -3 |
| 10 | -3 -3 -1 -1 -1 -1  3  1 -3 -1  3 -1  1 -3 -3  3  3  3  1 -1 -1  1 -3 -3 |
| 11 | -3 -3  3  3  1 -1 -1 -1  1 -3 -1  1 -1  3 -3 -1 -3 -1 -1  1  3  3 -1 -3 |
| 12 | -3 -3  1 -1  3  3 -3 -1  1 -1 -1  1  1 -1 -1  3 -3  1 -3  1 -1 -1 -1 -3 |
| 13 | -3  1 -3  3 -1 -1 -1 -3  3  1 -1 -3 -1  1  3 -1  1 -3 -3 -3 -3 -3 |
| 14 | -3 -3 -3 -1  3 -3  3  1  3  1 -3 -1 -1 -3  1  1  3  1 -1 -3  3  1  3 -3 |
| 15 | 1  1 -1 -3 -1  1  1 -3  1 -1  1 -3  3 -3 -3  3 -1 -3  1  3 -3  1 -3 -3 |
| 16 | -3  3 -1  3 -1  3  3  1 -1  1 -3  3 -3 -3 -1  1  3 -3 -1 -1  1 -1 -3 |
| 17 | -1 -3 -3  1 -1 -3 -3  1  3 -1 -3 -1 -3  1  1  3 -1 -3 -1 -1  3 -3 -3 |
| 18 | -3  1 -3  1 -3  1  1  3  1 -3 -3 -1  3 -1 -3  3  1 -1 -3 -3 -3 -3 -3 |
| 19 | 3 -3  3 -1 -3  1  3  1 -1 -1 -3 -1  3 -3  3 -1  3  3 -3 -3  3 -3 -3 -3 |
| 20 | -1  3 -3 -3 -1  3 -1 -1  1  3  1  3 -1 -1 -3  1  3  1 -1 -3  1 -1 -3 -3 |
| 21 | -3  1 -3 -1 -1  3  1  3 -3  1 -1  3  3 -1 -3  3 -3 -1 -1 -3 -3 -3  3 -3 |
| 22 | -3 -1 -1 -1  1 -3 -3 -1  1  3 -1  3  1 -3  1  3  1  1 -1 -1 -3 -3 |
| 23 | -3  1 -3  3 -3  3  3 -1 -3  1 -3 -3 -3  1  3  3 -1  3 -1  1  3  3 -3 |
| 24 | -3 -1  1 -3 -1 -1  1  1  1  3  3 -1  1 -1  1 -1 -3 -3  3  1 -1 -3 |
| 25 | 3 -3 -1  1  3 -1 -1 -3 -1 -3 -1 -3  3 -1  1  1 -3  3 -3 -3 -3 |
| 26 | -3  1  3 -1  1 -1  3 -3  3 -1 -1 -3  3 -1 -1 -3 -1 -1 -3  3  3 -3 |
| 27 | -3  3 -1 -3 -1 -1  3 -1  3 -3 -1  3 -3  3 -3 -1  3  1  1 -1 -3 -3 |
| 28 | -3  1 -1 -3 -3 -1  1 -3 -1 -3  1  1 -1  1  3  3  3 -1  1 -1  1 -1 -3 |
| 29 | -1  3 -1 -1  3  3 -1 -1 -1  3 -1 -3  1  3  1 -3 -3 -3 -1 -3 -1 -3 -3 |

In a combination manner, when M=36, and the sequence group includes a sequence {$x_n$} with a length N=12, a sequence {$x_n$} with a length N=18, a sequence {$x_n$} with a length N=24, the sequence {$y_m$}, and a sequence {$h_j$}, a combination manner of the sequence {$y_m$} and the sequence {$h_j$} satisfies u=[$\bar{u}$+1/2], and $\bar{u}$=$J_{prime}$·q/31. A length of the sequence {$h_j$} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \le i \le J_{prime}-1/J_{prime}$ and $J_{prime}$ is a largest prime number smaller than J. The sequence {$x_n$} with a length N=12, the sequence {$x_n$} with a length N=18, and the sequence {$x_n$} with a length N=24 that have a same index are in a same sequence group. A sequence {$x_n$} corresponding to an index v and a sequence {$y_m$} corresponding to q=v+1 are in a same sequence group, and $0 \le v \le 29$.

In this combination manner, the sequence {$x_n$}, the sequence {$y_m$}, and the sequence {$h_j$} are respectively mapped to N, M, and J subcarriers. A center-frequency spacing of any two adjacent subcarriers in the N, M, or J subcarriers is t times a subcarrier spacing. A quantity of sequence pairs, namely, the sequence {$x_n$} with a length N=12 and a sequence with another length in a different sequence group, whose cross-correlation value is greater than 0.8 and a maximum cross-correlation value are shown in Table 4. The cross-correlation value is obtained through calculation according to the first cross-correlation value calculation method in the 3GPP contribution R1-163437.

TABLE 4

|  | Length-18 sequence | Length-24 sequence | Length-36 sequence | Length-48 sequence | Length-60 sequence | Length-72 sequence |
| --- | --- | --- | --- | --- | --- | --- |
| Length-12 sequence | 18 | 8 | 9 | 7 | 10 | 9 |
| Maximum cross-correlation value | 0.8933 | 0.855 | 0.872 | 0.8677 | 0.8922 | 0.8749 |

It should be noted that all cross-correlation values mentioned in this specification are obtained through calculation according to the foregoing method, and this is not described in the following again.

A quantity of sequence pairs, namely, the sequence {$x_n$} with a length N=18 and a sequence with another length in a different sequence group, whose cross-correlation value is greater than 0.7 and a maximum cross-correlation value are shown in Table 5.

TABLE 5

|  | Length-24 sequence | Length-36 sequence | Length-48 sequence | Length-60 sequence | Length-72 sequence |
| --- | --- | --- | --- | --- | --- |
| Length-18 sequence | 8 | 7 | 3 | 6 | 5 |
| Maximum cross-correlation value | 0.7412 | 0.7326 | 0.8597 | 0.7477 | 0.7651 |

A quantity of sequence pairs, namely, the sequence {$x_n$} with a length N=24 and a sequence with another length in a different sequence group, whose cross-correlation value is greater than 0.6 and a maximum cross-correlation value are shown in Table 6.

TABLE 6

|  | Length-36 sequence | Length-48 sequence | Length-60 sequence | Length-72 sequence |
| --- | --- | --- | --- | --- |
| Length-18 sequence | 6 | 0 | 5 | 6 |
| Maximum-cross-correlation value | 0.6951 | 0.5963 | 0.6614 | 0.7293 |

In this combination manner, the sequence {$x_n$} with a length N=12 is mapped to 12 subcarriers, and a center-frequency spacing of any two adjacent subcarriers in the 12 subcarriers is 2t times a subcarrier spacing. The sequence {$x_n$} with a length N=12, the sequence {$y_m$}, and the sequence {$h_j$} are respectively mapped to N, M, and J subcarriers. A center-frequency spacing of any two adjacent subcarriers in the N, M, and J subcarriers is t times a subcarrier spacing. A quantity of sequence pairs, namely, the sequence {$x_n$} with a length N=12 and a sequence with another length in a different sequence group, whose cross-correlation value is greater than 0.8 and a maximum cross-correlation value are shown in Table 7.

TABLE 7

|  | Length-24 sequence | Length-36 sequence | Length-48 sequence | Length-60 sequence | Length-72 sequence |
| --- | --- | --- | --- | --- | --- |
| Length-12 sequence | 14 | 9 | 9 | 5 | 10 |

TABLE 7-continued

|  | Length-24 sequence | Length-36 sequence | Length-48 sequence | Length-60 sequence | Length-72 sequence |
| --- | --- | --- | --- | --- | --- |
| Maximum Cross-correlation value | 0.8578 | 0.8719 | 0.8707 | 0.8733 | 0.9175 |

It may be learned from the foregoing that, the sequence {$x_n$} and the sequence {$y_m$} included in the sequence group in this embodiment are respectively corresponding to the sequence {$s_n$} and q; in other words, the sequence {$x_n$} is corresponding to the sequence {$s_n$}, and the sequence {$y_m$} is corresponding to q.

In a first optional implementation, when N=12, a combination of the sequence {$s_n$} and q is at least one of the following combinations:

the sequence {$s_n$} is {1, 3, −3, 1, 3, 3, 3, 1, −1, 1, −1, 3}, and q=1; or the sequence {$s_n$} is {−1, 1, 3, −3, 1, −1, 1, −1, −1, −3, 1, −1}, and q=2; or the sequence {sn} is {−3, −3, 3, −3, −1, 3, 3, 3, −1, −3, 1, −3}, and q=3; or the sequence {sn} is {3, 1, 3, 1, 3, −3, −1, 1, 3, 1, −1, −3}, and q=4; or the sequence {s$_n$} is {−3, −1, −3, −1, −1, −3, 3, 3, −1, −1, 1, −3}, and q=5; or the sequence {s$_n$} is {3, −1, −3, 3, −3, −1, 3, 3, 3, −3, −1, −3}, and q=6; or the sequence {s$_n$} is {−3, −3, 3, 3, 3, −3, −1, 1, −3, 3, 1, −3}, and q=7; or the sequence {s$_n$} is {−3, 3, 1, −1, 3, 3, −3, 1, −1, 1, −1, 1}, and q=8; or the sequence {s$_n$} is {−3, −3, 3, 1, −3, −3, −3, −1, 3, −1, 1, 3}, and q=9; or the sequence {s$_n$} is {−3, 3, 1, 3, −3, 1, 1, 1, 1, 3, −3, 3}, and q=10; or the sequence {s$_n$} is {−3, −1, −1, 1, 3, 1, 1, −1, 1, −1, −3, 1}, and q=1; or the sequence {s$_n$} is {−3, 1, 3, −1, −1, −3, −3, −1, −1, 3, 1, −3}, and q=12; or the sequence {s$_n$} is {−3, −3, −1, 3, 3, 3, −3, 3, −3, 1, −1, −3}, and q=13; or the sequence {s$_n$} is {−3, −1, −1, −3, −3, −1, −3, 3, 1, 3, −1, −3}, and q=14; or the sequence {sn} is {1, −1, 3, 1, 1, −1, −1, −1, 1, 3, −3, 1}, and q=15; or the sequence {sn} is {−3, 3, 1, −3, 1, 3, −1, −1, 1, 3, 3, 3}, and q=16; or the sequence {sn} is {−3, −1, 3, 1, −3, −1, −3, 3, 1, 3, 3, 1}, and q=17; or the sequence {sn} is {−1, 1, 1, −1, 1, 3, 3, −1, −1, −3, 1, −3}, and q=1; or the sequence {sn} is {−3, 3, 3, 1, −3, 3, −1, 1, 3, −3, 3, −3}, and >19; or the sequence {s$_n$} is {−1, −1, −1, −1, 1, −3, −1, 3, 3, −1, −3, 1}, and q=2; or the sequence {s$_n$} is {−3, 1, −3, −3, −3, 3, −3, −1, 1, 1, 1, −3}, and q=21; or the sequence {s$_n$} is {−3, −1, 1, −3, 1, 3, 3, 3, −1, −3, 3, 3}, and q=22; or the sequence {s$_n$} is {−3, 3, −3, 3, −3, −3, 3, −1, −1, 1, 3, −3}, and q=3; or the sequence {s$_n$} is {−3, 1, −1, −1, 3, 3, −3, −1, −1, −3, −1, −3}, and q=24; or the sequence {s$_n$} is {1, −1, 3, −1, −1, −1, −3, −1, 1, 1, 1, −3}, and q=25; or the sequence {s$_n$} is {−3, 3, −3, 3, 3, −3, −1, −1, 3, 3, 1, −3}, and q=2; or the sequence {s$_n$} is {−3, −1, 3, −3, −3, −1, −3, 1, −1, −3, 3, 3}, and q=27; or the sequence {s$_n$} is {−3, 1, 3, 3, −1, −1, −3, 3, 3, −3, 3, −3}, and q=28; or the sequence {s$_n$} is {−3, 3, 3, 3, −1, −3, −3, −1, −3, 1, 3, −3}, and q=29; or the sequence {s$_n$} is {−1, −3, 3, −1, −3, −3, −3, −1, 1, −1, 1, −3}, and q=30.

It should be noted that all the foregoing combinations of the sequence {s$_n$} and q may be considered as a whole; in other words, all the combinations may be considered as one combination set. Certainly, a part of all the combinations of the sequence {s$_n$} and q in this embodiment of the present invention may be considered as a whole; in other words, a part of combinations may be considered as one combination set.

Based on this optional implementation, when M=36, and the sequence group includes the sequence {x$_n$}, the sequence {y$_m$}, and the sequence {h$_j$}, a combination manner of the sequence {y$_m$} and the sequence {h$_j$} satisfies u=⌊ū+1/2⌋, and ū=J$_{prime}$·q/31. A length of the sequence {h$_j$} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {f$_n$} is mapped to N subcarriers, and a center-frequency spacing of any two adjacent subcarriers in the N subcarriers is 2t times a subcarrier spacing. A sequence {g$_m$} and the sequence {h$_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {x$_n$} and a sequence {y$_m$} or a sequence {h$_j$} in different sequence groups, whose cross-correlation value is greater than 0.8 and a maximum cross-correlation value are shown in Table 8.

TABLE 8

| | Length-36 sequence | Length-48 sequence | Length-60 sequence | Length-72 sequence |
|---|---|---|---|---|
| Length-12 sequence | 4 | 5 | 3 | 2 |
| Maximum cross-correlation value | 0.8618 | 0.8707 | 0.8412 | 0.824 |

It should be noted that all cross-correlation values mentioned in this specification are obtained through calculation according to the foregoing method, and this is not described in the following again.

In a second optional implementation, when N=12, a combination of the sequence {s$_n$} and q is at least one of the following combinations:

the sequence {s$_n$} is {−3, 1, −3, −3, −3, 3, −3, −1, 1, 1, 1, −3}, and q=1; or the sequence {s$_n$} is {−3, 3, 1, 3, −3, 1, 1, 1, 1, 3, −3, 3}, and q=2; or the sequence {s$_n$} is {−1, 1, 1, −1, 1, 3, 3, −1, −1, −3, 1, −3}, and q=3; or the sequence {s$_n$} is {−3, −3, −1, 3, 3, 3, −3, 3, −3, 1, −1, −3}, and q=4; or the sequence {s$_n$} is {−3, 3, −3, 3, 3, −3, −1, −1, 3, 3, 1, −3}, and q=5; or the sequence {s$_n$} is {3, −1, −3, 3, −3, −1, 3, 3, 3, −3, −1, −3}, and q=6; or the sequence {s$_n$} is {−3, −3, 3, 3, 3, −3, −1, 1, −3, 3, 1, −3}, and q=7; or the sequence {s$_n$} is {−3, −1, −3, −1, −1, −3, 3, 3, −1, −1, 1, −3}, and q=8; or the sequence {s$_n$} is {−3, −3, 3, 1, −3, −3, −3, −1, 3, −1, 1, 3}, and q=9; or the sequence {s$_n$} is {1, 3, −3, 1, 3, 3, 3, 1, −1, 1, −1, 3}, and q=10; or the sequence {sn} is {−1, −3, 3, −1, −3, −3, −3, −1, 1, −1, 1, −3}, and q=11; or the sequence {s$_n$} is {−3, 1, 3, −1, −1, −3, −3, −1, −1, 3, 1, −3}, and q=12; or the sequence {s$_n$} is {3, 1, 3, 1, 3, −3, −1, 1, 3, 1, −1, −3}, and q=13; or the sequence {s$_n$} is {−1, 1, 3, −3, 1, −1, 1, −1, −1, −3, 1, −1}, and q=14; or the sequence {s$_n$} is {1, −1, 3, 1, 1, −1, −1, −1, 1, 3, −3, 1}, and q=15; or the sequence {s$_n$} is {−3, 3, 1, −3, 1, 3, −1, −1, 1, 3, 3, 3}, and q=16; or the sequence $\{s_n\}$ is $\{-3, -1, -1, 1, 3, 1, 1, -1, 1, -1, -3, 1\}$, and q=17; or the sequence $\{s_n\}$ is $\{-3, -1, 3, -3, -3, -1, -3, 1, -1, -3, 3, 3\}$, and q=18; or the sequence $\{s_n\}$ is $\{-3, -3, 3, -3, -1, 3, 3, 3, -1, -3, 1, -3\}$, and q=19; or the sequence $\{s_n\}$ is $\{-1, -1, -1, -1, 1, -3, -1, 3, 3, -1, -3, 1\}$, and q=20; or the sequence $\{s_n\}$ is $\{-3, 1, -1, -1, 3, 3, -3, -1, -1, -3, -1, -3\}$, and q=21; or the sequence $\{s_n\}$ is $\{-3, -1, 1, -3, 1, 3, 3, 3, -1, -3, 3, 3\}$, and q=22; or the sequence $\{s_n\}$ is $\{-3, 1, 3, 3, -1, -1, -3, 3, 3, -3, 3, -3\}$, and q=23; or the sequence $\{s_n\}$ is $\{-3, 3, 3, 1, -3, 3, -1, 1, 3, -3, 3, -3\}$, and q=24; or the sequence $\{s_n\}$ is $\{1, -1, 3, -1, -1, -1, -3, -1, 1, 1, 1, -3\}$, and q=25; or the sequence $\{s_n\}$ is $\{-3, -1, -1, -3, -3, -1, -3, 3, 1, 3, -1, -3\}$, and q=26; or the sequence $\{s_n\}$ is $\{-3, -1, 3, 1, -3, -1, -3, 3, 1, 3, 3, 1\}$, and q=27; or the sequence $\{s_n\}$ is $\{-3, 3, -3, 3, -3, -3, 3, -1, -1, 1, 3, -3\}$, and q=28; or the sequence $\{s_n\}$ is $\{-3, 3, 3, 3, -1, -3, -3, -1, -3, 1, 3, -3\}$, and q=29; or the sequence $\{s_n\}$ is $\{-3, 3, 1, -1, 3, 3, -3, 1, -1, 1, -1, 1\}$, and q=30.

It should be noted that in this optional implementation, all the foregoing combinations of the sequence $\{s_n\}$ and q may be considered as a whole; in other words, all the combinations may be considered as one combination set. Certainly, a part of all the combinations of the sequence $\{s_n\}$ and q in this embodiment of the present invention may be considered as a whole; in other words, a part of combinations may be considered as one combination set.

Based on this optional implementation, when M=36, and the sequence group includes the sequence $\{x_n\}$, the sequence $\{y_m\}$, and the sequence $\{h_j\}$, a combination manner of the sequence $\{y_m\}$ and the sequence $\{h_j\}$ satisfies $u=\lfloor \bar{u}+1/2 \rfloor$, and $\bar{u}=J_{prime} \cdot q/31$. A length of the sequence $\{h_j\}$ is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence $\{f_n\}$ is mapped to N subcarriers, and a center-frequency spacing of any two adjacent subcarriers in the N subcarriers is 2t times a subcarrier spacing. A sequence $\{g_m\}$ and the sequence $\{h_j\}$ are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence $\{x_n\}$ and a sequence $\{y_m\}$ or a sequence $\{h_j\}$ in different sequence groups, whose cross-correlation value is greater than 0.8 and a maximum cross-correlation value are shown in Table 9.

TABLE 9

| | Length-36 sequence | Length-48 sequence | Length-60 sequence | Length-72 sequence |
|---|---|---|---|---|
| Length-12 sequence | 3 | 5 | 4 | 1 |

TABLE 9-continued

| | Length-36 sequence | Length-48 sequence | Length-60 sequence | Length-72 sequence |
|---|---|---|---|---|
| Maximum cross-correlation value | 0.8618 | 0.8707 | 0.8412 | 0.8073 |

In a third optional implementation, when N=12, a combination of the sequence $\{s_n\}$ and q is at least one of the following combinations:

the sequence $\{s_n\}$ is $\{1, 3, -3, 1, 3, 3, 3, 1, -1, 1, -1, 3\}$, and q=; or the sequence $\{s_n\}$ is $\{-3, -1, 3, 1, -3, -1, -3, 3, 1, 3, 3, 1\}$, and q=2; or the sequence $\{s_n\}$ is $\{-3, -3, 3, -3, -1, 3, 3, 3, -1, -3, 1, -3\}$, and q=3; or the sequence $\{s_n\}$ is $\{-1, -1, -1, -1, 1, -3, -1, 3, 3, -1, -3, 1\}$, and q=4; or the sequence $\{s_n\}$ is $\{-3, -1, -3, -1, -1, -3, 3, 3, -1, -1, 1, -3\}$, and q=5; or the sequence $\{s_n\}$ is $\{3, -1, -3, 3, -3, -1, 3, 3, 3, -3, -1, -3\}$, and q=6; or the sequence $\{s_n\}$ is $\{-3, -3, 3, 3, 3, -3, -1, 1, -3, 3, 1, -3\}$, and q=7; or the sequence $\{s_n\}$ is $\{-3, 3, 1, -1, 3, 3, -3, 1, -1, 1, -1, 1\}$, and q=8; or the sequence $\{s_n\}$ is $\{-3, 1, -3, -3, -3, 3, -3, -1, 1, 1, 1, -3\}$, and q=9; or the sequence $\{s_n\}$ is $\{-3, -1, -1, -3, -3, -1, -3, 3, 1, 3, -1, -3\}$, and q=10; or the sequence $\{s_n\}$ is $\{-3, -1, -1, 1, 3, 1, 1, -1, 1, -1, -3, 1\}$, and q=11; or the sequence $\{s_n\}$ is $\{-3, 1, 3, -1, -1, -3, -3, -1, -1, 3, 1, -3\}$, and q=12; or the sequence $\{s_n\}$ is $\{-3, -3, -1, 3, 3, -3, 3, -3, 1, -1, -3\}$, and q=13; or the sequence $\{s_n\}$ is $\{-3, -1, 1, -3, 1, 3, 3, -1, -3, 3, 3\}$, and q=14; or the sequence $\{s_n\}$ is $\{1, -1, 3, 1, 1, -1, -1, -1, 1, 3, -3, 1\}$, and q=15; or the sequence $\{s_n\}$ is $\{-3, 3, 1, -3, 1, 3, -1, -1, 1, 3, 3, 3\}$, and q=16; or the sequence $\{s_n\}$ is $\{-3, -3, 3, 1, -3, -3, -3, -1, 3, -1, 1, 3\}$, and q=17; or the sequence $\{s_n\}$ is $\{-1, 1, 1, -1, 1, 3, 3, -1, -1, -3, 1, -3\}$, and q=18; or the sequence $\{s_n\}$ is $\{-3, -1, 3, -3, -3, -1, -3, 1, -1, -3, 3, 3\}$, and q=19; or the sequence $\{s_n\}$ is $\{-1, 1, 3, -3, 1, -1, 1, -1, -1, -3, 1, -1\}$, and q=20; or the sequence $\{s_n\}$ is $\{-3, 1, -1, -1, 3, 3, -3, -1, -1, -3, -1, -3\}$, and q=21; or the sequence $\{s_n\}$ is $\{-3, 3, 1, 3, -3, 1, 1, 1, 1, 3, -3, 3\}$, and q=22; or the sequence $\{s_n\}$ is $\{-3, 3, -3, 3, -3, -3, 3, -1, -1, 1, 3, -3\}$, and q=23; or the sequence $\{s_n\}$ is $\{-3, 3, 3, 1, -3, 3, -1, 1, 3, -3, 3, -3\}$, and q=24; or the sequence $\{s_n\}$ is $\{1, -1, 3, -1, -1, -1, -3, -1, 1, 1, 1, -3\}$, and q=25; or the sequence $\{s_n\}$ is $\{-3, 1, 3, 3, -1, -1, -3, 3, 3, -3, 3\}$, and q=26; or the sequence $\{s_n\}$ is $\{3, 1, 3, 1, 3, -3, -1, 1, 3, 1, -1, -3\}$, and q=27; or the sequence {$s_n$} is {−3, 3, −3, 3, 3, −3, −1, −1, 3, 3, 1, −3}, and q=; or the sequence {$s_n$} is {−3, 3, 3, 3, −1, −3, −3, −1, −3, 1, 3, −3}, and q=29; or the sequence {$s_n$} is {−1, −3, 3, −1, −3, −3, −3, −1, 1, −1, 1, −3}, and q=30.

It should be noted that all the foregoing combinations of the sequence {$s_n$} and q may be considered as a whole; in other words, all the combinations may be considered as one combination set. Certainly, a part of all the combinations of the sequence {$s_n$} and q in this embodiment of the present invention may be considered as a whole; in other words, a part of combinations may be considered as one combination set.

Based on this optional implementation, when M=36, and the sequence group includes the sequence {$x_n$}, the sequence {$y_m$}, and the sequence {$h_j$}, a combination manner of the sequence {$y_m$} and the sequence {$h_j$} satisfies $u=\lfloor \bar{u}+1/2 \rfloor$, and $\bar{u}=J_{prime} \cdot q/31$. A length of the sequence {$h_j$} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {$f_n$} is mapped to N subcarriers, and a center-frequency spacing of any two adjacent subcarriers in the N subcarriers is 2t times a subcarrier spacing. A sequence {$g_m$} and the sequence {$h_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {$x_n$} and a sequence {$y_m$} or a sequence {$h_j$} in different sequence groups, whose cross-correlation value is greater than 0.8 and a maximum cross-correlation value are shown in Table 10.

TABLE 10

| | Length-36 sequence | Length-48 sequence | Length-60 sequence | Length-72 sequence |
| --- | --- | --- | --- | --- |
| Length-12 sequence | 3 | 8 | 3 | 3 |
| Maximum cross-correlation value | 0.8618 | 0.8707 | 0.8412 | 0.8202 |

In a fourth optional implementation, when N=12, a combination of the sequence {$s_n$} and q is at least one of the following combinations:

the sequence {$s_n$} is {1, 3, −3, 1, 3, 3, 3, 1, −1, 1, −1, 3}, and q=1; or the sequence {$s_n$} is {−3, −1, 3, 1, −3, −1, −3, 3, 1, 3, 3, 1}, and q=2; or the sequence {$s_n$} is {−3, −3, 3, −3, −1, 3, 3, 3, −1, −3, 1, −3}, and q=3; or the sequence {$s_n$} is {−3, 1, 3, −1, −1, −3, −3, −1, −1, 3, 1, −3}, and q=4; or the sequence {$s_n$} is {−3, −1, −3, −1, −1, −3, 3, 3, −1, −1, 1, −3}, and q=5; or the sequence {$s_n$} is {3, −1, −3, 3, −3, −1, 3, 3, 3, −3, −1, −3}, and q=6; or the sequence {$s_n$} is {−3, −3, 3, 3, 3, −3, −1, 1, −3, 3, 1, −3}, and q=7; or the sequence {$s_n$} is {−3, 3, 1, −1, 3, 3, −3, 1, −1, 1, −1, 1}, and q=8; or the sequence {$s_n$} is {−3, 1, −3, −3, −3, 3, −3, −1, 1, 1, 1, −3}, and q=9; or the sequence {$s_n$} is {−3, −1, −1, −3, −3, −1, −3, 3, 1, 3, −1, −3}, and q=10; or the sequence {$s_n$} is {−3, −1, −1, 1, 3, 1, 1, −1, 1, −1, −3, 1}, and q=11; or the sequence {$s_n$} is {−1, −1, −1, −1, 1, −3, −1, 3, 3, −1, −3, 1}, and q=12; or the sequence {$s_n$} is {−3, −3, −1, 3, 3, 3, −3, 3, −3, 1, −1, −3}, and q=13; or the sequence {$s_n$} is {−3, −1, 1, −3, 1, 3, 3, 3, −1, −3, 3, 3}, and q=14; or the sequence {$s_n$} is {−3, −1, 3, −3, −3, −1, −3, 1, −1, −3, 3, 3}, and q=15; or the sequence {$s_n$} is {−3, 3, 1, −3, 1, 3, −1, −1, 1, 3, 3, 3}, and q=16; or the sequence {$s_n$} is {−3, −3, 3, 1, −3, −3, −3, −1, 3, −1, 1, 3}, and q=17; or the sequence {$s_n$} is {−1, 1, 1, −1, 1, 3, 3, −1, −1, −3, 1, −3}, and q=18; or the sequence {$s_n$} is {−3, 3, −3, 3, 3, −3, −1, −1, 3, 3, 1, −3}, and q=19; or the sequence {$s_n$} is {−1, 1, 3, −3, 1, −1, 1, −1, −1, −3, 1, −1}, and q=20; or the sequence {$s_n$} is {1, −1, 3, 1, 1, −1, −1, −1, 1, 3, −3, 1}, and q=21; or the sequence {$s_n$} is {−3, 3, 1, 3, −3, 1, 1, 1, 1, 3, −3, 3}, and q=22; or the sequence {$s_n$} is {−3, 3, −3, 3, −3, −3, 3, −1, −1, 1, 3, −3}, and q=23; or the sequence {$s_n$} is {−3, 3, 3, 1, −3, 3, −1, 1, 3, −3, 3, −3}, and q=24; or the sequence {$s_n$} is {1, −1, 3, −1, −1, −1, −3, −1, 1, 1, 1, −3}, and q=25; or the sequence {$s_n$} is {−3, 1, −1, −1, 3, 3, −3, −1, −1, −3, −1, −3}, and q=26; or the sequence {$s_n$} is {3, 1, 3, 1, 3, −3, −1, 1, 3, 1, −1, −3}, and q=27; or the sequence {$s_n$} is {−3, 1, 3, 3, −1, −1, −3, 3, 3, −3, 3, −3}, and q=28; or the sequence {$s_n$} is {−3, 3, 3, 3, −1, −3, −3, −1, −3, 1, 3, −3}, and q=29; or the sequence {$s_n$} is {−1, −3, 3, −1, −3, −3, −3, −1, 1, −1, 1, −3}, and q=30.

It should be noted that all the foregoing combinations of the sequence {$s_n$} and q may be considered as a whole; in other words, all the combinations may be considered as one combination set. Certainly, a part of all the combinations of the sequence {$s_n$} and q in this embodiment of the present invention may be considered as a whole; in other words, a part of combinations may be considered as one combination set.

Based on this optional implementation, when M=36, and the sequence group includes the sequence {$x_n$}, the sequence {$y_m$}, and the sequence {$h_j$}, a combination manner of the sequence {$y_m$} and the sequence {$h_j$} satisfies $u=\lfloor \bar{u}+1/2 \rfloor$, and $=J_{prime} \cdot q/31$. A length of the sequence {$h_j$} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {$f_n$} is mapped to N subcarriers, and a center-frequency spacing of any two adjacent subcarriers in the N subcarriers is 2t times a subcarrier spacing. A sequence $\{g_m\}$ and the sequence $\{h_j\}$ are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence $\{x_n\}$ and a sequence $\{y_m\}$ or a sequence $\{h_j\}$ in different sequence groups, whose cross-correlation value is greater than 0.8 and a maximum cross-correlation value are shown in Table 11.

TABLE 11

|  | Length-36 sequence | Length-48 sequence | Length-60 sequence | Length-72 sequence |
|---|---|---|---|---|
| Length-12 sequence | 1 | 9 | 3 | 5 |
| Maximum cross-correlation value | 0.8312 | 0.8707 | 0.8309 | 0.9175 |

In a fifth optional implementation, when N=6, a combination of the sequence $\{s_n\}$ and q is at least one of the following combinations:
the sequence $\{s_n\}$ is $\{1, 1, -3, -1, 3, 1\}$, and q=1; or
the sequence $\{s_n\}$ is $\{1, 1, -1, -1, 3, -1\}$, and q=2; or
the sequence $\{s_n\}$ is $\{-3, 1, 3, -3, -3, -3\}$, and q=3; or
the sequence $\{s_n\}$ is $\{-3, -3, -3, 3, 1, -3\}$, and q=4; or
the sequence $\{s_n\}$ is $\{-3, -3, -3, 1, -3, -1\}$, and q=5; or
the sequence $\{s_n\}$ is $\{1, 1, 1, -1, 3, -3\}$, and q=6; or
the sequence $\{s_n\}$ is $\{1, 1, -3, 1, 3, 3\}$, and q=7; or
the sequence $\{s_n\}$ is $\{-1, -3, 1, 3, 3, 1\}$, and q=8; or
the sequence $\{s_n\}$ is $\{-3, -3, -1, 1, -1, -3\}$, and q=9; or
the sequence $\{s_n\}$ is $\{1, 1, 3, -1, 3, 3\}$, and q=10; or
the sequence $\{s_n\}$ is $\{1, 1, 1, -3, -1, 3\}$, and q=1; or
the sequence $\{s_n\}$ is $\{-3, 1, 3, 1, -3, -3\}$, and q=12; or
the sequence $\{s_n\}$ is $\{-3, 3, -1, -1, 3, -3\}$, and q=13; or
the sequence $\{s_n\}$ is $\{1, 1, -1, 3, 1, 3\}$, and q=14; or
the sequence $\{s_n\}$ is $\{1, 1, -3, 3, -1, 1\}$, and q=15; or
the sequence $\{s_n\}$ is $\{1, 1, -3, -1, 3, 1\}$, and q=16; or
the sequence $\{s_n\}$ is $\{1, 1, 3, -1, 1, -1\}$, and q=17; or
the sequence $\{s_n\}$ is $\{-3, -1, 3, 3, -1, -3\}$, and q=18; or
the sequence $\{s_n\}$ is $\{1, 1, -3, -3, 1, -3\}$, and q=19; or
the sequence $\{s_n\}$ is $\{1, 1, 1, -3, 3, -1\}$, and q=20; or
the sequence $\{s_n\}$ is $\{-3, -1, -1, -1, 3, -1\}$, and q=21; or
the sequence $\{s_n\}$ is $\{1, 1, -3, 3, 1, 3\}$, and q=22; or
the sequence $\{s_n\}$ is $\{1, 3, -1, -3, -3, -1\}$, and q=23; or
the sequence $\{s_n\}$ is $\{1, 1, -3, 1, -1, -1\}$, and q=24; or
the sequence $\{s_n\}$ is $\{1, 1, 3, -1, -3, 3\}$, and q=25; or
the sequence $\{s_n\}$ is $\{-3, 1, -3, -3, -3, -1\}$, and q=26; or
the sequence $\{s_n\}$ is $\{-3, -1, 1, -3, 1, -1\}$, and q=27; or
the sequence $\{s_n\}$ is $\{-3, 1, -1, -3, -3, -3\}$, and q=28; or
the sequence $\{s_n\}$ is $\{1, 1, 3, 3, -1, 3\}$, and q=29; or
the sequence $\{s_n\}$ is $\{1, 1, -3, 3, -1, 1\}$, and q=30.

It should be noted that all the foregoing combinations of the sequence $\{s_n\}$ and q may be considered as a whole; in other words, all the combinations may be considered as one combination set. Certainly, a part of all the combinations of the sequence $\{s_n\}$ and q in this embodiment of the present invention may be considered as a whole; in other words, a part of combinations may be considered as one combination set.

In a sixth optional implementation, when N=6, a combination of the sequence $\{s_n\}$ and q is at least one of the following combinations:
the sequence $\{s_n\}$ is $\{-3, -1, 3, 3, -1, -3\}$, and q=1; or
the sequence $\{s_n\}$ is $\{-3, 3, -1, -1, 3, -3\}$, and q=2; or
the sequence $\{s_n\}$ is $\{-3, 1, 3, -3, -3, -3\}$, and q=3; or
the sequence $\{s_n\}$ is $\{-3, -3, -3, 3, 1, -3\}$, and q=4; or
the sequence $\{s_n\}$ is $\{1, 1, -3, -1, 3, 1\}$, and q=5; or
the sequence $\{s_n\}$ is $\{1, 1, -3, 3, -1, 1\}$, and q=6; or
the sequence $\{s_n\}$ is $\{1, 1, -1, -1, 3, -1\}$, and q=7; or
the sequence $\{s_n\}$ is $\{-1, -3, 1, 3, 3, 1\}$, and q=; or
the sequence $\{s_n\}$ is $\{1, 1, -3, 1, -1, -1\}$, and q=9; or
the sequence $\{s_n\}$ is $\{1, 1, 1, -3, -1, 3\}$, and q=10; or
the sequence $\{s_n\}$ is $\{1, 1, 3, -1, -3, 3\}$, and q=11; or
the sequence $\{s_n\}$ is $\{-3, 1, 3, 1, -3, -3\}$, and q=12; or
the sequence $\{s_n\}$ is $\{1, 1, 3, 3, -1, 3\}$, and q=13; or
the sequence $\{s_n\}$ is $\{1, 1, 1, -3, 3, -1\}$, and q=14; or
the sequence $\{s_n\}$ is $\{1, 1, 1, -1, 3, -3\}$, and q=15; or
the sequence $\{s_n\}$ is $\{-3, -1, -1, -1, 3, -1\}$, and q=16; or
the sequence $\{s_n\}$ is $\{-3, -3, -1, 1, -1, -3\}$, and q=17; or
the sequence $\{s_n\}$ is $\{-3, -3, -3, 1, -3, -1\}$, and q=18; or
the sequence $\{s_n\}$ is $\{1, 1, -3, 3, -1, 1\}$, and q=19; or
the sequence $\{s_n\}$ is $\{1, 1, -3, -1, 3, 1\}$, and q=20; or
the sequence $\{s_n\}$ is $\{-3, 1, -3, -3, -3, -1\}$, and q=21; or
the sequence $\{s_n\}$ is $\{1, 1, -3, 3, 1, 3\}$, and q=22; or
the sequence $\{s_n\}$ is $\{1, 3, -1, -3, -3, -1\}$, and q=23; or
the sequence $\{s_n\}$ is $\{1, 1, -3, 3, 1, -3\}$, and q=24; or
the sequence $\{s_n\}$ is $\{1, 1, 3, -1, 3, 3\}$, and q=25; or
the sequence $\{s_n\}$ is $\{1, 1, -3, 1, 3, 3\}$, and q=26; or
the sequence $\{s_n\}$ is $\{-3, -1, 1, -3, 1, -1\}$, and q=27; or
the sequence $\{s_n\}$ is $\{-3, 1, -1, -3, -3, -3\}$, and q=28; or
the sequence $\{s_n\}$ is $\{1, 1, 3, -1, 1, -1\}$, and q=29; or
the sequence $\{s_n\}$ is $\{1, 1, -1, 3, 1, 3\}$, and q=30.

It should be noted that all the foregoing combinations of the sequence $\{s_n\}$ and q may be considered as a whole; in other words, all the combinations may be considered as one combination set. Certainly, a part of all the combinations of the sequence $\{s_n\}$ and q in this embodiment of the present invention may be considered as a whole; in other words, a part of combinations may be considered as one combination set.

In a seventh optional implementation, when N=24, a combination of the sequence $\{s_n\}$ and q is at least one of the following combinations:
the sequence $\{s_n\}$ is $\{-1, -3, 3, -1, 3, 1, 3, -1, 1, -3, -1, -3, -1, 1, 3, -3, -1, -3, 3, 3, 3, -3, -3, -3\}$, and q=1; or
the sequence $\{s_n\}$ is $\{-3, 3, 1, 3, -1, 1, -3, 1, -3, 1, -1, -3, -1, -3, -3, -3, -3, -1, -1, -1, 1, 1, -3, -3\}$, and q=2; or
the sequence $\{s_n\}$ is $\{-1, -3, 3, 1, 1, -3, 1, -3, -3, 1, -3, -1, -1, 3, -3, 3, 3, 3, -3, 1, 3, 3, -3, -3\}$, and q=3; or
the sequence $\{s_n\}$ is $\{1, -3, 3, -1, -3, -1, 3, 3, 1, -1, 1, 1, 3, -3, -1, -3, -3, -3, -1, 3, -3, -1, -3, -3\}$, and q=4; or
the sequence $\{s_n\}$ is $\{-1, 3, -3, -3, -1, 3, -1, -1, 1, 3, 1, 3, -1, -1, -3, 1, 3, 1, -1, -3, 1, -1, -3, -3\}$, and q=5; or
the sequence $\{s_n\}$ is $\{-3, 1, -3, 3, -3, 1, -3, 3, 1, -1, -3, -1, -3, -3, -3, -3, 1, 3, -1, 1, 3, 3, 3, -3\}$, and q=6; or
the sequence $\{s_n\}$ is $\{3, -1, 1, -1, 3, -3, 1, 1, 3, -1, -3, 3, 1, -3, 3, -1, -1, -1, -1, 1, -3, -3, -3, -3\}$, and q=7; or
the sequence $\{s_n\}$ is $\{-3, 1, 3, -1, 1, -1, 3, -3, 3, -1, -3, -1, -3, 3, -1, -1, -1, -3, -1, -1, -3, 3, 3, -3\}$, and q=8; or
the sequence $\{s_n\}$ is $\{-3, 1, -3, 3, -1, -1, -1, -3, 3, 1, -3, -1, 1, 3, -1, 1, -1, -3, -3, -3, -3, -3\}$, and q=9; or
the sequence $\{s_n\}$ is $\{1, 1, -1, -3, -1, 1, 1, -3, 1, -1, 1, -3, 3, -3, -3, 3, -1, -3, 1, 3, -3, 1, -3, -3\}$, and q=10; or the sequence {$s_n$} is {−3, −3, −3, −1, 3, −3, 3, 1, 3, 1, −3, −1, −1, −3, 1, 1, 3, 1, −1, −3, 3, 1, 3, −3}, and q=; or
the sequence {$s_n$} is {−3, 3, −1, 3, 1, −1, −1, −1, 3, 3, 1, 1, 1, 3, 3, 1, −3, −3, −1, 1, −3, 1, 3, −3}, and q=12; or
the sequence {$s_n$} is {3, −3, 3, −1, −3, 1, 3, 1, −1, −1, −3, −1, 3, −3, 3, −1, −1, 3, 3, −3, −3, 3, −3, −3}, and q=13; or
the sequence {$s_n$} is {−3, 3, −1, 3, −1, 3, 3, 1, 1, −3, 1, 3, −3, 3, −3, −3, −1, 1, 3, −3, −1, −1, −3, −3}, and q=14; or
the sequence {$s_n$} is {−3, 1, −3, −1, −1, 3, 1, 3, −3, 1, −1, 3, 3, −1, −3, 3, −3, −1, −1, −3, −3, −3, 3, −3}, and q=15;
or the sequence {$s_n$} is {−3, −1, −1, −3, 1, −3, −3, −1, −1, 3, −1, 1, −1, 3, 1, −3, −1, 3, 1, 1, −1, −1, −3, −3}, and q=16; or
the sequence {$s_n$} is {3, −3, −3, −1, 3, 3, −3, −1, 3, 1, 1, 1, 3, −1, 3, −3, −1, 3, −1, 3, 1, −1, −3, −3}, and q=17; or
the sequence {$s_n$} is {3, −1, 3, −1, 1, −3, 1, 1, −3, −3, 3, −3, −1, −1, −1, −1, −1, −3, −3, −1, 1, 1, −3, −3}, and q=18; or
the sequence {$s_n$} is {−3, 1, −3, 1, −3, −3, 1, −3, 1, −3, −3, −3, −3, −3, 1, −3, −3, 1, 1, −3, 1, 1, −3, −3}, and q=19; or
the sequence {$s_n$} is {−3, −3, 3, 3, 1, −1, −1, −1, 1, −3, −1, 1, −1, 3, −3, −1, −3, −1, −1, 1, −3, 3, −1, −3}, and q=20; or
the sequence {$s_n$} is {−3, −3, −1, −1, −1, −3, 1, −1, −3, −1, 3, −3, 1, −3, 3, −3, 3, 3, 1, −1, −1, 1, −3, −3}, and q=21; or
the sequence {$s_n$} is {−3, −1, 1, −3, −1, −1, 1, 1, 1, 3, 3, −1, 1, −1, 1, −1, −1, −3, −3, −3, 3, 1, −1, −3}, and q=22; or
the sequence {$s_n$} is {−1, 3, −1, −1, 3, 3, −1, −1, −1, 3, −1, −3, 1, 3, 1, 1, −3, −3, −3, −1, −3, −1, −3, −3}, and q=23; or
the sequence {$s_n$} is {−1, −3, −3, 1, −1, −1, −3, 1, 3, −1, −3, −1, −1, −3, 1, 1, 3, 1, −3, −1, −1, 3, −3, −3}, and q=24; or
the sequence {$s_n$} is {−3, −1, 1, −3, −3, 1, 1, −3, 3, −1, −1, −3, 1, 3, 1, −1, −3, −1, −3, 1, −3, −3, −3, −3}, and q=25; or
the sequence {$s_n$} is {−3, 3, −1, −3, −1, −1, −1, 3, −1, −1, 3, −3, −1, 3, −3, 3, −3, −1, 3, 1, 1, −1, −3, −3}, and q=26; or
the sequence {$s_n$} is {−3, 1, −1, −3, −3, −1, 1, −3, −1, −3, 1, 1, −1, 1, 1, 3, 3, 3, −1, 1, −1, 1, −1, −3}, and q=27; or
the sequence {$s_n$} is {−3, −3, 1, −1, 3, 3, −3, −1, 1, −1, −1, 1, 1, −1, −1, 3, −3, 1, −3, 1, −1, −1, −1, −3}, and q=28; or
the sequence {$s_n$} is {−3, 1, −3, 1, −3, 1, 1, 3, 1, −3, −3, −1, 1, 3, −1, −3, 3, 1, −1, −3, −3, −3, −3, −3}, and q=29; or
the sequence {$s_n$} is {3, −3, −1, 1, 3, −1, −1, −3, −1, 3, −1, −3, −1, −3, 3, −1, 3, 1, 1, −3, 3, −3, −3, −3}, and q=30.

It should be noted that all the foregoing combinations of the sequence {$s_n$} and q may be considered as a whole; in other words, all the combinations may be considered as one combination set. Certainly, a part of all the combinations of the sequence {$s_n$} and q in this embodiment of the present invention may be considered as a whole; in other words, a part of combinations may be considered as one combination set.

Based on this optional implementation, when M=36, and the sequence group includes the sequence {$x_n$}, the sequence {$y_m$}, and the sequence {$h_j$}, a combination manner of the sequence {$y_m$} and the sequence {$h_j$} satisfies $u=\lfloor \bar{u}+1/2 \rfloor$, and $\bar{u}=J_{prime} \cdot q/31$. A length of the sequence {$h_j$} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {$f_n$} is mapped to N subcarriers, and a center-frequency spacing of any two adjacent subcarriers in the N subcarriers is t times a subcarrier spacing. A sequence {$g_m$} and the sequence {$h_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {$x_n$} and a sequence {$y_m$} or a sequence {$h_j$} in different sequence groups, whose cross-correlation value is greater than 0.6 and a maximum cross-correlation value are shown in Table 12.

TABLE 12

| | Length-36 sequence | Length-48 sequence | Length-60 sequence | Length-72 sequence |
|---|---|---|---|---|
| Length-24 sequence | 1 | 0 | 2 | 1 |
| Maximum cross-correlation value | 0.679 | 0.5939 | 0.6453 | 0.6121 |

In an eighth optional implementation, when N=24, a combination of the sequence {$s_n$} and q is at least one of the following combinations:
the sequence {$s_n$} is {−1, −3, 3, −1, 3, 1, −1, 1, −3, −1, −3, −1, 1, 3, −3, −1, −3, 3, 3, 3, −3, −3, −3}, and q=1; or
the sequence {$s_n$} is {−1, −3, 3, 1, 1, −3, 1, −3, −3, 1, −3, −1, −1, 3, −3, 3, 3, 3, −3, 1, 3, 3, −3, −3}, and q=2; or
the sequence {$s_n$} is {−3, 3, 1, 3, −1, 1, −3, 1, −3, 1, −1, −3, −1, −3, −3, −3, −3, −1, −1, −1, 1, 1, −3, −3}, and q=3; or
the sequence {$s_n$} is {1, −3, 3, −1, −3, −1, 3, 3, 1, −1, 1, 1, 3, −3, −1, −3, −3, −3, −1, 3, −3, −1, −3, −3}, and q=4; or
the sequence {$s_n$} is {3, −1, 3, −1, 1, −3, 1, 1, −3, −3, 3, −3, −1, −1, −1, −1, −3, −3, −1, 1, 1, −3, −3}, and q=5; or
the sequence {$s_n$} is {3, −1, 1, −1, 3, −3, 1, 1, 3, −1, −3, 3, 1, −3, 3, −1, −1, −1, −1, 1, −3, −3, −3, −3}, and q=6; or
the sequence {$s_n$} is {−3, −1, 1, −3, −3, 1, 1, −3, 3, −1, −1, −3, 1, 3, 1, −1, −3, −1, −3, −3, −3, −3}, and q=7; or
the sequence {$s_n$} is {−3, 1, 3, −1, 1, −1, 3, −3, 3, −1, −3, −1, −3, 3, −1, −1, −1, −3, −1, −1, −3, 3, 3, −3}, and q=8; or
the sequence {$s_n$} is {−3, 1, −3, 1, −3, −3, 1, −3, 1, −3, −3, −3, −3, −3, 1, −3, −3, 1, 1, −3, 1, 1, −3, −3}, and q=9; or
the sequence {$s_n$} is {1, 1, −1, −3, −1, 1, 1, −3, 1, −1, 1, −3, 3, −3, −3, 3, −1, −3, 1, 3, −3, 1, −3, −3}, and q=10; or
the sequence {$s_n$} is {3, −3, −3, −1, 3, 3, −3, −1, 3, 1, 1, 1, 3, −1, 3, −3, −1, 3, −1, 3, 1, −1, −3, −3}, and q=11; or the sequence {s$_n$} is {−3, 3, −1, 3, 1, −1, −1, −1, 3, 3, 1, 1, 1, 3, 3, 1, −3, −3, −1, 1, −3, 1, 3, −3}, and q=12; or the sequence {s$_n$} is {−3, −3, 3, 3, 1, −1, −1, −1, 1, −3, −1, 1, −1, 3, −3, −1, −3, −1, −1, 1, −3, 3, −1, −3}, and q=13; or the sequence {s$_n$} is {−3, −3, 1, −1, 3, 3, −3, −1, 1, −1, −1, 1, 1, −1, −1, 3, −3, 1, −3, 1, −1, −1, −1, −3}, and q=14; or the sequence {s$_n$} is {−3, 1, −3, −1, −1, 3, 1, 3, −3, 1, −1, 3, 3, −1, −3, 3, −3, −1, −1, −3, −3, −3, 3, −3}, and q=15; or the sequence {s$_n$} is {−3, −1, −1, −3, 1, −3, −3, −1, −1, 3, −1, 1, −1, 3, 1, −3, −1, 3, 1, 1, −1, −1, −3, −3}, and q=16; or the sequence {s$_n$} is {−3, 1, −3, 3, −1, −1, −1, −3, 3, 1, −1, −3, −1, 1, 3, −1, 1, −1, 1, −3, −3, −3, −3, −3}, and q=17; or the sequence {s$_n$} is {−3, −3, −3, −1, 3, −3, 3, 1, 3, 1, −3, −1, −1, −3, 1, 1, 3, 1, −1, −3, 3, 1, 3, −3}, and q=18; or the sequence {s$_n$} is {−3, 3, −1, 3, −1, 3, 3, 1, 1, −3, 1, 3, −3, 3, −3, −3, −1, 1, 3, −3, −1, −1, −3, −3}, and q=19; or the sequence {s$_n$} is {−1, −3, −3, 1, −1, −1, −3, 1, 3, −1, −3, −1, −1, −3, 1, 1, 3, 1, −3, −1, −1, 3, −3, −3}, and q=20; or the sequence {s$_n$} is {−3, −3, −1, −1, −1, −3, 1, −1, −3, −1, 3, −3, 1, −3, 3, −3, 3, 3, 1, −1, −1, 1, −3, −3}, and q=21; or the sequence {s$_n$} is {3, −3, 3, −1, −3, 1, 3, 1, −1, −1, −3, −1, 3, −3, 3, −1, −1, 3, 3, −3, −3, 3, −3, −3}, and q=22 or the sequence {s$_n$} is {−1, 3, −3, −3, −1, 3, −1, −1, 1, 3, 1, 3, −1, −1, −3, 1, 3, 1, −1, −3, 1, −1, −3, −3}, and q=23; or the sequence {s$_n$} is {−3, 1, −3, 3, −3, 1, −3, 3, 1, −1, −3, −1, −3, −3, −3, −3, 1, 3, −1, 1, 3, 3, 3, −3}, and q=24; or the sequence {s$_n$} is {−3, −1, 1, −3, −1, −1, 1, 1, 1, 3, 3, −1, 1, −1, 1, −1, −1, −3, −3, −3, 3, 1, −1, −3}, and q=25; or the sequence {s$_n$} is {−3, 3, −1, −3, −1, −1, −1, 3, −1, −1, 3, −3, −1, 3, −3, 3, −3, −1, 3, 1, 1, −1, −3, −3}, and q=26; or the sequence {s$_n$} is {−3, 1, −1, −3, −3, −1, 1, −3, −1, −3, 1, 1, −1, 1, 1, 3, 3, 3, −1, 1, −1, 1, −1, −3}, and q=27; or the sequence {s$_n$} is {−1, 3, −1, −1, 3, 3, −1, −1, −1, 3, −1, −3, 1, 3, 1, 1, −3, −3, −3, −1, −3, −1, −3, −3}, and q=28; or the sequence {s$_n$} is {−3, 1, −3, 1, −3, 1, 1, 3, 1, −3, −3, −1, 1, 3, −1, −3, 3, 1, −1, −3, −3, −3, −3, −3}, and q=29; or the sequence {s$_n$} is {3, −3, −1, 1, 3, −1, −1, −3, −1, 3, −1, −3, −1, −3, 3, −1, 3, 1, 1, −3, 3, −3, −3, −3}, and q=30.

It should be noted that all the foregoing combinations of the sequence {s$_n$} and q may be considered as a whole; in other words, all the combinations may be considered as one combination set. Certainly, a part of all the combinations of the sequence {s$_n$} and q in this embodiment of the present invention may be considered as a whole; in other words, a part of combinations may be considered as one combination set.

Based on this optional implementation, when M=36, and the sequence group includes the sequence {x$_n$}, the sequence {y$_m$}, and the sequence {h$_j$}, a combination manner of the sequence {y$_m$} and the sequence {h$_j$} satisfies u=⌊ū+1/2⌋, and ū=J$_{prime}$·q/31. A length of the sequence {h$_j$} is J, a value of J is 48, 60, or 72 and satisfies $$h_j = k_u(j \bmod J_{prime}), k_u(i) = e^{-j \frac{\pi \cdot u \cdot i \cdot (i+1)}{J_{prime}}},$$

i is an integer, 0≤i≤J$_{prime}$−1, and J$_{prime}$ is a largest prime number smaller than J. In addition, a sequence {f$_n$} is mapped to N subcarriers, and a center-frequency spacing of any two adjacent subcarriers in the N subcarriers is t times a subcarrier spacing. A sequence {g$_m$} and the sequence {h$_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {x$_n$} and a sequence {y$_m$} or a sequence {h$_j$} in different sequence groups, whose cross-correlation value is greater than 0.6 and a maximum cross-correlation value are shown in Table 13.

TABLE 13

| | Length-36 sequence | Length-48 sequence | Length-60 sequence | Length-72 sequence |
|---|---|---|---|---|
| Length-24 sequence | 1 | 0 | 2 | 1 |
| Maximum cross-correlation value | 0.679 | 0.5939 | 0.6453 | 0.6121 |

In a ninth optional implementation, when N=12, combinations of the sequence {s$_n$} and q are a part or all of the following combinations:

the sequence {s$_n$} is {−3, 1, −3, −3, −3, 3, −3, −1, 1, 1, 1, −3}, and q=1; or the sequence {s$_n$} is {−3, 3, 1, −3, 1, 3, −1, −1, 1, 3, 3, 3}, and q=2; or the sequence {s$_n$} is {−3, 3, 3, 1, −3, 3, −1, 1, 3, −3, 3, −3}, and q=3; or the sequence {s$_n$} is {−3, 3, 1, 3, −3, 1, 1, 1, 1, 3, −3, 3}, and q=4; or the sequence {s$_n$} is {−1, 1, 1, −1, 1, 3, 3, −1, −1, −3, 1, −3}, and q=5; or the sequence {s$_n$} is {−3, −3, 3, 1, −3, −3, −3, −1, 3, −1, 1, 3}, and q=6; or the sequence {s$_n$} is {1, −1, 3, −1, −1, −1, −3, −1, 1, 1, 1, −3}, and q=7; or the sequence {s$_n$} is {−3, −3, −1, 3, 3, 3, −3, 3, −3, 1, −1, −3}, and q=8; or the sequence {s$_n$} is {−3, 3, 3, 3, −1, −3, −3, −1, −3, 1, 3, −3}, and q=9; or the sequence {s$_n$} is {−3, 3, −3, 3, 3, −3, −1, −1, 3, 3, 1, −3}, and q=10; or the sequence {s$_n$} is {1, 3, −3, 1, 3, 3, 3, 1, −1, 1, −1, 3}, and q=11; or the sequence {s$_n$} is {−3, 1, −1, −1, 3, 3, −3, −1, −1, −3, −1, −3}, and q=12; or the sequence {s$_n$} is {−1, −3, 3, −1, −3, −3, −3, −1, 1, −1, 1, −3}, and q=13; or the sequence {s$_n$} is {3, 1, 3, 1, 3, −3, −1, 1, 3, 1, −1, −3}, and q=14; or the sequence {s$_n$} is {−3, −1, −3, −1, −1, −3, 3, 3, −1, −1, 1, −3}, and q=1−5 or the sequence {s$_n$} is {−3, 1, 3, −1, −1, −3, −3, −1, −1, 3, 1, −3}, and q=16; or the sequence {s$_n$} is {−1, −1, −1, −1, 1, −3, −1, 3, 3, −1, −3, 1}, and q=17; or the sequence {s$_n$} is {−3, −1, 3, −3, −3, −1, −3, 1, −1, −3, 3, 3}, and q=18; or the sequence {s$_n$} is {−1, 1, 3, −3, 1, −1, 1, −1, −1, −3, 1, −1}, and q=19; or the sequence {s$_n$} is {−3, −1, −1, 1, 3, 1, 1, −1, 1, −1, −3, 1}, and q=20; or
the sequence {s$_n$} is {−3, −3, 3, −3, −1, 3, 3, 3, −1, −3, 1, −3}, and q=21; or
the sequence {s$_n$} is {−3, 1, 3, 3, −1, −1, −3, 3, 3, −3, 3, −3}, and q=22; or
the sequence {s$_n$} is {−3, −1, −1, −3, −3, −1, −3, 3, 1, 3, −1, −3}, and q=23; or
the sequence {s$_n$} is {3, −1, −3, 3, −3, −1, 3, 3, 3, −3, −1, −3}, and q=24; or
the sequence {s$_n$} is {−3, −1, 1, −3, 1, 3, 3, 3, −1, −3, 3, 3}, and q=25; or
the sequence {s$_n$} is {−3, −1, 3, 1, −3, −1, −3, 3, 1, 3, 3, 1}, and q=26; or
the sequence {s$_n$} is {−3, 3, −3, 3, −3, −3, 3, −1, −1, 1, 3, −3}, and q=27; or
the sequence {s$_n$} is {−3, −3, 3, 3, 3, −3, −1, 1, −3, 3, 1, −3}, and q=23; or
the sequence {s$_n$} is {1, −1, 3, 1, 1, −1, −1, −1, 1, 3, −3, 1}, and q=29; or
the sequence {s$_n$} is {−3, 3, 1, −1, 3, 3, −3, 1, −1, 1, −1, 1}, and q=30.

It should be noted that all the foregoing combinations of the sequence {sn} and q may be considered as a whole; in other words, all the combinations may be considered as one combination set. Certainly, a part of all the combinations of the sequence {sn} and q in this embodiment of the present invention may be considered as a whole; in other words, a part of combinations may be considered as one combination set.

Based on this optional implementation, when M=36, and the sequence group includes the sequence {x$_n$}, the sequence {y$_m$}, and the sequence {h$_j$}, a combination manner of the sequence {y$_m$} and the sequence {h$_j$} satisfies u=⌊ū+1/2⌋, and =J$_{prime}$·q/31. A length of the sequence {h$_j$} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, 0≤i≤J$_{prime}$−1, and J$_{prime}$ is a largest prime number smaller than J. In addition, a sequence {f$_n$} is mapped to N subcarriers, and a center-frequency spacing of any two adjacent subcarriers in the N subcarriers is t times a subcarrier spacing. A sequence {g$_m$} and the sequence {h$_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {x$_n$} and a sequence {y$_m$} or a sequence {h$_j$} in different sequence groups, whose cross-correlation value is greater than 0.8 and a maximum cross-correlation value are shown in Table 14.

TABLE 14

|  | Length-36 sequence | Length-48 sequence | Length-60 sequence | Length-72 sequence |
| --- | --- | --- | --- | --- |
| Length-12 sequence | 1 | 1 | 1 | 1 |
| Maximum cross-correlation value | 0.831 | 0.8107 | 0.8034 | 0.8074 |

In a tenth optional implementation, when N=18, combinations of the sequence {s$_n$} and q are a part or all of the following combinations:

the sequence {s$_n$} is {−1, 3, −1, −3, 3, 1, −3, −1, 3, −3, −1, −1, 1, 1, 1, −1, −1, −1}, and q=1; or
the sequence {s$_n$} is {3, −3, 3, −1, 1, 3, −3, −1, −3, −3, −1, −3, 3, 1, −1, 3, −3, 3}, and q=2; or
the sequence {s$_n$} is {−3, 3, 1, −1, −1, 3, −3, −1, 1, 1, 1, 1, 1, −1, 3, −1, −3, −1}, and q=3; or
the sequence {s$_n$} is {−3, −3, 3, 3, −3, 1, 3, −1, −3, 1, −1, −3, 3, −3, −1, −1, −1, 3}, and q=4; or
the sequence {s$_n$} is {1, 1, −1, −1, −3, −1, 1, −3, −3, −3, 1, −3, −1, −1, 1, −1, 3, 1}, and q=5; or
the sequence {s$_n$} is {−3, −3, 1, −1, −1, 1, 1, −3, −1, 3, 3, 3, −1, 3, 1, 3, 1}, and q=6; or
the sequence {s$_n$} is {−3, 3, −1, 1, 3, 1, −3, −1, 1, 1, −3, 1, 3, 3, −1, −3, −3, −3}, and q=7; or
the sequence {s$_n$} is {3, −3, 1, 1, 3, −1, 1, −1, −1, −3, 1, 1, −1, 3, 3, −3, 3, −1}, and q=8; or
the sequence {s$_n$} is {−3, −1, 3, 3, −1, 3, −1, −3, −1, 1, −1, −3, −1, −1, −1, 3, 3, 1}, and q=9; or
the sequence {s$_n$} is {3, −1, 3, 1, −3, −3, −1, 1, −3, −3, 3, 3, 3, 1, 3, −3, 3, −3}, and q=10; or
the sequence {s$_n$} is {−3, −3, −3, 1, −3, 3, 1, 1, 3, −3, −3, 1, 3, −1, 3, −3, −3, 3}, and q=11; or
the sequence {s$_n$} is {−3, −3, 3, 3, 3, −1, −1, −3, −1, −1, −1, 3, 1, −3, −3, −1, 3, −1}, and q=12; or
the sequence {s$_n$} is {−3, −1, −3, −3, 1, 1, −1, −3, −1, −3, −1, −1, 3, 3, −1, 3, 1, 3}, and q=13; or
the sequence {s$_n$} is {−3, −1, −3, −1, −3, 1, 3, −3, −1, 3, 3, 1, −1, −3, 3, −1, −3}, and q=14; or
the sequence {s$_n$} is {−3, 3, −1, −3, −1, −3, 1, 1, −3, −3, −1, −1, 3, −3, 1, 3, 1, 1}, and q=15; or
the sequence {s$_n$} is {−3, −1, −1, −3, 1, −3, 3, −1, −1, −3, 3, 3, −3, −1, 3, −1, −1, −1}, and q=16; or
the sequence {s$_n$} is {−3, 1, −3, −3, 1, −3, −3, 3, 1, −3, −1, −3, −3, −3, −1, 1, 1, 3}, and q=17; or
the sequence {s$_n$} is {−1, −3, 1, −3, −3, −3, 1, 1, 3, 3, −3, 3, 3, −3, −1, 3, −3, 1}, and q=18; or
the sequence {s$_n$} is {−3, 1, −3, −1, −1, 3, 1, −3, −3, −3, −1, −3, −3, 1, 1, 1, −1, −1}, and q=19; or
the sequence {s$_n$} is {3, 3, 3, −3, −1, −3, −1, 3, −1, 1, −1, −3, 1, −3, −3, −1, 3, 3}, and q=20; or
the sequence {s$_n$} is {−3, −3, 3, 3, 3, 1, −3, 1, 3, 3, 1, −3, −3, 3, −1, −3, −1, 1}, and q=21; or
the sequence {s$_n$} is {3, 1, −3, 1, −3, 3, 3, −1, −3, −3, −1, −3, −3, 3, −1, 1, 3}, and q=22; or
the sequence {s$_n$} is {3, −1, −3, 1, −3, −3, 3, 3, −1, 1, −3, −1, 3, 1, 1, 3, 3}, and q=23; or
the sequence {s$_n$} is {−3, −3, 1, −3, 3, 3, 3, −1, 3, 1, 1, −3, −3, −3, 3, −3, −1, −1}, and q=24; or
the sequence {s$_n$} is {1, 1, −3, 3, 3, 1, 3, −3, 3, −1, 1, 1, −1, 1, −3, −3, −1, 3}, and q=25; or
the sequence {s$_n$} is {3, −1, −1, 1, −3, −1, −3, −1, −3, −3, −1, −3, 1, 1, 1, −3, −3, 3}, and q=26; or
the sequence {s$_n$} is {1, −3, −1, −3, 3, 3, −1, −3, 1, −3, −3, −1, −3, −1, 1, 3, 3, 3}, and q=27; or
the sequence {s$_n$} is {1, 1, −3, −3, −3, −3, 1, 3, −3, 3, 3, 1, −3, −1, 3, −1, −3, 1}, and q=28; or
the sequence {s$_n$} is {−3, 1, 1, −3, 1, 1, 3, −3, −1, −3, −1, 3, −3, 3, −1, −1, −1, −3}, and q=29; or
the sequence {s$_n$} is {−3, 3, 1, −1, −1, −1, −1, 1, −1, 3, 3, −3, −1, 1, 3, −1, 3, −1}, and q=30.

It should be noted that all the foregoing combinations of the sequence {s$_n$} and q may be considered as a whole; in other words, all the combinations may be considered as one combination set. Certainly, a part of all the combinations of the sequence {s$_n$} and q in this embodiment of the present invention may be considered as a whole; in other words, a part of combinations may be considered as one combination set.

Based on this optional implementation, when M=36, and the sequence group includes the sequence $\{x_n\}$, the sequence $\{y_m\}$, and the sequence $\{h_j\}$, a combination manner of the sequence $\{y_m\}$ and the sequence $\{h_j\}$ satisfies $u=\lfloor \bar{u}+1/2 \rfloor$, and $\bar{u}=J_{prime} \cdot q/31$. A length of the sequence $\{h_j\}$ is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence $\{f_n\}$ is mapped to N subcarriers, and a center-frequency spacing of any two adjacent subcarriers in the N subcarriers is t times a subcarrier spacing. A sequence $\{g_m\}$ and the sequence $\{h_j\}$ are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence $\{x_n\}$ and a sequence $\{y_m\}$ or a sequence $\{h_j\}$ in different sequence groups, whose cross-correlation value is greater than 0.7 and a maximum cross-correlation value are shown in Table 15.

TABLE 15

| | Length-36 sequence | Length-48 sequence | Length-60 sequence | Length-72 sequence |
|---|---|---|---|---|
| Length-18 sequence | 0 | 0 | 1 | 0 |
| Maximum cross-correlation value | 0.6935 | 0.6978 | 0.70148 | 0.6615 |

In an eleventh optional implementation, when N=18, combinations of the sequence $\{s_n\}$ and q are a part or all of the following combinations:

the sequence $\{s_n\}$ is {3, −3, 1, 1, 3, −1, 1, −1, −1, −3, 1, 1, −1, 3, 3, −3, 3, −1}, and q=1; or
the sequence $\{s_n\}$ is {3, −3, 3, −1, 1, 3, −3, −1, −3, −3, −1, −3, 3, 1, −1, 3, −3, 3}, and q=2; or
the sequence $\{s_n\}$ is {−3, 3, 1, −1, −1, 3, −3, −1, 1, 1, 1, 1, 1, −1, 3, −1, −3, −1}, and q=3; or
the sequence $\{s_n\}$ is {1, 1, −1, −1, −3, −1, 1, −3, −3, −3, 1, −3, −1, −1, 1, −1, 3, 1}, and q=4; or
the sequence $\{s_n\}$ is {1, 1, −3, 3, 3, 1, 3, −3, 3, −1, 1, 1, −1, 1, −3, −3, −1, 3}, and q=5; or
the sequence $\{s_n\}$ is {−3, −3, 1, −3, 3, 3, 3, −1, 3, 1, 1, −3, −3, −3, 3, −3, −1, −1}, and q=6; or
the sequence $\{s_n\}$ is {−3, 3, −1, 1, 3, 1, −3, −1, 1, 1, −3, 1, 3, 3, −1, −3, −3, −3}, and q=7; or
the sequence $\{s_n\}$ is {−1, 3, −1, −3, 3, 1, −3, −1, 3, −3, −1, −1, 1, 1, 1, −1, −1, −1}, and q=8; or
the sequence $\{s_n\}$ is {−3, 1, −3, −3, 1, −3, −3, 3, 1, −3, −1, −3, −3, −3, −1, 1, 1, 3}, and q=9; or
the sequence $\{s_n\}$ is {3, −1, 3, 1, −3, −3, −1, 1, −3, −3, 3, 3, 3, 1, 3, −3, 3, −3}, and q=10; or
the sequence $\{s_n\}$ is {1, −3, −1, −3, 3, 3, −1, −3, 1, −3, −3, −1, −3, −1, 1, 3, 3, 3}, and q=11; or
the sequence $\{s_n\}$ is {−3, −3, 3, 3, 3, −1, −3, −1, −1, 3, 1, −3, −3, −1, 3, −1}, and q=12; or
the sequence $\{s_n\}$ is {−3, −1, −3, −3, 1, 1, −1, −3, −1, −3, −1, −1, 3, 3, −1, 3, 1, 3}, and q=13; or
the sequence $\{s_n\}$ is {−3, −3, 1, −1, −1, 1, 1, −3, −1, 3, 3, 3, 3, −1, 3, 1, 3, 1}, and q=14; or
the sequence $\{s_n\}$ is {−3, 3, −1, −3, −1, −3, 1, 1, −3, −3, −1, −1, 3, −3, 1, 3, 1, 1}, and q=15; or
the sequence $\{s_n\}$ is {−3, −3, 3, 3, −3, 1, 3, −1, −3, 1, −1, −3, 3, −3, −1, −1, −1, 3}, and q=16; or
the sequence $\{s_n\}$ is {−3, −3, 3, 3, 3, 1, −3, 1, 3, 3, 1, −3, −3, 3, −1, −3, −1, 1}, and q=17; or
the sequence $\{s_n\}$ is {−3, −1, 3, 3, −1, 3, −1, −3, −1, 1, −1, −3, −1, −1, −1, 3, 3, 1}, and q=18; or
the sequence $\{s_n\}$ is {−3, 1, −3, −1, −1, 3, 1, −3, −3, −3, −1, −3, −3, 1, 1, 1, −1, −1}, and q=19; or
the sequence $\{s_n\}$ is {3, 3, 3, −3, −1, −3, −1, 3, −1, 1, −1, −3, 1, −3, −3, −1, 3, 3}, and q=20; or
the sequence $\{s_n\}$ is {−3, −1, −3, −1, −3, 1, 3, −3, −1, 3, 3, 3, 1, −1, −3, 3, −1, −3}, and q=21; or
the sequence $\{s_n\}$ is {3, −1, −3, 1, −3, −3, −3, 3, 3, −1, 1, −3, −1, 3, 1, 1, 3, 3}, and q=22; or
the sequence $\{s_n\}$ is {−3, 1, 1, −3, 1, 1, 3, −3, −1, −3, −1, 3, −3, 3, −1, −1, −1, −3}, and q=23; or
the sequence $\{s_n\}$ is {−3, −1, −1, −3, 1, −3, 3, −1, −1, −3, 3, 3, −3, −1, 3, −1, −1, −1}, and q=24; or
the sequence $\{s_n\}$ is {−3, −3, −3, 1, −3, 3, 1, 1, 3, −3, −3, 1, 3, −1, 3, −3, −3, 3}, and q=25; or
the sequence $\{s_n\}$ is {1, 1, −3, −3, −3, −3, 1, 3, −3, 3, 3, 1, −3, −1, 3, −1, −3, 1}, and q=26; or
the sequence $\{s_n\}$ is {3, −1, −1, 1, −3, −1, −3, −1, −3, −3, −1, −3, 1, 1, 1, −3, −3, 3}, and q=27; or
the sequence $\{s_n\}$ is {3, 1, −3, 1, −3, 3, 3, −1, −3, −3, −1, −3, −3, 3, −3, −1, 1, 3}, and q=28; or
the sequence $\{s_n\}$ is {−1, −3, 1, −3, −3, −3, 1, 1, 3, 3, −3, 3, 3, −3, −1, 3, −3, 1}, and q=29; or
the sequence $\{s_n\}$ is {−3, 3, 1, −1, −1, −1, −1, 1, −1, 3, 3, −3, −1, 1, 3, −1, 3, −1}, and q=30.

It should be noted that all the foregoing combinations of the sequence $\{s_n\}$ and q may be considered as a whole; in other words, all the combinations may be considered as one combination set. Certainly, a part of all the combinations of the sequence $\{s_n\}$ and q in this embodiment of the present invention may be considered as a whole; in other words, a part of combinations may be considered as one combination set.

Based on this optional implementation, when M=36, and the sequence group includes the sequence $\{x_n\}$, the sequence $\{y_m\}$, and the sequence $\{h_j\}$, a combination manner of the sequence $\{y_m\}$ and the sequence $\{h_j\}$ satisfies $u=\lfloor \bar{u}+1/2 \rfloor$, and $=J_{prime} \cdot q/31$. A length of the sequence $\{h_j\}$ is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence $\{f_n\}$ is mapped to N subcarriers, and a center-frequency spacing of any two adjacent subcarriers in the N subcarriers is t times a subcarrier spacing. A sequence $\{g_m\}$ and the sequence $\{h_j\}$ are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence $\{x_n\}$ and a sequence $\{y_m\}$ or a sequence $\{h_j\}$ in different sequence groups, whose cross-correlation value is greater than 0.7 and a maximum cross-correlation value are shown in Table 16.

TABLE 16

|  | Length-36 sequence | Length-48 sequence | Length-60 sequence | Length-72 sequence |
|---|---|---|---|---|
| Length-18 sequence | 0 | 0 | 1 | 0 |
| Maximum cross-correlation value | 0.6935 | 0.6978 | 0.70148 | 0.6615 |

In a twelfth optional implementation, when N=12, combinations of the sequence {$s_n$} and q are a part or all of the following combinations:

the sequence {$s_n$} is {−3, 1, −1, −1, 3, 3, −3, −1, −1, −3, −1, −3}, and q=1; or
the sequence {$s_n$} is {−1, 1, 3, −3, 1, −1, 1, −1, −1, −3, 1, −1}, and q=2; or
the sequence {$s_n$} is {−3, 3, 1, −1, 3, 3, −3, 1, −1, 1, −1, 1}, and q=3; or
the sequence {$s_n$} is {−3, −3, 3, −3, −1, 3, 3, 3, −1, −3, 1, −3}, and q=4; or
the sequence {$s_n$} is {−3, 3, −3, 3, −3, −3, 3, −1, −1, 1, 3, −3}, and q=5; or
the sequence {$s_n$} is {3, −1, −3, 3, −3, −1, 3, 3, 3, −3, −1, −3}, and q=6; or
the sequence {$s_n$} is {−3, −3, 3, 3, 3, −3, −1, 1, −3, 3, 1, −3}, and q=7; or
the sequence {$s_n$} is {−3, 1, 3, 3, −1, −1, −3, 3, 3, −3, 3, −3}, and q=8; or
the sequence {$s_n$} is {−3, −3, 3, 1, −3, −3, −3, −1, 3, −1, 1, 3}, and q=9; or
the sequence {$s_n$} is {−3, −1, −1, 1, 3, 1, 1, −1, 1, −1, −3, 1}, and q=10; or
the sequence {$s_n$} is {−3, 3, −3, 3, 3, −3, −1, −1, 3, 3, 1, −3}, and q=11; or
the sequence {$s_n$} is {−3, 1, 3, −1, −1, −3, −3, −1, −1, 3, 1, −3}, and q=12; or
the sequence {$s_n$} is {−3, −3, −1, 3, 3, 3, −3, 3, −3, 1, −1, −3}, and q=13; or
the sequence {$s_n$} is {−3, −1, −1, −3, −3, −1, −3, 3, 1, 3, −1, −3}, and q=14 or
the sequence {$s_n$} is {1, −1, 3, 1, 1, −1, −1, −1, 1, 3, −3, 1}, and q=15; or
the sequence {$s_n$} is {−3, −1, −3, −1, −1, −3, 3, 3, −1, −1, 1, −3}, and q=16; or
the sequence {$s_n$} is {−1, −3, 3, −1, −3, −3, −3, −1, 1, −1, 1, −3}, and q=17; or
the sequence {$s_n$} is {−1, 1, 1, −1, 1, 3, 3, −1, −1, −3, 1, −3}, and q=18; or
the sequence {$s_n$} is {−3, 3, 3, 1, −3, 3, −1, 1, 3, −3, 3, −3}, and q=19; or
the sequence {$s_n$} is {−1, −1, −1, −1, 1, −3, −1, 3, 3, −1, −3, 1}, and q=20; or
the sequence {$s_n$} is {3, 1, 3, 1, 3, −3, −1, 1, 3, 1, −1, −3}, and q=21; or
the sequence {$s_n$} is {−3, −1, 1, −3, 1, 3, 3, 3, −1, −3, 3, 3}, and q=22; or
the sequence {$s_n$} is {−3, −1, 3, 1, −3, −1, −3, 3, 1, 3, 3, 1}, and q=23; or
the sequence {$s_n$} is {−3, 3, 1, −3, 1, 3, −1, −1, 1, 3, 3, 3}, and q=24; or
the sequence {$s_n$} is {1, −1, 3, −1, −1, −1, −3, −1, 1, 1, 1, −3}, and q=25; or
the sequence {$s_n$} is {−3, 3, 1, 3, −3, 1, 1, 1, 1, 3, −3, 3}, and q=26; or
the sequence {$s_n$} is {−3, 1, −3, −3, −3, 3, −3, −1, 1, 1, 1, −3}, and q=27; or
the sequence {$s_n$} is {−3, −1, 3, −3, −3, −1, −3, 1, −1, −3, 3, 3}, and q=28; or
the sequence {$s_n$} is {−3, 3, 3, 3, −1, −3, −3, −1, −3, 1, 3, −3}, and q=29; or
the sequence {$s_n$} is {1, 3, −3, 1, 3, 3, 3, 1, −1, 1, −1, 3}, and q=30.

It should be noted that all the foregoing combinations of the sequence {$s_n$} and q may be considered as a whole; in other words, all the combinations may be considered as one combination set. Certainly, a part of all the combinations of the sequence {$s_n$} and q in this embodiment of the present invention may be considered as a whole; in other words, a part of combinations may be considered as one combination set.

Based on this optional implementation, when M=36, and the sequence group includes the sequence {$x_n$} with a length N=12, the sequence {$x_n$} with a length N=24, the sequence {$y_m$}, and the sequence {$h_j$}, a combination manner of the sequence {$y_m$} and the sequence {$h_j$} satisfies $u=\lfloor \bar{u}+1/2 \rfloor$, and $\bar{u}=J_{prime} \cdot q/31$; and a combination manner of the sequence {$x_n$} with a length N=24 and the sequence {$y_m$} satisfies the seventh optional implementation in the specification. A length of the sequence {$h_j$} is J, a value of J is 48, 60, or 72 and satisfies $$h_j = k_u(j \bmod J_{prime}), k_u(i) = e^{-j \frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {$f_n$} with a length N=12 is mapped to 12 subcarriers, and a center-frequency spacing of any two adjacent subcarriers in the 12 subcarriers is 2t times a subcarrier spacing. A sequence {$f_n$} with a length N=24 is mapped to 24 subcarriers, and a center-frequency spacing of any two adjacent subcarriers in the 24 subcarriers is t times a subcarrier spacing. A sequence {$g_m$} and the sequence {$h_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {$x_n$} with a length N=12 and a sequence with another length in different sequence groups, whose cross-correlation value is greater than 0.8 and a maximum cross-correlation value are shown in Table 17.

TABLE 17

|  | Length-24 sequence | Length-36 sequence | Length-48 sequence | Length-60 sequence | Length-72 sequence |
|---|---|---|---|---|---|
| Length-12 sequence | 5 | 5 | 4 | 3 | 3 |
| Maximum cross correlation value | 0.8469 | 0.8618 | 0.8707 | 0.8412 | 0.824 |

In a thirteenth optional implementation, when N=12, combinations of the sequence {$s_n$} and q are a part or all of the following combinations:

the sequence {$s_n$} is {−3, 3, 1, 3, −3, 1, 1, 1, 1, 3, −3, 3}, and q=1; or
the sequence {$s_n$} is {−3, 3, 1, −1, 3, 3, −3, 1, −1, 1, −1, 1}, and q=2; or
the sequence {$s_n$} is {−3, 1, −1, −1, 3, 3, −3, −1, −1, −3, −1, −3}, and q=3; or the sequence {$s_n$} is {−3, −3, 3, −3, −1, 3, 3, 3, −1, −3, 1, −3}, and q=4; or
the sequence {$s_n$} is {−1, 1, 3, −3, 1, −1, 1, −1, −1, −3, 1, −1}, and q=5; or
the sequence {$s_n$} is {3, −1, −3, 3, −3, −1, 3, 3, 3, −3, −1, −3}, and q=6; or
the sequence {$s_n$} is {−3, −3, 3, 3, 3, −3, −1, 1, −3, 3, 1, −3}, and q=7; or
the sequence {$s_n$} is {−3, 1, 3, 3, −1, −1, −3, 3, 3, −3, 3, −3}, and q=8; or
the sequence {$s_n$} is {−3, −3, 3, 1, −3, −3, −3, −1, 3, −1, 1, 3}, and q=9; or
the sequence {$s_n$} is {−3, −1, −1, 1, 3, 1, 1, −1, 1, −1, −3, 1}, and q=10; or
the sequence {$s_n$} is {−3, 3, −3, 3, 3, −3, −1, −1, 3, 3, 1, −3}, and q=11; or
the sequence {$s_n$} is {−3, 1, 3, −1, −1, −3, −3, −1, −1, 3, 1, −3}, and q=12; or
the sequence {$s_n$} is {−3, −3, −1, 3, 3, 3, −3, 3, −3, 1, −1, −3}, and q=13; or
the sequence {$s_n$} is {−3, −1, 3, −3, −3, −1, −3, 1, −1, −3, 3, 3}, and q=14; or
the sequence {$s_n$} is {1, −1, 3, 1, 1, −1, −1, −1, 1, 3, −3, 1}, and q=15; or
the sequence {$s_n$} is {−3, −1, −3, −1, −1, −3, 3, 3, −1, −1, 1, −3}, and q=16; or
the sequence {$s_n$} is {−1, −3, 3, −1, −3, −3, −3, −1, 1, −1, 1, −3}, and q=17; or
the sequence {$s_n$} is {−1, 1, 1, −1, 1, 3, 3, −1, −1, −3, 1, −3}, and q=18; or
the sequence {$s_n$} is {−3, 3, 3, 1, −3, 3, −1, 1, 3, −3, 3, −3}, and q=19; or
the sequence {$s_n$} is {−1, −1, −1, −1, 1, −3, −1, 3, 3, −1, −3, 1}, and q=20; or
the sequence {$s_n$} is {3, 1, 3, 1, 3, −3, −1, 1, 3, 1, −1, −3}, and q=21; or
the sequence {$s_n$} is {−3, −1, 1, −3, 1, 3, 3, 3, −1, −3, 3, 3}, and q=22; or
the sequence {$s_n$} is {−3, 3, −3, 3, −3, −3, 3, −1, −1, 1, 3, −3}, and q=23; or
the sequence {$s_n$} is {−3, 3, 1, −3, 1, 3, −1, −1, 1, 3, 3, 3}, and q=24; or
the sequence {$s_n$} is {1, −1, 3, −1, −1, −1, −3, −1, 1, 1, 1, −3}, and q=25; or
the sequence {$s_n$} is {−3, −1, −1, −3, −3, −1, −3, 3, 1, 3, −1, −3}, and q=26; or
the sequence {$s_n$} is {−3, 1, −3, −3, 3, −3, −1, 1, 1, 1, −3}, and q=27; or
the sequence {$s_n$} is {−3, −1, 3, 1, −3, −1, −3, 3, 1, 3, 3, 1}, and q=28; or
the sequence {$s_n$} is {−3, 3, 3, 3, −1, −3, −3, −1, −3, 1, 3, −3}, and q=29; or
the sequence {$s_n$} is {1, 3, −3, 1, 3, 3, 3, 1, −1, 1, −1, 3}, and q=30.

It should be noted that all the foregoing combinations of the sequence {$s_n$} and q may be considered as a whole; in other words, all the combinations may be considered as one combination set. Certainly, a part of all the combinations of the sequence {$s_n$} and q in this embodiment of the present invention may be considered as a whole; in other words, a part of combinations may be considered as one combination set.

Based on this optional implementation, when M=36, and the sequence group includes the sequence {$x_n$} with a length N=12, the sequence {$x_n$} with a length N=24, the sequence {$y_m$}, and the sequence {$h_j$}, a combination manner of the sequence {$y_m$} and the sequence {$h_j$} satisfies $u=\lfloor \bar{u}+1/2 \rfloor$, and $\bar{u}=J_{prime} \cdot q/31$; and a combination manner of the sequence {$x_n$} with a length N=24 and the sequence {$y_m$} satisfies the eighth optional implementation in the specification. A length of the sequence {$h_j$} is J, a value of J is 48, 60, or 72 and satisfies $$h_j = k_u(j \bmod J_{prime}), k_u(i) = e^{-j \frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {$f_n$} with a length N=12 is mapped to 12 subcarriers, and a center-frequency spacing of any two adjacent subcarriers in the 12 subcarriers is 2t times a subcarrier spacing. A sequence {$f_n$} with a length N=24 is mapped to 24 subcarriers, and a center-frequency spacing of any two adjacent subcarriers in the 24 subcarriers is t times a subcarrier spacing. A sequence {$g_m$} and the sequence {$h_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {$x_n$} with a length N=12 and a sequence with another length in different sequence groups, whose cross-correlation value is greater than 0.8 and a maximum cross-correlation value are shown in Table 18.

TABLE 18

| | Length-24 sequence | Length-36 sequence | Length-48 sequence | Length-60 sequence | Length-72 sequence |
|---|---|---|---|---|---|
| Length-12 sequence | 6 | 5 | 4 | 3 | 3 |
| Maximum cross correlation value | 0.8469 | 0.8618 | 0.8707 | 0.8412 | 0.824 |

In a fourteenth optional implementation, when N=12, combinations of the sequence {$s_n$} and q are a part or all of the following combinations:
the sequence {$s_n$} is {−3, 3, −3, 3, 3, −3, −1, −1, 3, 3, 1, −3}, and q=1; or
the sequence {$s_n$} is {−3, 3, 1, −3, 1, 3, −1, −1, 1, 3, 3, 3}, and q=2; or
the sequence {$s_n$} is {−3, 3, 3, 1, −3, 3, −1, 1, 3, −3, 3, −3}, and q=3; or
the sequence {$s_n$} is {−3, 3, 1, 3, −3, 1, 1, 1, 1, 3, −3, 3}, and q=4; or
the sequence {$s_n$} is {1, 3, −3, 1, 3, 3, 3, 1, −1, 1, −1, 3}, and q=5; or
the sequence {$s_n$} is {−3, −3, −1, 3, 3, 3, −3, 3, −3, 1, −1, −3}, and q=6; or
the sequence {$s_n$} is {1, −1, 3, −1, −1, −1, −3, −1, 1, 1, 1, −3}, and q=7; or
the sequence {$s_n$} is {−3, −1, −1, 1, 3, 1, 1, −1, 1, −1, −3, 1}, and q=8; or
the sequence {$s_n$} is {−1, 1, 1, −1, 1, 3, 3, −1, −1, −3, 1, −3}, and q=9; or
the sequence {$s_n$} is {−3, −3, 3, −3, −1, 3, 3, 3, −1, −3, 1, −3}, and q=10; or
the sequence {$s_n$} is {−3, 1, −1, −1, 3, 3, −3, −1, −1, −3, −1, −3}, and q=11; or
the sequence {$s_n$} is {−3, −3, 3, 1, −3, −3, −3, −1, 3, −1, 1, 3}, and q=12; or the sequence {$s_n$} is {−3, −1, −1, −3, −3, −1, −3, 3, 1, 3, −1, −3}, and q=13; or the sequence {$s_n$} is {3, 1, 3, 1, 3, −3, −1, 1, 3, 1, −1, −3}, and q=14; or the sequence {$s_n$} is {−3, 1, −3, −3, −3, 3, −3, −1, 1, 1, 1, −3}, and q=15; or the sequence {$s_n$} is {−3, 1, 3, −1, −1, −3, −3, −1, −1, 3, 1, −3}, and q=16; or the sequence {$s_n$} is {−1, −1, −1, −1, 1, −3, −1, 3, 3, −1, −3, 1}, and q=17; or the sequence {$s_n$} is {−1, 1, 3, −3, 1, −1, 1, −1, −1, −3, 1, −1}, and q=18; or the sequence {$s_n$} is {−3, 1, 3, 3, −1, −1, −3, 3, 3, −3, 3, −3}, and q=19; or the sequence {$s_n$} is {−3, −1, 3, 1, −3, −1, −3, 3, 1, 3, 3, 1}, and q=20; or the sequence {$s_n$} is {−1, −3, 3, −1, −3, −3, −3, −1, 1, −1, 1, −3}, and q=21; or the sequence {$s_n$} is {−3, −1, −3, −1, −1, −3, 3, 3, −1, −1, 1, −3}, and q=22; or the sequence {$s_n$} is {−3, 3, 3, 3, −1, −3, −3, −1, −3, 1, 3, −3}, and q=23; or the sequence {$s_n$} is {3, −1, −3, 3, −3, −1, 3, 3, 3, −3, −1, −3}, and q=24; or the sequence {$s_n$} is {−3, −1, 1, −3, 1, 3, 3, 3, −1, −3, 3, 3}, and q=25; or the sequence {$s_n$} is {−3, 3, 1, −1, 3, 3, −3, 1, −1, 1, −1, 1}, and q=26; or the sequence {$s_n$} is {−3, −1, 3, −3, −3, −1, −3, 1, −1, −3, 3, 3}, and q=27; or the sequence {$s_n$} is {−3, −3, 3, 3, 3, −3, −1, 1, −3, 3, 1, −3}, and q=28; or the sequence {$s_n$} is {1, −1, 3, 1, 1, −1, −1, −1, 1, 3, −3, 1}, and q=29; or the sequence {$s_n$} is {−3, 3, −3, 3, −3, −3, 3, −1, −1, 1, 3, −3}, and q=30.

It should be noted that all the foregoing combinations of the sequence {$s_n$} and q may be considered as a whole; in other words, all the combinations may be considered as one combination set. Certainly, a part of all the combinations of the sequence {$s_n$} and q in this embodiment of the present invention may be considered as a whole; in other words, a part of combinations may be considered as one combination set.

Based on this optional implementation, when M=36, and the sequence group includes the sequence {$x_n$} with a length N=12, the sequence {$x_n$} with a length N=18, the sequence {$x_n$} with a length N=24, the sequence {$y_m$}, and the sequence {$h_j$}, a combination manner of the sequence {$y_m$} and the sequence {$h_j$} satisfies u=⌊ū+1/2⌋, and ū=$J_{prime}$·q/31; a combination manner of the sequence {$x_n$} with a length N=18 and the sequence {$y_m$} satisfies the sixteenth optional implementation in the specification; and a combination manner of the sequence {$x_n$} with a length N=24 and the sequence {$y_m$} satisfies the seventh optional implementation in the specification. A length of the sequence {$h_j$} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, 0≤i≤$J_{prime}$−1, and $J_{prime}$ is a largest prime number smaller than J In addition, a sequence {$f_n$} with a length N=12 is mapped to 12 subcarriers, and a center-frequency spacing of any two adjacent subcarriers in the 12 subcarriers is t times a subcarrier spacing. A sequence {$f_n$} with a length N=18 and a sequence {$f_n$} with a length N=24 are respectively mapped to 18 and 24 subcarriers, and a center-frequency spacing of any two adjacent subcarriers in the 18 or 24 subcarriers is t times a subcarrier spacing. A sequence {$g_m$} and the sequence {$h_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {$x_n$} with a length N=12 and a sequence with another length in different sequence groups, whose cross-correlation value is greater than 0.8 and a maximum cross-correlation value are shown in Table 19.

TABLE 19

| | Length-18 sequence | Length-24 sequence | Length-36 sequence | Length-48 sequence | Length-60 sequence | Length-72 sequence |
| --- | --- | --- | --- | --- | --- | --- |
| Length-12 sequence | 10 | 5 | 1 | 2 | 2 | 1 |
| Maximum cross-correlation value | 0.8892 | 0.8373 | 0.831 | 0.8111 | 0.8241 | 0.8074 |

In a fifteenth optional implementation, when N=12, combinations of the sequence {$s_n$} and q are a part or all of the following combinations:

the sequence {$s_n$} is {−3, 1, −3, −3, −3, 3, −3, −1, 1, 1, 1, −3}, and q=1; or the sequence {$s_n$} is {−3, 3, 1, −3, 1, 3, −1, −1, 1, 3, 3, 3}, and q=2; or the sequence {$s_n$} is {−3, 3, 3, 1, −3, 3, −1, 1, 3, −3, 3, −3}, and q=3; or the sequence {$s_n$} is {−3, −3, −1, 3, 3, 3, −3, 3, −3, 1, −1, −3}, and q=4; or the sequence {$s_n$} is {−3, 3, −3, 3, 3, −3, −1, −1, 3, 3, 1, −3}, and q=5; or the sequence {$s_n$} is {−3, −3, 3, 1, −3, −3, −3, −1, 3, −1, 1, 3}, and q=6; or the sequence {$s_n$} is {1, −1, 3, −1, −1, −1, −3, −1, 1, 1, 1, −3}, and q=7; or the sequence {$s_n$} is {1, 3, −3, 1, 3, 3, 3, 1, −1, 1, −1, 3}, and q=8; or the sequence {$s_n$} is {−3, −1, 3, 1, −3, −1, −3, 3, 1, 3, 3, 1}, and q=9; or the sequence {$s_n$} is {−1, 1, 3, −3, 1, −1, 1, −1, −1, −3, 1, −1}, and q=10; or the sequence {$s_n$} is {−3, −1, −1, 1, 3, 1, 1, −1, 1, −1, −3, 1}, and q=11; or the sequence {$s_n$} is {−3, −1, −3, −1, −1, −3, 3, 3, −1, −1, 1, −3}, and q=12; or the sequence {$s_n$} is {−3, −1, 3, −3, −3, −1, −3, 1, −1, −3, 3, 3}, and q=13; or the sequence {$s_n$} is {−3, 3, 1, 3, −3, 1, 1, 1, 1, 3, −3, 3}, and q=14; or
the sequence {$s_n$} is {−3, −3, 3, −3, −1, 3, 3, 3, −1, −3, 1, −3}, and q=15; or
the sequence {$s_n$} is {−3, 1, 3, −1, −1, −3, −3, −1, −1, 3, 1, −3}, and q=16; or
the sequence {$s_n$} is {−1, −1, −1, −1, 1, −3, −1, 3, 3, −1, −3, 1}, and q=17; or
the sequence {$s_n$} is {−1, 1, 1, −1, 1, 3, 3, −1, −1, −3, 1, −3}, and q=18; or
the sequence {$s_n$} is {3, 1, 3, 1, 3, −3, −1, 1, 3, 1, −1, −3}, and q=19; or
the sequence {$s_n$} is {−3, 1, −1, −1, 3, 3, −3, −1, −1, −3, −1, −3}, and q=20; or
the sequence {$s_n$} is {−1, −3, 3, −1, −3, −3, −3, −1, 1, −1, 1, −3}, and q=21; or
the sequence {$s_n$} is {−3, 1, 3, 3, −1, −1, −3, 3, 3, −3, 3, −3}, and q=22; or
the sequence {$s_n$} is {−3, 3, 3, 3, −1, −3, −3, −1, −3, 1, 3, −3}, and q=23; or
the sequence {$s_n$} is {3, −1, −3, 3, −3, −1, 3, 3, 3, −3, −1, −3}, and q=24; or
the sequence {$s_n$} is {−3, −1, 1, −3, 1, 3, 3, 3, −1, −3, 3, 3}, and q=5; or the sequence {$s_n$} is {−3, 3, 1, −1, 3, 3, −3, 1, −1, 1, −1, 1}, and q=26; or
the sequence {$s_n$} is {−3, −1, −1, −3, −3, −1, −3, 3, 1, 3, −1, −3}, and q=27; or
the sequence {$s_n$} is {−3, −3, 3, 3, 3, −3, −1, 1, −3, 3, 1, −3}, and q=28; or
the sequence {$s_n$} is {1, −1, 3, 1, 1, −1, −1, −1, 1, 3, −3, 1}, and q=29; or
the sequence {$s_n$} is {−3, 3, −3, 3, −3, −3, 3, −1, −1, 1, 3, −3}, and q=30.

It should be noted that all the foregoing combinations of the sequence {$s_n$} and q may be considered as a whole; in other words, all the combinations may be considered as one combination set. Certainly, a part of all the combinations of the sequence {$s_n$} and q in this embodiment of the present invention may be considered as a whole; in other words, a part of combinations may be considered as one combination set.

Based on this optional implementation, when M=36, and the sequence group includes the sequence {$x_n$} with a length N=12, the sequence {$x_n$} with a length N=18, the sequence {$x_n$} with a length N=24, the sequence {$y_m$}, and the sequence {$h_j$}, a combination manner of the sequence {$y_m$} and the sequence {$h_j$} satisfies u=⌊ū+1/2⌋, and ū=$J_{prime}$·q/31; a combination manner of the sequence {$x_n$} with a length N=18 and the sequence {$y_m$} satisfies the seventeenth optional implementation in the specification; and a combination manner of the sequence {$x_n$} with a length N=24 and the sequence {$y_m$} satisfies the eighth optional implementation in the specification. A length of the sequence {$h_j$} is J, a value of J is 48, 60, or 72 and satisfies $h_1=$ $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {$f_n$} with a length N=12 is mapped to 12 subcarriers, and a center-frequency spacing of any two adjacent subcarriers in the 12 subcarriers is t times a subcarrier spacing. A sequence {$f_n$} with a length N=18 and a sequence {$f_n$} with a length N=24 are respectively mapped to 18 and 24 subcarriers, and a center-frequency spacing of any two adjacent subcarriers in the 18 or 24 subcarriers is t times a subcarrier spacing. A sequence {$g_m$} and the sequence {$h_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {$x_n$} with a length N=12 and a sequence with another length in different sequence groups, whose cross-correlation value is greater than 0.8 and a maximum cross-correlation value are shown in Table 20.

TABLE 20

|  | Length-18 sequence | Length-24 sequence | Length-36 sequence | Length-48 sequence | Length-60 sequence | Length-72 sequence |
| --- | --- | --- | --- | --- | --- | --- |
| Length-12 sequence | 11 | 5 | 1 | 1 | 1 | 1 |
| Maximum cross-correlation value | 0.8933 | 0.8373 | 0.831 | 0.8107 | 0.8034 | 0.8074 |

In a sixteenth optional implementation, when N=18, combinations of the sequence {$s_n$} and q are a part or all of the following combinations:
the sequence {$s_n$} is {−1, 3, −1, −3, 3, 1, −3, −1, 3, −3, −1, −1, 1, 1, 1, −1, −1, −1}, and q=1; or
the sequence {$s_n$} is {3, −3, 3, −1, 1, 3, −3, −1, −3, −3, −1, −3, 3, 1, −1, 3, −3, 3}, and q=2; or
the sequence {$s_n$} is {−3, 3, 1, −1, −1, 3, −3, −1, 1, 1, 1, 1, 1, −1, 3, −1, −3, −1}, and q=3; or
the sequence {$s_n$} is {1, −3, −1, −3, 3, 3, −1, −3, 1, −3, −3, −1, −3, −1, 1, 3, 3, 3}, and q=4; or
the sequence {$s_n$} is {1, 1, −1, −1, −3, −1, 1, −3, −3, −3, 1, −3, −1, −1, 1, −1, 3, 1}, and q=5; or
the sequence {$s_n$} is {−3, −3, 1, −1, −1, 1, 1, −3, −1, 3, 3, 3, 3, −1, 3, 1, 3, 1}, and q=6; or
the sequence {$s_n$} is {−3, −1, 1, 3, 1, −3, −1, 1, 1, −3, 1, 3, 3, −1, −3, −3, −3}, and q=7; or
the sequence {$s_n$} is {−3, −3, 3, 3, 3, 1, −3, 1, 3, 3, 1, −3, −3, 3, −1, −3, −1, 1}, and q=8; or
the sequence {$s_n$} is {−3, −1, 3, 3, −1, 3, −1, −3, −1, 1, −1, −3, −1, −1, −1, 3, 3, 1}, and q=9; or
the sequence {$s_n$} is {3, −1, 3, 1, −3, −3, −1, 1, −3, −3, 3, 3, 1, 3, −3, 3, −3}, and q=10; or
the sequence {$s_n$} is {3, −1, −1, 1, −3, −1, −3, −1, −3, −3, −1, −3, 1, 1, 1, −3, −3, 3}, and q=11; or
the sequence {$s_n$} is {−3, 1, −3, −3, 1, −3, −3, 3, 1, −3, −1, −3, −3, −3, −1, 1, 1, 3}, and q=12; or
the sequence {$s_n$} is {−3, −1, −3, −3, 1, 1, −1, −3, −1, −3, −1, −1, 3, 3, −3, 3, 1, 3}, and q=13; or
the sequence {$s_n$} is {1, 1, −3, −3, −3, −3, 1, 3, −3, 3, 3, 1, −3, −1, 3, −1, −3, 1}, and q=14; or the sequence {s$_n$} is {−3, 3, −1, −3, −1, −3, 1, 1, −3, −3, −1, −1, 3, −3, 1, 3, 1, 1}, and q=15; or
the sequence {s$_n$} is {−3, −1, −3, −1, −3, 1, 3, −3, −1, 3, 3, 3, 1, −1, −3, 3, −1, −3}, and q=16; or
the sequence {s$_n$} is {−3, −3, 3, 3, −3, 1, 3, −1, −3, 1, −1, −3, 3, −3, −1, −1, −1, 3}, and q=17; or
the sequence {s$_n$} is {−1, −3, 1, −3, −3, −3, 1, 1, 3, 3, −3, 3, 3, −3, −1, 3, −3, 1}, and q=18; or
the sequence {s$_n$} is {−3, 1, −3, −1, −1, 3, 1, −3, −3, −3, −1, −3, −3, 1, 1, 1, −1, −1}, and q=19; or
the sequence {s$_n$} is {3, 3, 3, −3, −1, −3, −1, 3, −1, 1, −1, −3, 1, −3, −3, −1, 3, 3}, and q=20; or
the sequence {s$_n$} is {−3, 1, 1, −3, 1, 1, 3, −3, −1, −3, −1, 3, −3, 3, −1, −1, −1, −3}, and q=21; or
the sequence {s$_n$} is {−3, −3, 3, 3, 3, −1, −1, −3, −1, −1, −1, 3, 1, −3, −3, −1, 3, −1}, and q=22; or
the sequence {s$_n$} is {−3, −1, −1, −3, 1, −3, 3, −1, −1, −3, 3, 3, −3, −1, 3, −1, −1, −1}, and q=23; or
the sequence {s$_n$} is {−3, −3, 1, −3, 3, 3, 3, −1, 3, 1, 1, −3, −3, −3, 3, −3, −1, −1}, and q=24; or
the sequence {s$_n$} is {3, −3, 1, 1, 3, −1, 1, −1, −1, −3, 1, 1, −1, 3, 3, −3, 3, −1}, and q=25; or
the sequence {s$_n$} is {1, 1, −3, 3, 3, 1, 3, −3, 3, −1, 1, 1, −1, 1, −3, −3, −1, 3}, and q=26; or
the sequence {s$_n$} is {3, 1, −3, 1, −3, 3, 3, −1, −3, −3, −1, −3, −3, 3, −3, −1, 1, 3}, and q=27; or
the sequence {s$_n$} is {3, −1, −3, 1, −3, −3, −3, 3, 3, −1, 1, −3, −1, 3, 1, 1, 3, 3}, and q=28; or
the sequence {s$_n$} is {−3, −3, −3, 1, −3, 3, 1, 1, 3, −3, −3, 1, 3, −1, 3, −3, −3, 3}, and q=29; or
the sequence {s$_n$} is {−3, 3, 1, −1, −1, −1, −1, 1, −1, 3, 3, −3, −1, 1, 3, −1, 3, −1}, and q=30.

It should be noted that all the foregoing combinations of the sequence {s$_n$} and q may be considered as a whole; in other words, all the combinations may be considered as one combination set. Certainly, a part of all the combinations of the sequence {s$_n$} and q in this embodiment of the present invention may be considered as a whole; in other words, a part of combinations may be considered as one combination set.

Based on this optional implementation, when M=36, and the sequence group includes the sequence {x$_n$} with a length N=18, the sequence {x$_n$} with a length N=24, the sequence {y$_m$}, and the sequence {h$_j$}, a combination manner of the sequence {y$_m$} and the sequence {h$_j$} satisfies u=⌊ū+1/2⌋, and ū=J$_{prime}$·q/31; and a combination manner of the sequence {x$_n$} with a length N=24 and the sequence {y$_m$} satisfies the seventh optional implementation in the specification. A length of the sequence {h$_j$} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, 0≤i≤J$_{prime}$−1, and J$_{prime}$ is a largest prime number smaller than J. In addition, a sequence {f$_n$} with a length N=18 and a sequence {f$_n$} with a length N=24 are respectively mapped to 18 and 24 subcarriers, and a center-frequency spacing of any two adjacent subcarriers in the 18 or 24 subcarriers is t times a subcarrier spacing. A sequence {g$_m$} and the sequence {h$_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {x$_n$} with a length N=18 and a sequence with another length in different sequence groups, whose cross-correlation value is greater than 0.7 and a maximum cross-correlation value are shown in Table 21.

TABLE 21

|  | Length-24 sequence | Length-36 sequence | Length-48 sequence | Length-60 sequence | Length-72 sequence |
|---|---|---|---|---|---|
| Length-18 sequence | 2 | 1 | 0 | 2 | 0 |
| Maximum cross-correlation value | 0.712 | 0.7192 | 0.6978 | 0.7387 | 0.6615 |

In a seventeenth optional implementation, when N=18, combinations of the sequence {s$_n$} and q are a part or all of the following combinations:
the sequence {s$_n$} is {3, −3, 1, 1, 3, −1, 1, −1, −1, −3, 1, 1, −1, 3, 3, −3, 3, −1}, and q=1; or
the sequence {s$_n$} is {3, −3, 3, −1, 1, 3, −3, −1, −3, −3, −1, −3, 3, 1, −1, 3, −3, 3}, and q=2; or
the sequence {s$_n$} is {−3, 3, 1, −1, −1, 3, −3, −1, 1, 1, 1, 1, 1, −1, 3, −1, −3, −1}, and q=3; or
the sequence {s$_n$} is {1, 1, −1, −1, −3, −1, 1, −3, −3, −3, 1, −3, −1, −1, 1, −1, 3, 1}, and q=4; or
the sequence {s$_n$} is {1, 1, −3, 3, 3, 1, 3, −3, 3, −1, 1, 1, −1, 1, −3, −3, −1, 3}, and q=5; or
the sequence {s$_n$} is {−3, −3, 1, −3, 3, 3, 3, −1, 3, 1, 1, −3, −3, −3, 3, −3, −1, −1}, and q=6; or
the sequence {s$_n$} is {−3, 3, −1, 1, 3, 1, −3, −1, 1, 1, −3, 1, 3, 3, −1, −3, −3, −3}, and q=7; or
the sequence {s$_n$} is {−1, 3, −1, −3, 3, 1, −3, −1, 3, −3, −1, −1, 1, 1, 1, −1, −1, −1}, and q=8; or
the sequence {s$_n$} is {−3, 1, −3, −3, 1, −3, −3, 3, 1, −3, −1, −3, −3, −3, −1, 1, 1, 3}, and q=9; or
the sequence {s$_n$} is {3, −1, 3, 1, −3, −3, −1, 1, −3, −3, 3, 3, 3, 1, 3, −3, 3, −3}, and q=10; or
the sequence {s$_n$} is {−3, −3, 3, 3, −3, 1, 3, −1, −3, 1, −1, −3, 3, −3, −1, −1, −1, 3}, and 7=11; or
the sequence {s$_n$} is {−3, −3, 3, 3, 3, −1, −1, −3, −1, −1, −1, 3, 1, −3, −3, −1, 3, −1}, and q=12; or
the sequence {s$_n$} is {−3, −1, −3, −3, 1, 1, −1, −3, −1, −3, −1, −1, 3, 3, −1, 3, 1, 3}, and q=13; or
the sequence {s$_n$} is {1, −3, −1, −3, 3, 3, −1, −3, 1, −3, −3, −1, −3, −1, 1, 3, 3, 3}, and q=14; or
the sequence {s$_n$} is {−3, 3, −1, −3, −1, −3, 1, 1, −3, −3, −1, −1, 3, −3, 1, 3, 1, 1}, and q=15; or
the sequence {s$_n$} is {−3, −3, 1, −1, −1, 1, 1, −3, −1, 3, 3, 3, 3, −1, 3, 1, 3, 1}, and q=16; or
the sequence {s$_n$} is {−3, −3, 3, 3, 3, 1, −3, 1, 3, 3, 1, −3, −3, 3, −1, −3, −1, 1}, and q=17; or
the sequence {s$_n$} is {−3, −1, 3, 3, −1, 3, −1, −3, −1, 1, −1, −3, −1, −1, −1, 3, 3, 1}, and 7=18; or
the sequence {s$_n$} is {−3, 1, −3, −1, −1, 3, 1, −3, −3, −3, −1, −3, −3, 1, 1, 1, −1, −1}, and q=19 or the sequence {s$_n$} is {3, 3, 3, −3, −1, −3, −1, 3, −1, 1, −1, −3, 1, −3, −3, −1, 3, 3}, and q=20; or
the sequence {s$_n$} is {−3, 1, 1, −3, 1, 1, 3, −3, −1, −3, −1, 3, −3, 3, −1, −1, −1, −3}, and q=21; or
the sequence {s$_n$} is {−3, −1, −3, −1, −3, 1, 3, −3, −1, 3, 3, 3, 1, −1, −3, 3, −1, −3}, and q=22; or
the sequence {s$_n$} is {3, −1, −3, 1, −3, −3, −3, 3, 3, −1, 1, −3, −1, 3, 1, 1, 3, 3}, and q=23; or
the sequence {s$_n$} is {−3, −3, −3, 1, −3, 3, 1, 1, 3, −3, −3, 1, 3, −1, 3, −3, −3, 3}, and q=24; or the sequence {$s_n$} is {1, 1, −3, −3, −3, −3, 1, 3, −3, 3, 3, 1, −3, −1, 3, −1, −3, 1}, and q=25; or the sequence {$s_n$} is {3, −1, −1, 1, −3, −1, −3, −1, −3, −3, −1, −3, 1, 1, 1, −3, −3, 3}, and q=26; or the sequence {$s_n$} is {3, 1, −3, 1, −3, 3, 3, −1, −3, −3, −1, −3, −3, 3, −3, −1, 1, 3}, and q=27; or the sequence {$s_n$} is {−3, −1, −1, −3, 1, −3, 3, −1, −1, −3, 3, 3, −3, −1, 3, −1, −1, −1}, and q=28; or the sequence {$s_n$} is {−1, −3, 1, −3, −3, −3, 1, 1, 3, 3, −3, 3, 3, −3, −1, 3, −3, 1}, and q=29; or the sequence {$s_n$} is {−3, 3, 1, −1, −1, −1, −1, 1, −1, 3, 3, −3, −1, 1, 3, −1, 3, −1}, and q=30.

It should be noted that all the foregoing combinations of the sequence {$s_n$} and q may be considered as a whole; in other words, all the combinations may be considered as one combination set. Certainly, a part of all the combinations of the sequence {$s_n$} and q in this embodiment of the present invention may be considered as a whole; in other words, a part of combinations may be considered as one combination set.

Based on this optional implementation, when M=36, and the sequence group includes the sequence {$x_n$} with a length N=18, the sequence {$x_n$} with a length N=24, the sequence {$y_m$}, and the sequence {$h_j$}, a combination manner of the sequence {$y_m$} and the sequence {$h_j$} satisfies $u=\lfloor \bar{u}+1/2 \rfloor$, and $\bar{u}=J_{prime} \cdot q/31$; and a combination manner of the sequence {$x_n$} with a length N=24 and the sequence {$y_m$} satisfies the seventh optional implementation in the specification. A length of the sequence {$h_j$} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {$f_n$} with a length N=18 and a sequence {$f_n$} with a length N=24 are respectively mapped to 18 and 24 subcarriers, and a center-frequency spacing of any two adjacent subcarriers in the 18 or 24 subcarriers is t times a subcarrier spacing. A sequence {$g_m$} and the sequence {$h_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {$x_n$} with a length N=18 and a sequence with another length in different sequence groups, whose cross-correlation value is greater than 0.7 and a maximum cross-correlation value are shown in Table 22.

TABLE 22

|  | Length-24 sequence | Length-36 sequence | Length-48 sequence | Length-60 sequence | Length-72 sequence |
| --- | --- | --- | --- | --- | --- |
| Length 18 sequence | 6 | 0 | 0 | 1 | 0 |
| Maximum cross-correlation value | 0.7412 | 0.6935 | 0.6978 | 0.7015 | 0.6615 |

In an eighteenth optional implementation, when N=24, a combination of the sequence {$s_n$} and q is at least one of the following combinations:

the sequence {$s_n$} is {−1, −3, 3, −1, 3, 1, 3, −1, 1, −3, −1, −3, −1, 1, 3, −3, −1, −3, 3, 3, 3, −3, −3, −3}, and q=1; or the sequence {$s_n$} is {−1, −3, 3, 1, 1, −3, 1, −3, −3, 1, −3, −1, −1, 3, −3, 3, 3, 3, −3, 1, 3, 3, −3, −3}, and q=2; or the sequence {$s_n$} is {−1, −3, −3, 1, −1, −1, −3, 1, 3, −1, −3, −1, −1, −3, 1, 1, 3, 1, −3, −1, −1, 3, −3, −3}, and q=3; or the sequence {$s_n$} is {1, −3, 3, −1, −3, −1, 3, 3, 1, −1, 1, 1, 3, −3, −1, −3, −3, −3, −1, 3, −3, −1, −3, −3}, and q=4; or the sequence {$s_n$} is {−3, 3, 1, 3, −1, 1, −3, 1, −3, 1, −1, −3, −1, −3, −3, −3, −3, −1, −1, −1, 1, 1, −3, −3}, and q=5; or the sequence {$s_n$} is {−3, −1, 1, −3, −3, 1, 1, −3, 3, −1, −1, −3, 1, 3, 1, −1, −3, −1, −3, 1, −3, −3, −3, −3}, and q=6; or the sequence {$s_n$} is {−3, 1, −3, 1, −3, −3, 1, −3, 1, −3, −3, −3, −3, −3, 1, −3, −3, 1, 1, −3, 1, 1, −3, −3}, and q=7; or the sequence {$s_n$} is {−3, 1, 3, −1, 1, −1, 3, −3, −1, −3, −1, −3, 3, −1, −1, −1, −3, −1, −1, −3, 3, 3, −3}, and q=8; or the sequence {$s_n$} is {−3, −3, 3, 3, 1, −1, −1, −1, 1, −3, −1, 1, −1, 3, −3, −1, −3, −1, −1, 1, −3, 3, −1, −3}, and q=9; or the sequence {$s_n$} is {1, 1, −1, −3, −1, 1, 1, −3, 1, −1, 1, −3, 3, −3, −3, 3, −1, −3, 1, 3, −3, 1, −3, −3}, and q=10; or the sequence {$s_n$} is {−3, −3, 1, −1, 3, 3, −3, −1, 1, −1, −1, 1, 1, −1, −1, 3, −3, 1, −3, 1, −1, −1, −1, −3}, and q=11; or the sequence {$s_n$} is {−3, 3, −1, 3, 1, −1, −1, −1, 3, 3, 1, 1, 3, 3, 1, −3, −3, −1, 1, −3, 1, 3, −3}, and q=12; or the sequence {$s_n$} is {3, −3, 3, −1, −3, 1, 3, 1, −1, −1, −3, −1, 3, −3, 3, −1, −1, 3, 3, −3, 3, −3, −3}, and q=13; or the sequence {$s_n$} is {−3, 3, −1, 3, −1, 3, 3, 1, 1, −3, 1, 3, −3, 3, −3, −3, −1, 1, 3, −3, −1, −1, −3, −3}, and q=14; or the sequence {$s_n$} is {−3, 1, −3, −1, −1, 3, 1, 3, −3, 1, −1, 3, 3, −1, −3, 3, −3, −1, −1, −3, −3, −3, 3, −3}, and q=15; or the sequence {$s_n$} is {−3, −1, −1, −3, 1, −3, −3, −1, −1, 3, −1, 1, −1, 3, 1, −3, −1, 3, 1, 1, −1, −1, −3, −3}, and q=16; or the sequence {$s_n$} is {−3, 1, −3, 3, −1, −1, −1, −3, 3, 1, −1, −3, −1, 1, 3, −1, 1, 1, −3, −3, −3, −3, −3, −3}, and q=17; or the sequence {$s_n$} is {3, −1, 3, −1, 1, −3, 1, 1, −3, −3, 3, −3, −1, −1, −1, −1, −1, −3, −3, −1, 1, 1, −3, −3}, and q=18; or the sequence {$s_n$} is {−3, −3, −3, −1, 3, −3, 3, 1, 3, 1, −3, −1, −1, −3, 1, 1, 3, 1, −1, −3, 3, 1, 3, −3}, and q=19; or the sequence {$s_n$} is {−1, 3, −3, −3, −1, 3, −1, −1, 1, 3, 1, 3, −1, −1, −3, 1, 3, 1, −1, −3, 1, −1, −3, −3}, and q=20; or the sequence {$s_n$} is {−3, −3, −1, −1, −1, −3, 1, −1, −3, −1, 3, −3, 1, −3, 3, −3, 3, 3, 1, −1, −1, 1, −3, −3}, and q=21; or the sequence {$s_n$} is {3, −1, 1, −1, 3, −3, 1, 1, 3, −1, −3, 3, 1, −3, 3, −1, −1, −1, −1, 1, −3, −3, −3, −3}, and q=22 or the sequence {$s_n$} is {−3, 1, −3, 3, −3, 1, −3, 3, 1, −1, −3, −1, −3, −3, −3, −3, 1, 3, −1, 1, 3, 3, 3, −3}, and q=23; or the sequence {$s_n$} is {−3, −1, 1, −3, −1, −1, 1, 1, 1, 3, 3, −1, 1, −1, 1, −1, −1, −3, −3, 3, 1, −1, −3}, and q=24; or the sequence {$s_n$} is {−3, 3, −1, −3, −1, −1, −1, 3, −1, −1, 3, −3, −1, 3, −3, 3, −3, −1, 3, 1, 1, −1, −3, −3}, and q=25; or the sequence {$s_n$} is {−3, 1, −1, −3, −3, −1, 1, −3, −1, −3, 1, 1, −1, 1, 1, 3, 3, 3, −1, 1, −1, 1, −1, −3}, and q=26; or the sequence {$s_n$} is {−1, 3, −1, −1, 3, 3, −1, −1, −1, 3, −1, −3, 1, 3, 1, 1, −3, −3, −3, −1, −3, −1, −3, −3}, and q=27; or the sequence {$s_n$} is {3, −3, −3, −1, 3, 3, −3, −1, 3, 1, 1, 1, 3, −1, 3, −3, −1, 3, −1, 3, 1, −1, −3, −3}, and q=28; or the sequence {$s_n$} is {−3, 1, −3, 1, −3, 1, 1, 3, 1, −3, −3, −1, 1, 3, −1, −3, 3, 1, −1, −3, −3, −3, −3, −3}, and q=29; or the sequence {$s_n$} is {3, −3, −1, 1, 3, −1, −1, −3, −1, 3, −1, −3, −1, −3, 3, −1, 3, 1, 1, −3, 3, −3, −3, −3}, and q=30.

It should be noted that all the foregoing combinations of the sequence {$s_n$} and q may be considered as a whole; in other words, all the combinations may be considered as one combination set. Certainly, a part of all the combinations of the sequence {$s_n$} and q in this embodiment of the present invention may be considered as a whole; in other words, a part of combinations may be considered as one combination set.

Based on this optional implementation, when M=36, and the sequence group includes the sequence {$x_n$}, the sequence {$y_m$}, and the sequence {$h_j$}, a combination manner of the sequence {$y_m$} and the sequence {$h_j$} satisfies $u = \lfloor \bar{u}+1/2 \rfloor$, and $\bar{u} = J_{prime} \cdot q/31$. A length of the sequence {$h_j$} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {$f_n$} is mapped to N subcarriers, and a center-frequency spacing of any two adjacent subcarriers in the N subcarriers is t times a subcarrier spacing. A sequence {$g_m$} and the sequence {$h_j$} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {$x_n$} and a sequence {$y_m$} or a sequence {$h_j$} in different sequence groups, whose cross-correlation value is greater than 0.6 and a maximum cross-correlation value are shown in Table 23.

TABLE 23

|  | Length-36 sequence | Length-48 sequence | Length-60 sequence | Length-72 sequence |
|---|---|---|---|---|
| Length-24 sequence | 1 | 0 | 2 | 1 |
| Maximum cross-correlation value | 0.679 | 0.5963 | 0.6453 | 0.6121 |

In a nineteenth optional implementation, when N=18, combinations of the sequence {$s_n$} and q are a part or all of the following combinations:

the sequence {$s_n$} is {1, 1, −1, −1, −3, −1, 1, −3, −3, −3, 1, −3, −1, −1, 1, −1, 3, 1}, and q=1; or the sequence {$s_n$} is {3, −3, 3, −1, 1, 3, −3, −1, −3, −3, −1, −3, 3, 1, −1, 3, −3, 3}, and q=2; or the sequence {$s_n$} is {−3, 3, 1, −1, −1, 3, −3, −1, 1, 1, 1, 1, 1, −1, 3, −1, −3, −1}, and q=3; or the sequence {$s_n$} is {1, 1, −3, 3, 3, 1, 3, −3, 3, −1, 1, 1, −1, 1, −3, −3, −1, 3}, and q=4; or the sequence {$s_n$} is {−3, −3, 1, −3, 3, 3, 3, −1, 3, 1, 1, −3, −3, −3, 3, −3, −1, −1}, and q=5; or the sequence {$s_n$} is {3, −3, 1, 1, 3, −1, 1, −1, −1, −3, 1, 1, −1, 3, 3, −3, 3, −1}, and q=6; or the sequence {$s_n$} is {3, 3, −1, 1, 3, 1, −3, −1, 1, 1, −3, 1, 3, 3, −1, −3, −3, −3}, and q=7; or the sequence {$s_n$} is {−1, 3, −1, −3, 3, 1, −3, −1, 3, −3, −1, −1, 1, 1, −1, −1, −1}, and q=8; or the sequence {$s_n$} is {−3, 1, −3, −3, 1, −3, −3, 3, 1, −3, −1, −3, −3, −3, −1, 1, 1, 3}, and q=9; or the sequence {$s_n$} is {3, −1, 3, 1, −3, −3, −1, 1, −3, −3, 3, 3, 3, 1, 3, −3, 3, −3}, and 9=10; or the sequence {$s_n$} is {1, −3, −1, −3, 3, 3, −1, −3, 1, −3, −3, −1, −3, −1, 1, 3, 3, 3}, and q=11; or the sequence {$s_n$} is {−3, −3, 3, 3, 3, −1, −1, −3, −1, −1, −1, 3, 1, −3, −3, −1, 3, −1}, and q=12; or the sequence {$s_n$} is {−3, −1, −3, −3, 1, 1, −1, −3, −1, −3, −1, −1, 3, 3, −1, 3, 1, 3}, and q=13; or the sequence {$s_n$} is {1, 1, −3, −3, −3, −3, 1, 3, −3, 3, 3, 1, −3, −1, 3, −1, −3, 1}, and q=14; or the sequence {$s_n$} is {−3, 3, −1, −3, −1, −3, 1, 1, −3, −3, −1, −1, 3, −3, 1, 3, 1, 1}, and q=15; or the sequence {$s_n$} is {−3, −3, 1, −1, −1, 1, 1, −3, −1, 3, 3, 3, −1, 3, 1, 3, 1}, and q=16; or the sequence {$s_n$} is {−3, −3, 3, 3, 3, 1, −3, 1, 3, 3, 1, −3, −3, 3, −1, −3, −1, 1}, and q=17; or the sequence {$s_n$} is {−3, −1, 3, 3, −1, 3, −1, −3, −1, 1, −1, −3, −1, −1, −1, 3, 3, 1}, and q=18; or the sequence {$s_n$} is {−3, 1, −3, −1, −1, 3, 1, −3, −3, −3, −1, −3, −3, 1, 1, 1, −1, −1}, and q=19; or the sequence {$s_n$} is {3, 3, 3, −3, −1, −3, −1, 3, −1, 1, −1, −3, 1, −3, −3, −1, 3, 3}, and q=20; or the sequence {$s_n$} is {−3, 1, 1, −3, 1, 1, 3, −3, −1, −3, −1, 3, −3, 3, −1, −1, −1, −3}, and q=21; or the sequence {$s_n$} is {−3, −1, −3, −1, −3, 1, 3, −3, −1, 3, 3, 3, 1, −1, −3, 3, −1, −3}, and q=22; or the sequence {$s_n$} is {3, −1, −3, 1, −3, −3, −3, 3, 3, −1, 1, −3, −1, 3, 1, 1, 3, 3}, and q=23; or the sequence {$s_n$} is {−3, −3, −3, 1, −3, 3, 1, 1, 3, −3, −3, 1, 3, −1, 3, −3, −3, 3}, and q=24; or the sequence {$s_n$} is {3, −1, −1, 1, −3, −1, −3, −1, −3, −3, −1, −3, 1, 1, 1, −3, −3, 3}, and q=25; or the sequence {$s_n$} is {3, 1, −3, 1, −3, 3, 3, −1, −3, −3, −1, −3, −3, 3, −3, −1, 1, 3}, and q=26; or the sequence {$s_n$} is {−3, −1, −1, −3, 1, −3, 3, −1, −1, −3, 3, 3, −3, −1, 3, −1, −1, −1}, and q=27; or the sequence {$s_n$} is {−3, −3, 3, 3, −3, 1, 3, −1, −3, 1, −1, −3, 3, −3, −1, −1, −1, 3}, and q=28; or the sequence {$s_n$} is {−1, −3, 1, −3, −3, −3, 1, 1, 3, 3, −3, 3, 3, −3, −1, 3, −3, 1}, and q=29; or the sequence {$s_n$} is {−3, 3, 1, −1, −1, −1, −1, 1, −1, 3, 3, −3, −1, 1, 3, −1, 3, −1}, and q=30.

It should be noted that all the foregoing combinations of the sequence {$s_n$} and q may be considered as a whole; in other words, all the combinations may be considered as one combination set. Certainly, a part of all the combinations of the sequence {$s_n$} and q in this embodiment of the present invention may be considered as a whole; in other words, a part of combinations may be considered as one combination set.

Based on this optional implementation, when M=36, and the sequence group includes the sequence {$x_n$} with a length N=18, the sequence {$x_n$} with a length N=24, the sequence {y_m}, and the sequence {h_j}, a combination manner of the sequence {y_m} and the sequence {h_j} satisfies u=⌊ū+1/2⌋, and ū=J_prime·q/31; and a combination manner of the sequence {x_n} with a length N=24 and the sequence {y_m} satisfies the eighteenth optional implementation in the specification. A length of the sequence {h_j} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {f_n} with a length N=18 and a sequence {f_n} with a length N=24 are respectively mapped to 18 and 24 subcarriers, and a center-frequency spacing of any two adjacent subcarriers in the 18 or 24 subcarriers is t times a subcarrier spacing. A sequence {g_m} and the sequence {h_j} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {x_n} with a length N=18 and a sequence with another length in different sequence groups, whose cross-correlation value is greater than 0.7 and a maximum cross-correlation value are shown in Table 24.

TABLE 24

|  | Length-24 sequence | Length-36 sequence | Length-48 sequence | Length-60 sequence | Length-72 sequence |
|---|---|---|---|---|---|
| Length-18 sequence | 4 | 0 | 0 | 1 | 0 |
| Maximum cross-correlation value | 0.7412 | 0.6935 | 0.6978 | 0.7015 | 0.6615 |

In a twentieth optional implementation, when N=12, combinations of the sequence {s_n} and q are a part or all of the following combinations:

the sequence {s_n} is {−3, 1, −3, −3, −3, 3, −3, −1, 1, 1, 1, −3}, and q=1; or
the sequence {s_n} is {−3, 3, 1, −3, 1, 3, −1, −1, 1, 3, 3, 3}, and q=2; or
the sequence {s_n} is {−3, 3, 3, 1, −3, 3, −1, 1, 3, −3, 3, −3}, and q=3; or
the sequence {s_n} is {−3, −3, −1, 3, 3, 3, −3, 3, −3, 1, −1, −3}, and q=4; or
the sequence {s_n} is {−3, 3, −3, 3, 3, −3, −1, −1, 3, 3, 1, −3}, and q=5; or
the sequence {s_n} is {−3, −3, 3, 1, −3, −3, −3, −1, 3, −1, 1, 3}, and q=6; or
the sequence {s_n} is {1, −1, 3, −1, −1, −1, −3, −1, 1, 1, 1, −3}, and q=7; or
the sequence {s_n} is {1, 3, −3, 1, 3, 3, 3, 1, −1, 1, −1, 3}, and q=8; or
the sequence {s_n} is {−3, −1, 3, 1, −3, −1, −3, 3, 1, 3, 3, 1}, and q=9; or
the sequence {s_n} is {−1, 1, 3, −3, 1, −1, 1, −1, −1, −3, 1, −1}, and q=10; or
the sequence {s_n} is {−3, −1, −1, 1, 3, 1, 1, −1, 1, −1, −3, 1}, and q=11; or
the sequence {s_n} is {−3, −1, −3, −1, −1, 3, 3, −1, −1, 1, −3}, and q=12; or
the sequence {s_n} is {−3, −1, 3, −3, −3, −1, −3, 1, −1, −3, 3, 3}, and q=13; or
the sequence {s_n} is {−3, 3, 1, 3, −3, 1, 1, 1, 1, 3, −3, 3}, and q=14; or
the sequence {s_n} is {−3, −3, 3, −3, −1, 3, 3, 3, −1, −3, 1, −3}, and q=15; or
the sequence {s_n} is {−3, 1, 3, −1, −1, −3, −3, −1, −1, 3, 1, −3}, and q=16; or
the sequence {s_n} is {−1, −1, −1, −1, 1, −3, −1, 3, 3, −1, −3, 1}, and q=17; or
the sequence {s_n} is {−1, 1, 1, −1, 1, 3, 3, −1, −1, −3, 1, −3}, and q=18; or
the sequence {s_n} is {3, 1, 3, 1, 3, −3, −1, 1, 3, 1, −1, −3}, and q=19; or
the sequence {s_n} is {−3, 1, −1, −1, 3, 3, −3, −1, −1, −3, −1, −3}, and q=20; or
the sequence {s_n} is {−1, −3, 3, −1, −3, −3, −3, −1, 1, −1, 1, −3}, and q=21; or
the sequence {s_n} is {−3, 1, 3, 3, −1, −1, −3, 3, 3, −3, 3, −3}, and q=22; or
the sequence {s_n} is {−3, 3, 3, 3, −1, −3, −3, −1, −3, 1, 3, −3}, and q=23; or
the sequence {s_n} is {3, −1, −3, 3, −3, −1, 3, 3, 3, −3, −1, −3}, and q=24; or
the sequence {s_n} is {−3, −1, 1, −3, 1, 3, 3, 3, −1, −3, 3, 3}, and q=25; or
the sequence {s_n} is {−3, 3, 1, −1, 3, 3, −3, 1, −1, 1, −1, 1}, and q=26; or
the sequence {s_n} is {−3, −1, −1, −3, −3, −1, −3, 3, 1, 3, −1, −3}, and q=27; or
the sequence {s_n} is {−3, −3, 3, 3, 3, −3, −1, 1, −3, 3, 1, −3}, and q=28; or
the sequence {s_n} is {1, −1, 3, 1, 1, −1, −1, −1, 1, 3, −3, 1}, and q=29; or
the sequence {s_n} is {−3, 3, −3, 3, −3, −3, 3, −1, −1, 1, 3, −3}, and q=30.

It should be noted that all the foregoing combinations of the sequence {s_n} and q may be considered as a whole; in other words, all the combinations may be considered as one combination set. Certainly, a part of all the combinations of the sequence {s_n} and q in this embodiment of the present invention may be considered as a whole; in other words, a part of combinations may be considered as one combination set.

Based on this optional implementation, when M=36, and the sequence group includes the sequence {x_n} with a length N=12, the sequence {x_n} with a length N=18, the sequence {x_n} with a length N=24, the sequence {y_m}, and the sequence {h_j}, a combination manner of the sequence {y_m} and the sequence {h_j} satisfies u=⌊ū+1/2⌋, and ū=J_prime·q/31; a combination manner of the sequence {x_n} with a length N=18 and the sequence {y_m} satisfies the nineteenth optional implementation in the specification; and a combination manner of the sequence {x_n} with a length N=24 and the sequence {y_m} satisfies the eighteenth optional implementation in the specification. A length of the sequence {h_j} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {f_n} with a length N=12 is mapped to 12 subcarriers, and a center-frequency spacing of any two adjacent subcarriers in the 12 subcarriers is t times a subcarrier spacing. A sequence $\{f_n\}$ with a length N=18 and a sequence $\{f_n\}$ with a length N=24 are respectively mapped to 18 and 24 subcarriers, and a center-frequency spacing of any two adjacent subcarriers in the 18 or 24 subcarriers is t times a subcarrier spacing. A sequence $\{g_m\}$ and the sequence $\{h_j\}$ are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence $\{x_n\}$ with a length N=12 and a sequence with another length in different sequence groups, whose cross-correlation value is greater than 0.8 and a maximum cross-correlation value are shown in Table 25.

TABLE 25

|  | Length-18 sequence | Length-24 sequence | Length-36 sequence | Length-48 sequence | Length-60 sequence | Length-72 sequence |
|---|---|---|---|---|---|---|
| Length-12 sequence | 10 | 6 | 1 | 1 | 1 | 1 |
| Maximum cross-correlation value | 0.8933 | 0.855 | 0.831 | 0.8107 | 0.8034 | 0.8074 |

In a twenty-first optional implementation, when N=24, a combination of the sequence $\{s_n\}$ and q is at least one of the following combinations:

the sequence $\{s_n\}$ is {−1, −3, 3, −1, 3, 1, 3, −1, 1, −3, −1, −3, −1, 1, 3, −3, −1, −3, 3, 3, 3, −3, −3}, and q=1; or the sequence $\{s_n\}$ is {−3, −1, 1, −3, −1, −1, 1, 1, 1, 3, 3, −1, 1, −1, 1, −1, −1, −3, −3, 3, 1, −1, −3}, and q=2; or the sequence $\{s_n\}$ is {−1, −3, −3, 1, −1, −1, −3, 1, 3, −1, −3, −1, −1, −3, 1, 1, 3, 1, −3, −1, −1, 3, −3, −3}, and q=3; or the sequence $\{s_n\}$ is {1, −3, 3, −1, −3, −1, 3, 3, 1, −1, 1, 1, 3, −3, −1, −3, −3, −3, −1, 3, −3, −1, −3, −3}, and q=4; or the sequence $\{s_n\}$ is {−1, 3, −3, −3, −1, 3, −1, −1, 1, 3, 1, 3, −1, −1, −3, 1, 3, 1, −1, −3, 1, −1, −3, −3}, and q=5; or the sequence $\{s_n\}$ is {−3, 1, −3, 3, −3, 1, −3, 3, 1, −1, −3, −1, −3, −3, −3, 1, 3, −1, 1, 3, 3, 3, −3}, and q=6; or the sequence $\{s_n\}$ is {−3, 3, 1, 3, −1, 1, −3, 1, −3, 1, −1, −3, −1, −3, −3, −3, −3, −1, −1, −1, 1, 1, −3, −3}, and q=7; or the sequence $\{s_n\}$ is {−3, 1, 3, −1, 1, −1, 3, −3, 3, −1, −3, −1, −3, 3, −1, −1, −1, −3, −1, −1, −3, 3, 3, −3}, and q=8; or the sequence $\{s_n\}$ is {−3, 1, −3, 3, −1, −1, −1, −3, 3, 1, −1, −3, −1, 3, −1, 1, −1, 1, −3, −3, −3, −3, −3}, and q=9; or the sequence $\{s_n\}$ is {1, 1, −1, −3, −1, 1, 1, −3, 1, −1, 1, −3, 3, −3, −3, 3, −1, −3, 1, 3, −3, 1, −3, −3}, and q=10; or the sequence $\{s_n\}$ is {−3, −3, −3, −1, 3, −3, 3, 1, 3, 1, −3, −1, −1, −3, 1, 1, 3, 1, −1, −3, 3, 1, 3, −3}, and q=11; or the sequence $\{s_n\}$ is {−3, 3, −1, 3, 1, −1, −1, −1, 3, 3, 1, 1, 1, 3, 3, 1, −3, −3, −1, 1, −3, 1, 3, −3}, and q=12; or the sequence $\{s_n\}$ is {3, −3, 3, −1, −3, 1, 3, 1, −1, −1, −3, −1, 3, −3, 3, −1, −1, 3, 3, −3, −3, 3, −3, −3}, and q=13; or the sequence $\{s_n\}$ is {−3, 3, −1, 3, −1, 3, 3, 1, 1, −3, 1, 3, −3, 3, −3, −3, −1, 1, 3, −3, −1, −1, −3, −3}, and q=14; or the sequence $\{s_n\}$ is {−3, 1, −3, −1, −1, 3, 1, 3, −3, 1, −1, 3, 3, −1, −3, 3, −3, −1, −1, −3, −3, −3, 3, −3}, and q=15; or the sequence $\{s_n\}$ is {−3, −1, −1, −3, 1, −3, −3, −1, −1, 3, −1, 1, −1, 3, 1, −3, −1, 3, 1, 1, −1, −1, −3, −3}, and q=16; or the sequence $\{s_n\}$ is {−3, −3, 1, −1, 3, 3, −3, −1, 1, −1, −1, 1, 1, −1, −1, 3, −3, 1, −3, 1, −1, −1, −1, −3}, and q=17; or the sequence $\{s_n\}$ is {3, −1, 3, −1, 1, −3, 1, 1, −3, −3, 3, −3, −1, −1, −1, −1, −1, −3, −3, −1, 1, 1, −3, −3}, and q=18; or the sequence $\{s_n\}$ is {−3, 1, −3, 1, −3, −3, 1, −3, 1, −3, −3, −3, −3, −3, 1, −3, −3, 1, 1, −3, 1, 1, −3, −3}, and q=19; or the sequence $\{s_n\}$ is {−3, −3, 3, 3, 1, −1, −1, −1, 1, −3, −1, 1, −1, 3, −3, −1, −3, −1, −1, 1, −3, 3, −1, −3}, and q=20; or the sequence $\{s_n\}$ is {−3, −3, −1, −1, −1, −3, 1, −1, −3, −1, 3, −3, 1, −3, 3, −3, 3, 3, 1, −1, −1, 1, −3, −3}, and q=21; or the sequence $\{s_n\}$ is {3, −1, 1, −1, 3, −3, 1, 1, 3, −1, −3, 3, 1, −3, 3, −1, −1, −1, −1, 1, −3, −3, −3, −3}, and q=22; or the sequence $\{s_n\}$ is {−1, 3, −1, −1, 3, 3, −1, −1, −1, 3, −1, −3, 1, 3, 1, 1, −3, −3, −3, −1, −3, −1, −3, −3}, and q=23; or the sequence $\{s_n\}$ is {−1, −3, 3, 1, 1, −3, 1, −3, −3, 1, −3, −1, −1, 3, −3, 3, 3, 3, −3, 1, 3, 3, −3, −3}, and q=24; or the sequence $\{s_n\}$ is {−3, −1, 1, −3, −3, 1, 1, −3, 3, −1, −1, −3, 1, 3, 1, −1, −3, −1, −3, 1, −3, −3, −3, −3}, and q=25; or the sequence $\{s_n\}$ is {−3, 3, −1, −3, −1, −1, −1, 3, −1, −1, 3, −3, −1, 3, −3, 3, −3, −1, 3, 1, 1, −1, −3, −3}, and q=26; or the sequence $\{s_n\}$ is {−3, 1, −1, −3, −3, −1, 1, −3, −1, −3, 1, 1, −1, 1, 1, 3, 3, 3, −1, 1, −1, 1, −1, −3}, and q=27; or the sequence $\{s_n\}$ is {3, −3, −3, −1, 3, 3, −3, −1, 3, 1, 1, 1, 3, −1, 3, −3, −1, 3, −1, 3, 1, −1, −3, −3}, and q=28; or the sequence $\{s_n\}$ is {−3, 1, −3, 1, −3, 1, 1, 3, 1, −3, −3, −1, 1, 3, −1, −3, 3, 1, −1, −3, −3, −3, −3, −3}, and q=29; or the sequence $\{s_n\}$ is {3, −3, −1, 1, 3, −1, −1, −3, 1, −1, −3, −1, −3, 3, −1, 3, 1, 1, −3, 3, −3, −3, −3, −3}, and q=30.

It should be noted that all the foregoing combinations of the sequence $\{s_n\}$ and q may be considered as a whole; in other words, all the combinations may be considered as one combination set. Certainly, a part of all the combinations of the sequence {s_n} and q in this embodiment of the present invention may be considered as a whole; in other words, a part of combinations may be considered as one combination set.

Based on this optional implementation, when M=36, and the sequence group includes the sequence {x_n}, the sequence {y_m}, and the sequence {h_j}, a combination manner of the sequence {y_m} and the sequence {h_j} satisfies u=⌊ū+1/2⌋, and ū=J_{prime}·q/31. A length of the sequence {h_j} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {f_n} is mapped to N subcarriers, and a center-frequency spacing of any two adjacent subcarriers in the N subcarriers is t times a subcarrier spacing. A sequence {g_m} and the sequence {h_j} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence {x_n} and a sequence {y_m} or a sequence {h_j} in different sequence groups, whose cross-correlation value is greater than 0.6 and a maximum cross-correlation value are shown in Table 26.

TABLE 26

|  | Length-36 sequence | Length-48 sequence | Length-60 sequence | Length-72 sequence |
| --- | --- | --- | --- | --- |
| Length-24 sequence | 1 | 0 | 2 | 1 |
| Maximum cross-correlation value | 0.679 | 0.5963 | 0.6453 | 0.6121 |

In a twenty-second optional implementation, when N=18, combinations of the sequence {s_n} and q are a part or all of the following combinations:

the sequence {s_n} is {1, 1, −1, −1, −3, −1, 1, −3, −3, −3, 1, −3, −1, −1, 1, −1, 3, 1}, and q=1; or
the sequence {s_n} is {3, −3, 3, −1, 1, 3, −3, −1, −3, −3, −1, −3, 3, 1, −1, 3, −3, 3}, and q=2; or
the sequence {s_n} is {−3, 3, 1, −1, −1, 3, −3, −1, 1, 1, 1, 1, −1, 3, −1, −3, −1}, and q=3; or
the sequence {s_n} is {1, 1, −3, 3, 3, 1, 3, −3, 3, −1, 1, 1, −1, 1, −3, −3, −1, 3}, and q=4; or
the sequence {s_n} is {−3, −3, 1, −3, 3, 3, 3, −1, 3, 1, 1, −3, −3, −3, 3, −3, −1, −1}, and q=5; or
the sequence {s_n} is {−1, 3, −1, −3, 3, 1, −3, −1, 3, −3, −1, −, 1, 1, 1, −1, −1}, and q=6; or
the sequence {s_n} is {−3, 3, −1, 1, 3, 1, −3, −1, 1, 1, −3, 1, 3, 3, −1, −3, −3, −3}, and q=7; or
the sequence {s_n} is {−3, 1, −3, −3, 1, −3, −3, 3, 1, −3, −1, −3, −3, −3, −1, 1, 1, 3}, and q=8; or
the sequence {s_n} is {1, −3, −1, −3, 3, 3, −1, −3, 1, −3, −3, −1, −3, −1, 1, 3, 3, 3}, and q=9; or
the sequence {s_n} is {3, −1, 3, 1, −3, −3, −1, 1, −3, −3, 3, 3, 3, 1, 3, −3, 3, −3}, and q=10; or
the sequence {s_n} is {−3, −3, 1, −1, −1, 1, 1, −3, −1, 3, 3, 3, 3, −1, 3, 1, 3, 1}, and q=1; or
the sequence {s_n} is {−3, −3, 3, 3, 3, −1, −1, −3, −1, −1, −1, 3, 1, −3, −3, −1, 3, −1}, and q=12; or the sequence {s_n} is {−3, −1, −3, −3, 1, 1, −1, −3, −1, −3, −1, −1, 3, 3, −1, 3, 1, 3}, and q=13; or the sequence {s_n} is {1, 1, −3, −3, −3, −3, 1, 3, −3, 3, 3, 1, −3, −1, 3, −1, −3, 1}, and q=14; or
the sequence {s_n} is {−3, 3, −1, −3, −1, −3, 1, 1, −3, −3, −1, −1, 3, −3, 1, 3, 1, 1}, and q=15; or
the sequence {s_n} is {−3, −3, 3, 3, 3, 1, −3, 1, 3, 3, 1, −3, −3, 3, −1, −3, −1, 1}, and q=16; or
the sequence {s_n} is {−3, −1, 3, 3, −1, 3, −1, −3, −1, 1, −1, −3, −1, −1, −1, 3, 3, 1}, and q=17; or
the sequence {s_n} is {−3, −1, −3, −1, −3, 1, 3, −3, −1, 3, 3, 3, 1, −1, −3, 3, −1, −3}, and q=18; or
the sequence {s_n} is {−3, 1, −3, −1, −1, 3, 1, −3, −3, −3, −1, −3, −3, 1, 1, 1, −1, −1}, and q=19; or
the sequence {s_n} is {3, 3, 3, −3, −1, −3, −1, 3, −1, 1, −1, −3, 1, −3, −3, −1, 3, 3}, and q=20; or
the sequence {s_n} is {−3, 1, 1, −3, 1, 1, 3, −3, −1, −3, −1, 3, −3, 3, −1, −1, −1, −3}, and q=21; or
the sequence {s_n} is {3, −1, −3, 1, −3, −3, −3, 3, 3, −1, 1, −3, −1, 3, 1, 1, 3, 3}, and q=22; or
the sequence {s_n} is {−3, −1, −1, −3, 1, −3, 3, −1, −1, −3, 3, 3, −3, −1, 3, −1, −1, −1}, and q=23; or
the sequence {s_n} is {−3, −3, −3, 1, −3, 3, 1, 1, 3, −3, −3, 1, 3, −1, 3, −3, −3, 3}, and q=24; or
the sequence {s_n} is {3, −3, 1, 1, 3, −1, 1, −1, −1, −3, 1, 1, −1, 3, 3, −3, 3, −1}, and q=25; or
the sequence {s_n} is {3, −1, −1, 1, −3, −1, −3, −1, −3, −3, −1, −3, 1, 1, 1, −3, −3, 3}, and q=26; or
the sequence {s_n} is {3, 1, −3, 1, −3, 3, 3, −1, −3, −3, −1, −3, −3, 3, −3, −1, 1, 3}, and q=27; or
the sequence {s_n} is {−3, −3, 3, 3, −3, 1, 3, −1, −3, 1, −1, −3, 3, −3, −1, −1, −1, 3}, and q=28; or
the sequence {s_n} is {−1, −3, 1, −3, −3, −3, 1, 1, 3, 3, −3, 3, 3, −3, −1, 3, −3, 1}, and q=29; or
the sequence {s_n} is {−3, 3, 1, −1, −1, −1, −1, 1, −1, 3, 3, −3, −1, 1, 3, −1, 3, −1}, and q=30.

It should be noted that all the foregoing combinations of the sequence {s_n} and q may be considered as a whole; in other words, all the combinations may be considered as one combination set. Certainly, a part of all the combinations of the sequence {s_n} and q in this embodiment of the present invention may be considered as a whole; in other words, a part of combinations may be considered as one combination set.

Based on this optional implementation, when M=36, and the sequence group includes the sequence {x_n} with a length N=18, the sequence {x_n} with a length N=24, the sequence {y_m}, and the sequence {h_j}, a combination manner of the sequence {y_m} and the sequence {h_j} satisfies u=⌊ū+1/2⌋, and ū=J_{prime}·q/31; and a combination manner of the sequence {x_n} with a length N=24 and the sequence {y_m} satisfies the twenty-first optional implementation in the specification. A length of the sequence {h_j} is J, a value of J is 48, 60, or 72 and satisfies $$h_j = k_u(j \bmod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence {f_n} with a length N=18 and a sequence {f_n} with a length N=24 are respectively mapped to 18 and 24 subcarriers, and a center-frequency spacing of any two adjacent subcarriers in the 18 or 24 subcarriers is t times a subcarrier spacing. A sequence {g_m} and the sequence {h_j} are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence $\{x_n\}$ with a length N=18 and a sequence with another length in different sequence groups, whose cross-correlation value is greater than 0.7 and a maximum cross-correlation value are shown in Table 27.

TABLE 27

|  | Length-24 sequence | Length-36 sequence | Length-48 sequence | Length-60 sequence | Length-72 sequence |
|---|---|---|---|---|---|
| Length-18 sequence | 4 | 0 | 0 | 1 | 0 |
| Maximum cross-correlation value | 0.7412 | 0.6935 | 0.6978 | 0.7015 | 0.6615 |

In a twenty-third optional implementation, when N=12, combinations of the sequence $\{s_n\}$ and q are a part or all of the following combinations:

the sequence $\{s_n\}$ is {−3, 1, −3, −3, −3, 3, −3, −1, 1, 1, 1, −3}, and q=1; or the sequence $\{s_n\}$ is {−3, 3, 1, −3, 1, 3, −1, −1, 1, 3, 3, 3}, and q=2; or the sequence $\{s_n\}$ is {−3, 3, 3, 1, −3, 3, −1, 1, 3, −3, 3, −3}, and q=3; or the sequence $\{s_n\}$ is {−1, 1, 1, −1, 1, 3, 3, −1, −1, −3, 1, −3}, and q=4; or the sequence $\{s_n\}$ is {−3, −3, −1, 3, 3, 3, −3, 3, −3, 1, −1, −3}, and q=5; or the sequence $\{s_n\}$ is {−3, −3, 3, 1, −3, −3, −3, −1, 3, −1, 1, 3}, and q=6; or the sequence $\{s_n\}$ is {1, −1, 3, −1, −1, −1, −3, −1, 1, 1, 1, −3}, and q=7; or the sequence $\{s_n\}$ is {−3, −1, 3, 1, −3, −1, −3, 3, 1, 3, 3, 1}, and q=8; or the sequence $\{s_n\}$ is {−3, 3, 1, 3, −3, 1, 1, 1, 1, 3, −3, 3}, and q=9; or the sequence $\{s_n\}$ is {−3, 3, −3, 3, 3, −3, −1, −1, 3, 3, 1, −3}, and q=10; or the sequence $\{s_n\}$ is {1, 3, −3, 1, 3, 3, 3, 1, −1, 1, −1, 3}, and q=11; or the sequence $\{s_n\}$ is {−3, −1, −3, −1, −1, −3, 3, 3, −1, −1, 1, −3}, and q=12; or the sequence $\{s_n\}$ is {−1, 1, 3, −3, 1, −1, 1, −1, −1, −3, 1, −1}, and q=13; or the sequence $\{s_n\}$ is {3, 1, 3, 1, 3, −3, −1, 1, 3, 1, −1, −3}, and q=14; or the sequence $\{s_n\}$ is {−3, −1, −1, 1, 3, 1, 1, −1, 1, −1, −3, 1}, and q=15; or the sequence $\{s_n\}$ is {−3, 1, 3, −1, −1, −3, −3, −1, −1, 3, 1, −3}, and q=16; or the sequence $\{s_n\}$ is {−1, −1, −1, 1, −3, −1, 3, 3, −1, −3, 1}, and q=17; or the sequence $\{s_n\}$ is {−3, −1, 3, −3, −3, −1, −3, 1, −1, −3, 3, 3}, and q=18; or the sequence $\{s_n\}$ is {−3, 1, 3, 3, −1, −1, −3, 3, 3, −3, 3, −3}, and q=19; or the sequence $\{s_n\}$ is {−3, −3, 3, −3, −1, 3, 3, −1, −3, 1, −3}, and q=20; or the sequence $\{s_n\}$ is {−1, −3, 3, −1, −3, −3, −3, −1, 1, −1, 1, −3}, and q=21; or the sequence $\{s_n\}$ is {−3, 1, −1, −1, 3, 3, −3, −1, −1, −3, −1, −3}, and q=22; or the sequence $\{s_n\}$ is {−3, 3, 3, 3, −1, −3, −3, −1, −3, 1, 3, −3}, and q=23; or the sequence $\{s_n\}$ is {3, −1, −3, 3, −3, −1, 3, 3, 3, −3, −1, −3}, and q=24; or the sequence $\{s_n\}$ is {−3, −1, 1, −3, 1, 3, 3, 3, −1, −3, 3, 3}, and q=25; or the sequence $\{s_n\}$ is {−3, 3, 1, −1, 3, 3, −3, 1, −1, 1, −1, 1}, and q=26; or the sequence $\{s_n\}$ is {−3, −1, −1, −3, −3, −1, −3, 3, 1, 3, −1, −3}, and q=27; or the sequence $\{s_n\}$ is {−3, −3, 3, 3, 3, −3, −1, 1, −3, 3, 1, −3}, and q=28; or the sequence $\{s_n\}$ is {1, −1, 3, 1, 1, −1, −1, −1, 1, 3, −3, 1}, and q=29; or the sequence $\{s_n\}$ is {−3, 3, −3, 3, −3, −3, 3, −1, −1, 1, 3, −3}, and q=30.

It should be noted that all the foregoing combinations of the sequence $\{s_n\}$ and q may be considered as a whole; in other words, all the combinations may be considered as one combination set. Certainly, a part of all the combinations of the sequence $\{s_n\}$ and q in this embodiment of the present invention may be considered as a whole; in other words, a part of combinations may be considered as one combination set.

Based on this optional implementation, when M=36, and the sequence group includes the sequence $\{x_n\}$ with a length N=12, the sequence $\{x_n\}$ with a length N=18, the sequence $\{x_n\}$ with a length N=24, the sequence $\{y_m\}$, and the sequence $\{h_j\}$, a combination manner of the sequence $\{y_m\}$ and the sequence $\{h_j\}$ satisfies $u=\lfloor \bar{u}+1/2 \rfloor$, and $\bar{u}=J_{prime} \cdot q/31$; a combination manner of the sequence $\{x_n\}$ with a length N=18 and the sequence $\{y_m\}$ satisfies the twenty-second optional implementation in the specification; and a combination manner of the sequence $\{x_n\}$ with a length N=24 and the sequence $\{y_m\}$ satisfies the twenty-first optional implementation in the specification. A length of the sequence $\{h_j\}$ is J, a value of J is 48, 60, or 72 and satisfies $$h_j = k_u(j \mod J_{prime}), k_u(i) = e^{-j\frac{\pi \cdot u \cdot i \cdot (i+1)}{J_{prime}}},$$

i is an integer, $0 \leq i \leq J_{prime}-1$, and $J_{prime}$ is a largest prime number smaller than J. In addition, a sequence $\{f_n\}$ with a length N=12 is mapped to 12 subcarriers, and a center-frequency spacing of any two adjacent subcarriers in the 12 subcarriers is t times a subcarrier spacing. A sequence $\{f_n\}$ with a length N=18 and a sequence $\{f_n\}$ with a length N=24 are respectively mapped to 18 and 24 subcarriers, and a center-frequency spacing of any two adjacent subcarriers in the 18 or 24 subcarriers is t times a subcarrier spacing. A sequence $\{g_m\}$ and the sequence $\{h_j\}$ are respectively mapped to M and J subcarriers, and a center-frequency spacing of any two adjacent subcarriers in the M and J subcarriers is t times a subcarrier spacing, where t is a positive integer. A quantity of sequence pairs, namely, a sequence $\{x_n\}$ with a length N=12 and a sequence with another length in different sequence groups, whose cross-correlation value is greater than 0.8 and a maximum cross-correlation value are shown in Table 28.

TABLE 28

|  | Length-18 sequence | Length-24 sequence | Length-36 sequence | Length-48 sequence | Length-60 sequence | Length-72 sequence |
|---|---|---|---|---|---|---|
| Length-12 sequence | 11 | 5 | 1 | 1 | 1 | 1 |
| Maximum cross-correlation value | 0.8933 | 0.8373 | 0.831 | 0.8107 | 0.8034 | 0.8074 |

That is, in the first optional implementation of the foregoing embodiment, the combination of the sequence $\{s_n\}$ and q is at least one of the following combinations:

the sequence $\{s_n\}$ is $\{1, 3, -3, 1, 3, 3, 3, 1, -1, 1, -1, 3\}$, and q=1; or
the sequence $\{s_n\}$ is $\{-3, -1, 3, 1, -3, -1, -3, 3, 1, 3, 3, 1\}$, and q=2; or
the sequence $\{s_n\}$ is $\{-3, -3, 3, -3, -1, 3, 3, 3, -1, -3, 1, -3\}$, and q=3; or
the sequence $\{s_n\}$ is $\{-3, 1, 3, -1, -1, -3, -3, -1, -1, 3, 1, -3\}$, and q=4; or
the sequence $\{s_n\}$ is $\{-3, -1, -3, -1, -1, -3, 3, 3, -1, -1, 1, -3\}$, and q=5; or
the sequence $\{s_n\}$ is $\{3, -1, -3, 3, -3, -1, 3, 3, 3, -3, -1, -3\}$, and q=6; or
the sequence $\{s_n\}$ is $\{-3, -3, 3, 3, 3, -3, -1, 1, -3, 3, 1, -3\}$, and q=7; or
the sequence $\{s_n\}$ is $\{-3, 3, 1, -1, 3, 3, -3, 1, -1, 1, -1, 1\}$, and q=8; or
the sequence $\{s_n\}$ is $\{-3, 1, -3, -3, -3, 3, -3, -1, 1, 1, 1, -3\}$, and q=9; or
the sequence $\{s_n\}$ is $\{-3, -1, -1, -3, -3, -1, -3, 3, 1, 3, -1, -3\}$, and q=10; or
the sequence $\{s_n\}$ is $\{-3, -1, -1, 1, 3, 1, 1, -1, 1, -1, -3, 1\}$, and q=11; or
the sequence $\{s_n\}$ is $\{-1, -1, -1, -1, 1, -3, -1, 3, 3, -1, -3, 1\}$, and q=12; or
the sequence $\{s_n\}$ is $\{-3, -3, -1, 3, 3, 3, -3, 3, -3, 1, -1, -3\}$, and q=13; or
the sequence $\{s_n\}$ is $\{-3, -1, 1, -3, 1, 3, 3, 3, -1, -3, 3, 3\}$, and q=14; or
the sequence $\{s_n\}$ is $\{-3, -1, 3, -3, -3, -1, -3, 1, -1, -3, 3, 3\}$, and q=15; or
the sequence $\{s_n\}$ is $\{-3, 3, 1, -3, 1, 3, -1, -1, 1, 3, 3, 3\}$, and q=16; or
the sequence $\{s_n\}$ is $\{-3, -3, 3, 1, -3, -3, -3, -1, 3, -1, 1, 3\}$, and q=17; or
the sequence $\{s_n\}$ is $\{-1, 1, 1, -1, 1, 3, 3, -1, -1, -3, 1, -3\}$, and q=18; or
the sequence $\{s_n\}$ is $\{-3, 3, -3, 3, 3, -3, -1, -1, 3, 3, 1, -3\}$, and q=19; or
the sequence $\{s_n\}$ is $\{-1, 1, 3, -3, 1, -1, 1, -1, -1, -3, 1, -1\}$, and q=20; or
the sequence $\{s_n\}$ is $\{1, -1, 3, 1, 1, -1, -1, -1, 1, 3, -3, 1\}$, and q=21; or
the sequence $\{s_n\}$ is $\{-3, 3, 1, 3, -3, 1, 1, 1, 3, -3, 3\}$, and q=22; or
the sequence $\{s_n\}$ is $\{-3, 3, -3, 3, -3, -3, 3, -1, -1, 1, 3, -3\}$, and q=23; or
the sequence $\{s_n\}$ is $\{-3, 3, 3, 1, -3, 3, -1, 1, 3, -3, 3, -3\}$, and q=24; or
the sequence $\{s_n\}$ is $\{1, -1, 3, -1, -1, -1, -3, -1, 1, 1, 1, -3\}$, and q=25; or
the sequence $\{s_n\}$ is $\{-3, 1, -1, -1, 3, 3, -3, -1, -1, -3, -1, -3\}$, and q=26; or
the sequence $\{s_n\}$ is $\{3, 1, 3, 1, 3, -3, -1, 1, 3, 1, -1, -3\}$, and q=27; or
the sequence $\{s_n\}$ is $\{-3, 1, 3, 3, -1, -1, -3, 3, 3, -3, 3, -3\}$, and q=28; or
the sequence $\{s_n\}$ is $\{-3, 3, 3, 3, -1, -3, -3, -1, -3, 1, 3, -3\}$, and q=29; or
the sequence $\{s_n\}$ is $\{-1, -3, 3, -1, -3, -3, -3, -1, 1, -1, 1, -3\}$, and q=30.

That is, in the first optional implementation of the foregoing embodiment, the combination of the sequence $\{s_n\}$ and q is at least one of the following combinations:

a sequence whose $\{s_n\}$ index is 10, and q=1; or
a sequence whose $\{s_n\}$ index is 16, and q=2; or
a sequence whose $\{s_n\}$ index is 19, and q=3; or
a sequence whose $\{s_n\}$ index is 12, and q=4; or
a sequence whose $\{s_n\}$ index is 8, and q=5; or
a sequence whose $\{s_n\}$ index is 25, and q=6; or
a sequence whose $\{s_n\}$ index is 13, and q=7; or
a sequence whose $\{s_n\}$ index is 29, and q=8; or
a sequence whose $\{s_n\}$ index is 15, and q=9; or
a sequence whose $\{s_n\}$ index is 3, and q=10; or
a sequence whose $\{s_n\}$ index is 17, and q=11; or
a sequence whose $\{s_n\}$ index is 4, and q=12; or
a sequence whose $\{s_n\}$ index is 6, and q=13; or
a sequence whose $\{s_n\}$ index is 22, and q=14; or
a sequence whose $\{s_n\}$ index is 0, and q=15; or
a sequence whose $\{s_n\}$ index is 27, and q=16; or
a sequence whose $\{s_n\}$ index is 23, and q=17; or
a sequence whose $\{s_n\}$ index is 5, and q=18; or
a sequence whose $\{s_n\}$ index is 24, and q=19; or
a sequence whose $\{s_n\}$ index is 1, and q=20; or
a sequence whose $\{s_n\}$ index is 2, and q=21; or
a sequence whose $\{s_n\}$ index is 14, and q=22; or
a sequence whose $\{s_n\}$ index is 28, and q=23; or
a sequence whose $\{s_n\}$ index is 20, and q=24; or
a sequence whose $\{s_n\}$ index is 26, and q=25; or
a sequence whose $\{s_n\}$ index is 7, and q=26; or
a sequence whose $\{s_n\}$ index is 18, and q=27; or
a sequence whose $\{s_n\}$ index is 21, and q=23; or
a sequence whose $\{s_n\}$ index is 9, and q=29; or
a sequence whose $\{s_n\}$ index is 11, and q=30.

That is, in the second optional implementation of the foregoing embodiment, the combination of the sequence $\{s_n\}$ and q is at least one of the following combinations:

a sequence whose $\{s_n\}$ index is 2, and q=1; or
a sequence whose $\{s_n\}$ index is 3, and q=2; or
a sequence whose $\{s_n\}$ index is 5, and q=3; or
a sequence whose $\{s_n\}$ index is 6, and q=4; or
a sequence whose $\{s_n\}$ index is 7, and q=5; or
a sequence whose $\{s_n\}$ index is 25, and q=6; or
a sequence whose $\{s_n\}$ index is 13, and q=7; or
a sequence whose $\{s_n\}$ index is 8, and q=8; or
a sequence whose $\{s_n\}$ index is 15, and q=9; or
a sequence whose $\{s_n\}$ index is 10, and q=10; or
a sequence whose $\{s_n\}$ index is 11, and q=11; or a sequence whose $\{s_n\}$ index is 4, and q=12; or
a sequence whose $\{s_n\}$ index is 12, and q=13; or
a sequence whose $\{s_n\}$ index is 16, and q=14; or
a sequence whose $\{s_n\}$ index is 0, and q=15; or
a sequence whose $\{s_n\}$ index is 27, and q=16; or
a sequence whose $\{s_n\}$ index is 17, and q=17; or
a sequence whose $\{s_n\}$ index is 18, and q=18; or
a sequence whose $\{s_n\}$ index is 19, and q=19; or
a sequence whose $\{s_n\}$ index is 1, and q=20; or
a sequence whose $\{s_n\}$ index is 20, and q=21; or
a sequence whose $\{s_n\}$ index is 14, and q=22; or
a sequence whose $\{s_n\}$ index is 21, and q=23; or
a sequence whose $\{s_n\}$ index is 24, and q=24; or
a sequence whose $\{s_n\}$ index is 26, and q=25; or
a sequence whose $\{s_n\}$ index is 22, and q=26; or
a sequence whose $\{s_n\}$ index is 23, and q=27; or
a sequence whose $\{s_n\}$ index is 28, and q=28; or
a sequence whose $\{s_n\}$ index is 9, and q=29; or
a sequence whose $\{s_n\}$ index is 29, and q=30.

That is, in the third optional implementation of the foregoing embodiment, the combination of the sequence $\{s_n\}$ and q is at least one of the following combinations:
a sequence whose $\{s_n\}$ index is 10, and q=1; or
a sequence whose $\{s_n\}$ index is 23, and q=2; or
a sequence whose $\{s_n\}$ index is 19, and q=3; or
a sequence whose $\{s_n\}$ index is 1, and q=4; or
a sequence whose $\{s_n\}$ index is 8, and q=5; or
a sequence whose $\{s_n\}$ index is 25, and q=6; or
a sequence whose $\{s_n\}$ index is 13, and q=7; or
a sequence whose $\{s_n\}$ index is 29, and q=8; or
a sequence whose $\{s_n\}$ index is 2, and q=9; or
a sequence whose $\{s_n\}$ index is 22, and q=10; or
a sequence whose $\{s_n\}$ index is 17, and q=11; or
a sequence whose $\{s_n\}$ index is 4, and q=12; or
a sequence whose $\{s_n\}$ index is 6, and q=13; or
a sequence whose $\{s_n\}$ index is 14, and q=14; or
a sequence whose $\{s_n\}$ index is 0, and q=15; or
a sequence whose $\{s_n\}$ index is 27, and q=16; or
a sequence whose $\{s_n\}$ index is 15, and q=17; or
a sequence whose $\{s_n\}$ index is 5, and q=18; or
a sequence whose $\{s_n\}$ index is 18, and q=19; or
a sequence whose $\{s_n\}$ index is 16, and q=20; or
a sequence whose $\{s_n\}$ index is 20, and q=21; or
a sequence whose $\{s_n\}$ index is 3, and q=22; or
a sequence whose $\{s_n\}$ index is 28, and q=23; or
a sequence whose $\{s_n\}$ index is 24, and q=24; or
a sequence whose $\{s_n\}$ index is 26, and q=25; or
a sequence whose $\{s_n\}$ index is 21, and q=26; or
a sequence whose $\{s_n\}$ index is 12, and q=27; or
a sequence whose $\{s_n\}$ index is 7, and q=28; or
a sequence whose $\{s_n\}$ index is 9, and q=29; or
a sequence whose $\{s_n\}$ index is 11, and q=30.

That is, in the fourth optional implementation of the foregoing embodiment, the combination of the sequence $\{s_n\}$ and q is at least one of the following combinations:
a sequence whose $\{s_n\}$ index is 10, and q=1; or
a sequence whose $\{s_n\}$ index is 23, and q=2; or
a sequence whose $\{s_n\}$ index is 19, and q=3; or
a sequence whose $\{s_n\}$ index is 4, and q=4; or
a sequence whose $\{s_n\}$ index is 8, and q=5; or
a sequence whose $\{s_n\}$ index is 25, and q=6; or
a sequence whose $\{s_n\}$ index is 13, and q=7; or
a sequence whose $\{s_n\}$ index is 29, and q=9; or
a sequence whose $\{s_n\}$ index is 2, and q=9; or
a sequence whose $\{s_n\}$ index is 22, and q=10; or
a sequence whose $\{s_n\}$ index is 17, and q=11; or
a sequence whose $\{s_n\}$ index is 1, and q=12; or
a sequence whose $\{s_n\}$ index is 6, and q=13; or
a sequence whose $\{s_n\}$ index is 14, and q=14; or
a sequence whose $\{s_n\}$ index is 18, and q=15; or
a sequence whose $\{s_n\}$ index is 27, and q=16; or
a sequence whose $\{s_n\}$ index is 15, and q=17; or
a sequence whose $\{s_n\}$ index is 5, and q=18; or
a sequence whose $\{s_n\}$ index is 7, and q=19; or
a sequence whose $\{s_n\}$ index is 16, and q=20; or
a sequence whose $\{s_n\}$ index is 0, and q=21; or
a sequence whose $\{s_n\}$ index is 3, and q=22; or
a sequence whose $\{s_n\}$ index is 28, and q=23; or
a sequence whose $\{s_n\}$ index is 24, and q=24; or
a sequence whose $\{s_n\}$ index is 26, and q=25; or
a sequence whose $\{s_n\}$ index is 20, and q=26; or
a sequence whose $\{s_n\}$ index is 12, and q=27; or
a sequence whose $\{s_n\}$ index is 21, and q=28; or
a sequence whose $\{s_n\}$ index is 9, and q=29; or
a sequence whose $\{s_n\}$ index is 11, and q=30.

Optionally, in this embodiment of the present invention, the first sequence is corresponding to the second sequence. A sending device sends a signal generated based on the second sequence. For example, the sending device may be a terminal device or a modem processor in the terminal device. A receiving device processes a received first signal based on the second sequence. For example, the receiving device may be an access network device or a processor in the access network device.

Optionally, when the first sequence is the sequence $\{x_n\}$, the second sequence is the sequence $\{f_n\}$. An element $f_n$ in the sequence $\{f_n\}$ satisfies $f_n = A \cdot x_n \cdot e^{j \cdot \alpha \cdot n}$.

Further, in the formula $f_n = A \cdot x_n \cdot e^{j \cdot \alpha \cdot n}$, A may be 1 and/or $\alpha$ may be 0. The first sequence and the second sequence may be a same sequence. For example, when A is 1 and $\alpha$ is 0 in the formula $f_n = A \cdot x_n \cdot e^{j \cdot \alpha \cdot n}$, the first sequence and the second sequence are the same.

When the first sequence is the sequence $\{y_m\}$, the second sequence is the sequence $\{g_m\}$. An element $g_m$ in the sequence $\{g_m\}$ satisfies $g_m = A \cdot y_m \cdot e^{j \cdot \alpha \cdot m}$.

Further, in the formula $g_m = A \cdot y_m \cdot e^{j \cdot \alpha \cdot m}$, A may be 1 and/or $\alpha$ may be 0. The first sequence and the second sequence may be a same sequence. For example, when A is 1 and $\alpha$ is 0 in the formula $g_m = A \cdot y_m \cdot e^{j \cdot \alpha \cdot m}$, the first sequence and the second sequence are the same.

$f_n$ is an element in the sequence $\{f_n\}$, $g_m$ is an element in the sequence $\{g_m\}$, a length of the sequence $\{f_n\}$ is N, a length of the sequence $\{g_m\}$ is M, n and m are integers, $0 \le n \le N-1$, and $0 \le m \le M-1$; and A is a non-zero complex number, $\alpha$ is a real number, and $j = \sqrt{-1}$.

Optionally, A may be a real number. Further, A may be 1.

It should be noted that A and $\alpha$ in the formula $f_n = A \cdot x_n \cdot e^{j \cdot \alpha \cdot n}$ that the element $f_n$ satisfies and the formula $g_m = A \cdot y_m \cdot e^{j \cdot \alpha \cdot m}$ that the element $g_m$ satisfies may be the same or different. For example, the formula that the element $f_n$ satisfies may be represented as $f_n = A \cdot x_n \cdot e^{j \cdot \alpha \cdot n}$, and the formula that the element $g_m$ satisfies may be represented as $g_m = B \cdot y_m \cdot e^{j \cdot \beta \cdot m}$. B and $\beta$ herein may refer to definitions of A and $\alpha$ above. For brevity, A and $\alpha$ are used for expression in both the two formulas in the specification.

Optionally, one or both of A and B may be a modulated symbol or modulated symbols. Alternatively, one or both of A and B may be a constant or constants. Alternatively, one or both of A and B may be a value or values determined based on a power control parameter. Certainly, A and B may be a combination of two of the foregoing modulated symbol, constant, and the value determined based on the power control parameter. For example, A is a modulated symbol, and B is a constant.

For example, A may be a power adjustment parameter of a to-be-sent signal.

For another example, A may be a modulated symbol. In this case, A is obtained by modulating a data information bit or an uplink control information (uplink control information, UCI) bit. A is carried on N elements included in a sequence to generate the second sequence, and A does not vary with N.

For another example, A is a constant. For example, A=1.

For another example, A may be a symbol known to the terminal device and a network device.

For another example, A may also represent amplitude.

It should be noted that A being a constant in one time unit does not represent that A is invariant, and when signals are sent in different time units, A is variable. One time unit may be duration of one OFDM symbol or one DFT-s-OFDM symbol. For example, for a subcarrier spacing of 15 kHz, duration of one OFDM symbol or one DFT-s-OFDM symbol is $\frac{1}{15000}$ second. For a subcarrier spacing of 30 kHz, duration of one OFDM symbol or one DFT-s-OFDM symbol is $\frac{1}{30000}$ second. For example, all N elements included in the sequence $\{f_n\}$ are a reference signal, and A is amplitude of the reference signal. When the terminal device sends the signal in a first time unit, A may be equal to 1. When the terminal device sends the signal in a second time unit, A may be equal to 2.

Optionally, in this embodiment of the present invention, the sequence $\{f_n\}$ is mapped to N subcarriers, and a center-frequency spacing of any two adjacent subcarriers in the N subcarriers is 2t times a subcarrier spacing. In a mapping manner with a spacing 2t times a subcarrier spacing, different users may be multiplexed in a same frequency range, thereby improving a multiplexing capability.

Optionally, the sequence $\{g_m\}$ is mapped to M subcarriers, and a center-frequency spacing of any two adjacent subcarriers in the M subcarriers is t times a subcarrier spacing. In a mapping manner with a spacing t times a subcarrier spacing, when the signal is used for channel estimation, channel estimation performance can be improved.

When N=12, in this embodiment of the present invention, the sequence $\{f_n\}$ is mapped to 12 subcarriers, and a center-frequency spacing of any two adjacent subcarriers in the 12 subcarriers is 2t times a subcarrier spacing.

When M=36, in this embodiment of the present invention, the sequence $\{g_m\}$ is mapped to 36 subcarriers, and a center-frequency spacing of any two adjacent subcarriers in the 36 subcarriers is t times a subcarrier spacing. In a mapping manner with a spacing t times a subcarrier spacing, when the signal is used for channel estimation, channel estimation performance can be improved.

The foregoing t is a positive integer.

Further, t may be 1. In this case, the sequence $\{f_n\}$ is mapped to N subcarriers, and a center-frequency spacing of any two adjacent subcarriers in the N subcarriers is two times a subcarrier spacing. The sequence $\{g_m\}$ is mapped to M subcarriers, and the M subcarriers are consecutive subcarriers.

Therefore, after generating the second sequence, the terminal device maps the second sequence to a corresponding subcarrier. For example, the terminal device or the modem processor in the terminal device may map the sequence $\{f_n\}$ to N equally-spaced subcarriers. Alternatively, the terminal device or the modem processor in the terminal device may map the sequence $\{g_m\}$ to M consecutive subcarriers.

The access network device processes a received signal based on the second sequence. The received signal is a signal mapped to N subcarriers, and a center-frequency spacing of any two adjacent subcarriers in the N subcarriers is 2t times a subcarrier spacing. Alternatively, the received signal is mapped to M subcarriers, and a center-frequency spacing of any two adjacent subcarriers in the M subcarriers is t times a subcarrier spacing. Optionally, the M subcarriers are consecutive subcarriers.

When N=12 and M=36, the sequence $\{f_n\}$ is mapped to 12 subcarriers, and a center-frequency spacing of any two adjacent subcarriers in the 12 subcarriers is 2t times a subcarrier spacing. The sequence $\{g_m\}$ is mapped to 36 subcarriers, and the 36 subcarriers are consecutive subcarriers.

Therefore, after generating the second sequence, the terminal device maps the second sequence to a corresponding subcarrier. For example, the terminal device or the modem processor in the terminal device may map the sequence $\{f_n\}$ to 12 equally-spaced subcarriers. Alternatively, the terminal device or the modem processor in the terminal device may map the sequence $\{g_m\}$ to 36 consecutive subcarriers.

The access network device processes a received signal based on the second sequence. The received signal is a signal mapped to 12 subcarriers, and a center-frequency spacing of any two adjacent subcarriers in the 12 subcarriers is 2t times a subcarrier spacing. Alternatively, the received signal is mapped to 36 subcarriers, and a center-frequency spacing of any two adjacent subcarriers in the 36 subcarriers is t times a subcarrier spacing. Optionally, the 36 subcarriers are consecutive subcarriers.

Optionally, in this embodiment of the present invention, the sequence group is corresponding to one index.

In an implementation, the index of the sequence group is determined based on an identity (identity, ID) configured by the access network device.

For example, the identity may be an identity of the terminal device. Alternatively, the identity may be a physical uplink control channel (PUCCH) ID. Alternatively, the identity may be a reference signal (RS) ID or the like.

For another example, the ID may be an ID used to determine an initialization parameter of some random sequences. For example, the random sequence is a random sequence corresponding to a sequence hopping pattern of a UCI sequence in a PUCCH format 1; or the random sequence is a random sequence corresponding to a cyclic shift hopping pattern of a UCI sequence in a PUCCH format 1; or the random sequence is a random sequence corresponding to a sequence hopping pattern of a DMRS sequence in a PUCCH format 1; or the random sequence is a random sequence corresponding to a cyclic shift hopping pattern of a DMRS sequence in a PUCCH format 1; or the random sequence is a random sequence corresponding to a sequence hopping pattern of a DMRS sequence in a PUCCH format 3 or a PUCCH format 4; or the random sequence is a random sequence corresponding to a cyclic shift hopping pattern of a DMRS sequence in a PUCCH format 3 or a PUCCH format 4; or the random sequence is a random sequence corresponding to a sequence hopping pattern of a sounding reference signal (SRS) sequence; or the random sequence is a random sequence corresponding to a cyclic shift hopping pattern of an SRS sequence.

In still another implementation, the index of the sequence group is determined based on an identity of a first time unit.

The first time unit is a time unit for sending the signal generated based on the second sequence.

In this embodiment, the identity of the time unit is used, so that the index of the sequence group that is determined based on the time unit varies with time, and interference between neighboring cells can be more randomized in a period of time.

In still another implementation, the index of the sequence group is determined based on the ID configured by the access network device and the identity of the time unit. The identity of the time unit may be an index of a slot or an index of a symbol.

In this embodiment, the ID and the identity of the time unit are used, so that the determined index of the sequence group varies with the ID and time, and interference between neighboring cells can be more randomized in a period of time. In this implementation, optionally, the index u of the sequence group satisfies the following relationship:

$$u = (f_{gh}(n_s) + f_{ss}) \bmod 30$$

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

where u is the index of the sequence group, $n_s$ is an index of a slot of a cell, such as an index of the first time unit, $f_{ss}$ is generated based on a reference signal (reference signal, RS) ID configured by the access network device, for example, $f_{ss} = n_{ID}^{RS} \bmod 30$, and $n_{ID}^{RS}$ indicates the RS ID.

c(i) is a pseudo random sequence and its formula may be as follows:

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

An initial value of c(i) is determined based on $$c_{init} = \left\lfloor \frac{n_{ID}^{RS}}{30} \right\rfloor \cdot N_c = 1600.$$

Therefore, the index u of the sequence group may be determined based on the index of the slot and the RS ID configured by the network device.

In still another implementation, the index of the sequence group is determined based on a cell identity.

Optionally, for the determining the index of the sequence group based on the cell identity, refer to the foregoing formula. That is, the RS ID is replaced with the cell identity.

This embodiment provides a plurality of sequence groups, and the sequence group is one of the plurality of sequence groups.

In an optional implementation, the plurality of sequence groups include a part or all of a first sequence group, a second sequence group, a third sequence group, a fourth sequence group, and a fifth sequence group.

A combination of $\{s_n\}$ and q that are corresponding to a sequence $\{x_n\}$ and a sequence $\{y_m\}$ that are included in the first sequence group is:
the sequence $\{s_n\}$ is $\{3, -1, -3, 3, -3, -1, 3, 3, 3, -3, -1, -3\}$, and q=6; in other words, a sequence whose $\{s_n\}$ index is 25, and q=6.

A combination of $\{s_n\}$ and q that are corresponding to a sequence $\{x_n\}$ and a sequence $\{y_m\}$ that are included in the second sequence group is:
the sequence $\{s_n\}$ is $\{-3, -3, 3, 3, 3, -3, -1, 1, -3, 3, 1, -3\}$, and q=7; in other words, a sequence whose $\{s_n\}$ index is 13, and q=7.

A combination of $\{s_n\}$ and q that are corresponding to a sequence $\{x_n\}$ and a sequence $\{y_m\}$ that are included in the third sequence group is:
the sequence $\{s_n\}$ is $\{-3, 3, 1, -3, 1, 3, -1, -1, 1, 3, 3, 3\}$, and q=16; in other words, a sequence whose $\{s_n\}$ index is 27, and q=16.

A combination of $\{s_n\}$ and q that are corresponding to a sequence $\{x_n\}$ and a sequence $\{y_m\}$ that are included in the fourth sequence group is:
the sequence $\{s_n\}$ is $\{1, -1, 3, -1, -1, -1, -3, -1, 1, 1, 1, -3\}$, and q=25; in other words, a sequence whose $\{s_n\}$ index is 26, and q=25.

A combination of $\{s_n\}$ and q that are corresponding to a sequence $\{x_n\}$ and a sequence $\{y_m\}$ that are included in the fifth sequence group is:
the sequence $\{s_n\}$ is $\{-3, 3, 3, 3, -1, -3, -3, -1, -3, 1, 3, -3\}$, and q=29; in other words, a sequence whose $\{s_n\}$ index is 9, and q=29.

Based on this implementation, in at least four cross-correlation measurement methods, it can be ensured that there is relatively high cross-correlation between a sending signal generated based on $\{s_n\}$ and a sending signal generated based on q in the five sequence groups, thereby reducing interference between neighboring cells.

In still another optional implementation, the plurality of sequence groups include a part or all of a first sequence group, a second sequence group, a third sequence group, a fourth sequence group, a fifth sequence group, a sixth sequence group, a seventh sequence group, an eighth sequence group, a ninth sequence group, a tenth sequence group, and an eleventh sequence group.

A combination of $\{s_n\}$ and q that are corresponding to a sequence $\{x_n\}$ and a sequence $\{y_m\}$ that are included in the first sequence group is:
the sequence $\{s_n\}$ is $\{3, -1, -3, 3, -3, -1, 3, 3, 3, -3, -1, -3\}$, and q=6; in other words, a sequence whose $\{s_n\}$ index is 25, and q=6.

A combination of $\{s_n\}$ and q that are corresponding to a sequence $\{x_n\}$ and a sequence $\{y_m\}$ that are included in the second sequence group is:
the sequence $\{s_n\}$ is $\{-3, -3, 3, 3, 3, -3, -1, 1, -3, 3, 1, -3\}$, and q=7; in other words, a sequence whose $\{s_n\}$ index is 13, and q=7.

A combination of $\{s_n\}$ and q that are corresponding to a sequence $\{x_n\}$ and a sequence $\{y_m\}$ that are included in the third sequence group is:
the sequence $\{s_n\}$ is $\{-3, -3, 3, 1, -3, -3, -3, -1, 3, -1, 1, 3\}$, and q=9; in other words, a sequence whose $\{s_n\}$ index is 15, and q=9.

A combination of $\{s_n\}$ and q that are corresponding to a sequence $\{x_n\}$ and a sequence $\{y_m\}$ that are included in the fourth sequence group is:
the sequence $\{s_n\}$ is $\{-3, 3, 1, 3, -3, 1, 1, 1, 1, 3, -3, 3\}$, and q=10; in other words, a sequence whose $\{s_n\}$ index is 3, and q=10.

A combination of $\{s_n\}$ and q that are corresponding to a sequence $\{x_n\}$ and a sequence $\{y_m\}$ that are included in the fifth sequence group is:
the sequence $\{s_n\}$ is $\{-3, 1, 3, -1, -1, -3, -3, -1, -1, 3, 1, -3\}$, and q=12; in other words, a sequence whose $\{s_n\}$ index is 4, and q=12.

A combination of $\{s_n\}$ and q that are corresponding to a sequence $\{x_n\}$ and a sequence $\{y_m\}$ that are included in the sixth sequence group is:
the sequence $\{s_n\}$ is $\{1, -1, 3, 1, 1, -1, -1, -1, 1, 3, -3, 1\}$, and q=15; in other words, a sequence whose $\{s_n\}$ index is 0, and q=15.

A combination of $\{s_n\}$ and q that are corresponding to a sequence $\{x_n\}$ and a sequence $\{y_m\}$ that are included in the seventh sequence group is:
the sequence $\{s_n\}$ is $\{-3, 3, 1, -3, 1, 3, -1, -1, 1, 3, 3, 3\}$, and q=16; in other words, a sequence whose $\{s_n\}$ index is 27, and q=16.

A combination of $\{s_n\}$ and q that are corresponding to a sequence $\{x_n\}$ and a sequence $\{y_m\}$ that are included in the eighth sequence group is:
the sequence $\{s_n\}$ is $\{-1, -1, -1, -1, 1, -3, -1, 3, 3, -1, -3, 1\}$, and q=20; in other words, a sequence whose $\{s_n\}$ index is 1, and q=2.

A combination of $\{s_n\}$ and q that are corresponding to a sequence $\{x_n\}$ and a sequence $\{y_m\}$ that are included in the ninth sequence group is:
the sequence $\{s_n\}$ is $\{-3, -1, 1, -3, 1, 3, 3, 3, -1, -3, 3, 3\}$, and q=22; in other words, a sequence whose $\{s_n\}$ index is 14, and q=22.

A combination of $\{s_n\}$ and q that are corresponding to a sequence $\{x_n\}$ and a sequence $\{y_m\}$ that are included in the tenth sequence group is:
the sequence $\{s_n\}$ is $\{1, -1, 3, -1, -1, -1, -3, -1, 1, 1, 1, -3\}$, and q=25; in other words, a sequence whose $\{s_n\}$ index is 26, and q=25.

A combination of $\{s_n\}$ and q that are corresponding to a sequence $\{x_n\}$ and a sequence $\{y_m\}$ that are included in the eleventh sequence group is:
the sequence $\{s_n\}$ is $\{-3, 3, 3, 3, -1, -3, -3, -1, -3, 1, 3, -3\}$, and q=29; in other words, a sequence whose $\{s_n\}$ index is 9, and q=29.

Based on this implementation, in at least two cross-correlation measurement methods, it can be ensured that there is relatively high cross-correlation between a sending signal generated based on $\{s_n\}$ and a sending signal generated based on q in the 11 sequence groups, thereby reducing interference between neighboring cells.

In still another optional implementation, the sequence group is one of a plurality of sequence groups, and the plurality of sequence groups include a part or all of a first sequence group, a second sequence group, a third sequence group, a fourth sequence group, and a fifth sequence group.

A combination of $\{s_n\}$ and q that are corresponding to a sequence $\{x_n\}$ and a sequence $\{y_m\}$ that are included in the first sequence group is:
the sequence $\{s_n\}$ is $\{-1, 1, 1, -1, 1, 3, 3, -1, -1, -3, 1, -3\}$, and q=9.

A combination of $\{s_n\}$ and q that are corresponding to a sequence $\{x_n\}$ and a sequence $\{y_m\}$ that are included in the second sequence group is:
the sequence $\{s_n\}$ is $\{-3, -3, 3, 1, -3, -3, -3, -1, 3, -1, 1, 3\}$, and q=12.

A combination of $\{s_n\}$ and q that are corresponding to a sequence $\{x_n\}$ and a sequence $\{y_m\}$ that are included in the third sequence group is:
the sequence $\{s_n\}$ is $\{-1, -3, 3, -1, -3, -3, -3, -1, 1, -1, 1, -3\}$, and q=21.

A combination of $\{s_n\}$ and q that are corresponding to a sequence $\{x_n\}$ and a sequence $\{y_m\}$ that are included in the fourth sequence group is:
the sequence $\{s_n\}$ is $\{-3, -1, -3, -1, -1, -3, 3, 3, -1, -1, 1, -3\}$, and q=22.

A combination of $\{s_n\}$ and q that are corresponding to a sequence $\{x_n\}$ and a sequence $\{y_m\}$ that are included in the fifth sequence group is:
the sequence $\{s_n\}$ is $\{-3, 3, 1, -1, 3, 3, -3, 1, -1, 1, -1, 1\}$, and q=26.

Based on this implementation, in at least two cross-correlation measurement methods, it can be ensured that there is relatively high cross-correlation between a sending signal generated based on $\{s_n\}$ and a sending signal generated based on q in the five sequence groups, thereby reducing interference between neighboring cells.

In still another optional implementation, the sequence group is one of a plurality of sequence groups, and the plurality of sequence groups include a part or all of a first sequence group, a second sequence group, a third sequence group, a fourth sequence group, a fifth sequence group, and a sixth sequence group.

A combination of $\{s_n\}$ and q that are corresponding to a sequence $\{x_n\}$ and a sequence $\{y_m\}$ that are included in the first sequence group is:
the sequence $\{s_n\}$ is $\{-3, -3, 3, -3, -1, 3, 3, 3, -1, -3, 1, -3\}$, and q=4.

A combination of $\{s_n\}$ and q that are corresponding to a sequence $\{x_n\}$ and a sequence $\{y_m\}$ that are included in the second sequence group is:
the sequence $\{s_n\}$ is $\{-3, -1, -1, 1, 3, 1, 1, -1, 1, -1, -3, 1\}$, and q=10.

A combination of $\{s_n\}$ and q that are corresponding to a sequence $\{x_n\}$ and a sequence $\{y_m\}$ that are included in the third sequence group is:
the sequence $\{s_n\}$ is $\{-3, -1, -3, -1, -1, -3, 3, 3, -1, -1, 1, -3\}$, and q=16.

A combination of $\{s_n\}$ and q that are corresponding to a sequence $\{x_n\}$ and a sequence $\{y_m\}$ that are included in the fourth sequence group is:
the sequence $\{s_n\}$ is $\{3, 1, 3, 1, 3, -3, -1, 1, 3, 1, -1, -3\}$, and q=21.

A combination of $\{s_n\}$ and q that are corresponding to a sequence $\{x_n\}$ and a sequence $\{y_m\}$ that are included in the fifth sequence group is:
the sequence $\{s_n\}$ is $\{-3, 1, -3, -3, -3, 3, -3, -1, 1, 1, 1, -3\}$, and q=27.

A combination of $\{s_n\}$ and q that are corresponding to a sequence $\{x_n\}$ and a sequence $\{y_m\}$ that are included in the sixth sequence group is:
the sequence $\{s_n\}$ is $\{1, 3, -3, 1, 3, 3, 3, 1, -1, 1, -1, 3\}$, and q=30.

Based on this implementation, in at least two cross-correlation measurement methods, it can be ensured that there is relatively high cross-correlation between a sending signal generated based on $\{s_n\}$ and a sending signal generated based on q in the six sequence groups, thereby reducing interference between neighboring cells.

In still another optional implementation, the sequence group is one of a plurality of sequence groups, and the plurality of sequence groups include a part or all of a first sequence group, a second sequence group, a third sequence group, a fourth sequence group, a fifth sequence group, a sixth sequence group, a seventh sequence group, an eighth sequence group, a ninth sequence group, a tenth sequence group, and an eleventh sequence group.

A combination of $\{s_n\}$ and q that are corresponding to a sequence $\{x_n\}$ and a sequence $\{y_m\}$ that are included in the first sequence group is:
the sequence $\{s_n\}$ is $\{3, -3, 3, -1, 1, 3, -3, -1, -3, -1, -3, 3, 1, -1, 3, -3, 3\}$, and q=2.

A combination of {$s_n$} and q that are corresponding to a sequence {$x_n$} and a sequence {$y_m$} that are included in the second sequence group is:

the sequence {$s_n$} is {−3, 3, 1, −1, −1, 3, −3, −1, 1, 1, 1, 1, 1, −1, 3, −1, −3, −1}, and q=3.

A combination of {$s_n$} and q that are corresponding to a sequence {$x_n$} and a sequence {$y_m$} that are included in the third sequence group is:

the sequence {$s_n$} is {−3, 3, −1, 1, 3, 1, −3, −1, 1, 1, −3, 1, 3, 3, −1, −3, −3, −3}, and q=7.

A combination of {$s_n$} and q that are corresponding to a sequence {$x_n$} and a sequence {$y_m$} that are included in the fourth sequence group is:

the sequence {$s_n$} is {3, −1, 3, 1, −3, −3, −1, 1, −3, −3, 3, 3, 3, 1, 3, −3, 3, −3}, and q=10.

A combination of {$s_n$} and q that are corresponding to a sequence {$x_n$} and a sequence {$y_m$} that are included in the fifth sequence group is:

the sequence {$s_n$} is {−3, −1, −3, −3, 1, 1, −1, −3, −1, −3, −1, −1, 3, 3, −1, 3, 1, 3}, and q=13.

A combination of {$s_n$} and q that are corresponding to a sequence {$x_n$} and a sequence {$y_m$} that are included in the sixth sequence group is:

the sequence {$s_n$} is {−3, 3, −1, −3, −1, −3, 1, 1, −3, −3, −1, −1, 3, −3, 1, 3, 1, 1}, and q=15.

A combination of {$s_n$} and q that are corresponding to a sequence {$x_n$} and a sequence {$y_m$} that are included in the seventh sequence group is:

the sequence {$s_n$} is {−3, 1, −3, −1, −1, 3, 1, −3, −3, −3, −1, −3, −3, 1, 1, 1, −1, −1}, and q=19.

A combination of {$s_n$} and q that are corresponding to a sequence {$x_n$} and a sequence {$y_m$} that are included in the eighth sequence group is:

the sequence {$s_n$} is {3, 3, 3, −3, −1, −3, −1, 3, −1, 1, −1, −3, 1, −3, −3, −1, 3, 3}, and q=20.

A combination of {$s_n$} and q that are corresponding to a sequence {$x_n$} and a sequence {$y_m$} that are included in the ninth sequence group is:

the sequence {$s_n$} is {−3, 1, 1, −3, 1, 1, 3, −3, −1, −3, −1, 3, −3, 3, −1, −1, −1, −3}, and q=21.

A combination of {$s_n$} and q that are corresponding to a sequence {$x_n$} and a sequence {$y_m$} that are included in the tenth sequence group is:

the sequence {$s_n$} is {3, 1, −3, 1, −3, 3, 3, −1, −3, −3, −1, −3, −3, 3, −3, −1, 1, 3}, and q=27.

A combination of {$s_n$} and q that are corresponding to a sequence {$x_n$} and a sequence {$y_m$} that are included in the eleventh sequence group is:

the sequence {$s_n$} is {−3, 3, 1, −1, −1, −1, −1, 1, −1, 3, 3, −3, −1, 1, 3, −1, 3, −1}, and q=30.

Based on this implementation, in at least two cross-correlation measurement methods, it can be ensured that there is relatively high cross-correlation between a sending signal generated based on {$s_n$} and a sending signal generated based on q in the 11 sequence groups, thereby reducing interference between neighboring cells.

In still another optional implementation, the sequence group is one of a plurality of sequence groups, and the plurality of sequence groups include a part or all of a first sequence group, a second sequence group, a third sequence group, a fourth sequence group, a fifth sequence group, a sixth sequence group, a seventh sequence group, an eighth sequence group, a ninth sequence group, a tenth sequence group, an eleventh sequence group, and a twelfth sequence group.

A combination of {$s_n$} and q that are corresponding to a sequence {$x_n$} and a sequence {$y_m$} that are included in the first sequence group is:

the sequence {$s_n$} is {−1, −3, 3, −1, 3, 1, 3, −1, 1, −3, −1, −3, −1, 1, 3, −3, −1, −3, 3, 3, 3, −3, −3, −3}, and q=1.

A combination of {$s_n$} and q that are corresponding to a sequence {$x_n$} and a sequence {$y_m$} that are included in the second sequence group is:

the sequence {$s_n$} is {1, −3, 3, −1, −3, −1, 3, 3, 1, −1, 1, 1, 3, −3, −1, −3, −3, −3, −1, 3, −3, −1, −3, −3}, and q=4.

A combination of {$s_n$} and q that are corresponding to a sequence {$x_n$} and a sequence {$y_m$} that are included in the third sequence group is:

the sequence {$s_n$} is {−3, 1, 3, −1, 1, −1, 3, −3, 3, −1, −3, −1, −3, 3, −1, −1, −1, −3, −1, −1, −3, 3, 3, −3}, and q=S.

A combination of {$s_n$} and q that are corresponding to a sequence {$x_n$} and a sequence {$y_m$} that are included in the fourth sequence group is:

the sequence {$s_n$} is {1, 1, −1, −3, −1, 1, 1, −3, 1, −1, 1, −3, 3, −3, −3, 3, −1, −3, 1, 3, −3, 1, −3, −3}, and q=10.

A combination of {$s_n$} and q that are corresponding to a sequence {$x_n$} and a sequence {$y_m$} that are included in the fifth sequence group is:

the sequence {$s_n$} is {−3, 3, −1, 3, 1, −1, −1, −1, 3, 3, 1, 1, 1, 3, 3, 1, −3, −3, −1, 1, −3, 1, 3, −3}, and q=12.

A combination of {$s_n$} and q that are corresponding to a sequence {$x_n$} and a sequence {$y_m$} that are included in the sixth sequence group is:

the sequence {$s_n$} is {−3, 1, −3, −1, −1, 3, 1, 3, −3, 1, −1, 3, 3, −1, −3, 3, −3, −1, −1, −3, −3, −3, 3, −3}, and q=15.

A combination of {$s_n$} and q that are corresponding to a sequence {$x_n$} and a sequence {$y_m$} that are included in the seventh sequence group is:

the sequence {$s_n$} is {−3, −1, −1, −3, 1, −3, −3, −1, −1, 3, −1, 1, −1, 3, 1, −3, −1, 3, 1, 1, −1, −1, −3, −3}, and q=16.

A combination of {$s_n$} and q that are corresponding to a sequence {$x_n$} and a sequence {$y_m$} that are included in the eighth sequence group is:

the sequence {$s_n$} is {−3, −3, −1, −1, −1, −3, 1, −1, −3, −1, 3, −3, 1, −3, 3, −3, 3, 3, 1, −1, −1, 1, −3, −3}, and q=21.

A combination of {$s_n$} and q that are corresponding to a sequence {$x_n$} and a sequence {$y_m$} that are included in the ninth sequence group is:

the sequence {$s_n$} is {−3, 3, −1, −3, −1, −1, −1, 3, −1, −1, 3, −3, −1, 3, −3, 3, −3, −1, 3, 1, 1, −1, −3, −3}, and q=26.

A combination of {$s_n$} and q that are corresponding to a sequence {$x_n$} and a sequence {$y_m$} that are included in the tenth sequence group is:

the sequence {$s_n$} is {−3, 1, −1, −3, −3, −1, 1, −3, −1, −3, 1, 1, −1, 1, 1, 3, 3, 3, −1, 1, −1, 1, −1, −3}, and q=27.

A combination of {$s_n$} and q that are corresponding to a sequence {$x_n$} and a sequence {$y_m$} that are included in the eleventh sequence group is:

the sequence {$s_n$} is {−3, 1, −3, 1, −3, 1, 1, 3, 1, −3, −3, −1, 1, 3, −1, −3, 3, 1, −1, −3, −3, −3, −3, −3}, and q=29.

A combination of {$s_n$} and q that are corresponding to a sequence {$x_n$} and a sequence {$y_m$} that are included in the twelfth sequence group is:

the sequence {$s_n$} is {3, −3, −1, 1, 3, −1, −1, −3, −1, 3, −1, −3, −1, −3, 3, −1, 3, 1, 1, −3, 3, −3, −3, −3}, and q=30.

Based on this implementation, in at least two cross-correlation measurement methods, it can be ensured that there is relatively high cross-correlation between a sending signal generated based on {$s_n$} and a sending signal generated based on q in the twelve sequence groups, thereby reducing interference between neighboring cells.

Further, the sequence group in this embodiment of the present invention further includes a sequence $\{z_m\}$. In this case, when the first sequence is the sequence $\{z_m\}$, the second sequence is a sequence $\{h_m\}$.

An element $h_m$ in the sequence $\{h_m\}$ satisfies $$z_m = l_p(m \mod M_{prime}), l_p(i) = e^{-j\frac{\pi \cdot p \cdot i \cdot (i+1)}{M_{prime}}},$$

i is an integer, $0 \leq i \leq M_{prime}-1$, and $M_{prime}$ is a largest prime number smaller than M.

An element $h_m$ in the sequence $\{h_m\}$ satisfies $h_m = A \cdot z_m \cdot e^{j \cdot \alpha \cdot m}$.

A combination of $\{s_n\}$ and a value of p is at least one of the following combinations:

the sequence $\{s_n\}$ is $\{-3, 3, 1, -1, 3, 3, -3, 1, -1, 1, -1, 1\}$, and p=1; or
the sequence $\{s_n\}$ is $\{-3, 3, 1, -3, 1, 3, -1, -1, 1, 3, 3, 3\}$, and p=2; or
the sequence $\{s_n\}$ is $\{-3, 3, 3, 1, -3, 3, -1, 1, 3, -3, 3, -3\}$, and p=3; or
the sequence $\{s_n\}$ is $\{-3, 3, 1, 3, -3, 1, 1, 1, 1, 3, -3, 3\}$, and p=4; or
the sequence $\{s_n\}$ is $\{-1, -3, 3, -1, -3, -3, -3, -1, 1, -1, 1, -3\}$, and p=5; or
the sequence $\{s_n\}$ is $\{-3, -3, 3, 1, -3, -3, -3, -1, 3, -1, 1, 3\}$, and p=6; or
the sequence $\{s_n\}$ is $\{1, -1, 3, -1, -1, -1, -3, -1, 1, 1, 1, -3\}$, and p=7; or
the sequence $\{s_n\}$ is $\{-3, -1, 3, 1, -3, -1, -3, 3, 1, 3, 3, 1\}$, and p=8; or
the sequence $\{s_n\}$ is $\{-3, 3, -3, 3, -3, -3, 3, -1, -1, 1, 3, -3\}$, and p=9; or
the sequence $\{s_n\}$ is $\{-1, 1, 1, -1, 1, 3, 3, -1, -1, -3, 1, -3\}$, and p=10; or
the sequence $\{s_n\}$ is $\{-3, 3, -3, 3, 3, -3, -1, -1, 3, 3, 1, -3\}$, and p=11; or
the sequence $\{s_n\}$ is $\{-3, -3, 3, -3, -1, 3, 3, 3, -1, -3, 1, -3\}$, and p=12; or
the sequence $\{s_n\}$ is $\{-3, -1, -1, -3, -3, -1, -3, 3, 1, 3, -1, -3\}$, and p=13; or
the sequence $\{s_n\}$ is $\{-3, -1, -1, 1, 3, 1, 1, -1, 1, -1, -3, 1\}$, and p=14; or
the sequence $\{s_n\}$ is $\{3, 1, 3, 1, 3, -3, -1, 1, 3, 1, -1, -3\}$, and p=15; or
the sequence $\{s_n\}$ is $\{-3, 1, 3, -1, -1, -3, -3, -1, -1, 3, 1, -3\}$, and p=16; or
the sequence $\{s_n\}$ is $\{-1, -1, -1, -1, 1, -3, -1, 3, 3, -1, -3, 1\}$, and p=17; or
the sequence $\{s_n\}$ is $\{-1, 1, 3, -3, 1, -1, 1, -1, -1, -3, 1, -1\}$, and p=18; or
the sequence $\{s_n\}$ is $\{-3, 1, 3, 3, -1, -1, -3, 3, 3, -3, 3, -3\}$, and p=19; or
the sequence $\{s_n\}$ is $\{-3, 1, -1, -1, 3, 3, -3, -1, -1, -3, -1, -3\}$, and p=20; or
the sequence $\{s_n\}$ is $\{-3, -3, -1, 3, 3, 3, -3, 3, -3, 1, -1, -3\}$, and p=21; or
the sequence $\{s_n\}$ is $\{-3, 1, -3, -3, -3, 3, -3, -1, 1, 1, 1, -3\}$, and p=22; or
the sequence $\{s_n\}$ is $\{-3, 3, 3, 3, -1, -3, -3, -1, -3, 1, 3, -3\}$, and p=23; or
the sequence $\{s_n\}$ is $\{3, -1, -3, 3, -3, -1, 3, 3, 3, -3, -1, -3\}$, and p=24; or
the sequence $\{s_n\}$ is $\{-3, -1, 1, -3, 1, 3, 3, 3, -1, -3, 3, 3\}$, and p=25; or
the sequence $\{s_n\}$ is $\{1, 3, -3, 1, 3, 3, 3, 1, -1, 1, -1, 3\}$, and p=26; or
the sequence $\{s_n\}$ is $\{-3, -1, -3, -1, -1, -3, 3, 3, -1, -1, 1, -3\}$, and p=27; or
the sequence $\{s_n\}$ is $\{-3, -3, 3, 3, 3, -3, -1, 1, -3, 3, 1, -3\}$, and p=28; or
the sequence $\{s_n\}$ is $\{1, -1, 3, 1, 1, -1, -1, -1, 1, 3, -3, 1\}$, and p=29; or
the sequence $\{s_n\}$ is $\{-3, -1, 3, -3, -3, -1, -3, 1, -1, -3, 3, 3\}$, and p=30.

Alternatively, a combination of the sequence $\{s_n\}$ and p is at least one of the following combinations:

the sequence $\{s_n\}$ is $\{-3, 1, -3, -3, -3, 3, -3, -1, 1, 1, 1, -3\}$, and p=1; or
the sequence $\{s_n\}$ is $\{-3, 3, 1, -3, 1, 3, -1, -1, 1, 3, 3, 3\}$, and p=2; or
the sequence $\{s_n\}$ is $\{-3, 3, 3, 1, -3, 3, -1, 1, 3, -3, 3, -3\}$, and p=3; or
the sequence $\{s_n\}$ is $\{-3, 3, 1, 3, -3, 1, 1, 1, 1, 3, -3, 3\}$, and p=4; or
the sequence $\{s_n\}$ is $\{-1, 1, 1, -1, 1, 3, 3, -1, -1, -3, 1, -3\}$, and p=5; or
the sequence $\{s_n\}$ is $\{-3, -3, 3, 1, -3, -3, -3, -1, 3, -1, 1, 3\}$, and p=6; or
the sequence $\{s_n\}$ is $\{1, -1, 3, -1, -1, -1, -3, -1, 1, 1, 1, -3\}$, and p=7; or
the sequence $\{s_n\}$ is $\{-3, -3, -1, 3, 3, 3, -3, 3, -3, 1, -1, -3\}$, and p=8; or
the sequence $\{s_n\}$ is $\{-3, 3, -3, 3, 3, -3, -1, -1, 3, 3, 1, -3\}$, and p=9; or
the sequence $\{s_n\}$ is $\{-3, -1, -3, -1, -1, -3, 3, 3, -1, -1, 1, -3\}$, and p=10; or
the sequence $\{s_n\}$ is $\{1, 3, -3, 1, 3, 3, 3, 1, -1, 1, -1, 3\}$, and p=11; or
the sequence $\{s_n\}$ is $\{-1, -3, 3, -1, -3, -3, -3, -1, 1, -1, 1, -3\}$, and p=12; or
the sequence $\{s_n\}$ is $\{3, 1, 3, 1, 3, -3, -1, 1, 3, 1, -1, -3\}$, and p=13; or
the sequence $\{s_n\}$ is $\{-1, 1, 3, -3, 1, -1, 1, -1, -1, -3, 1, -1\}$, and p=14; or
the sequence $\{s_n\}$ is $\{-3, -1, -1, 1, 3, 1, 1, -1, 1, -1, -3, 1\}$, and p=15; or
the sequence $\{s_n\}$ is $\{-3, 1, 3, -1, -1, -3, -3, -1, -1, 3, 1, -3\}$, and p=16; or
the sequence $\{s_n\}$ is $\{-1, -1, -1, -1, 1, -3, -1, 3, 3, -1, -3, 1\}$, and p=17; or
the sequence $\{s_n\}$ is $\{-3, -1, 3, -3, -3, -1, -3, 1, -1, -3, 3, 3\}$, and p=18; or
the sequence $\{s_n\}$ is $\{-3, -3, 3, -3, -1, 3, 3, 3, -1, -3, 1, -3\}$, and p=19; or
the sequence $\{s_n\}$ is $\{-3, 1, -1, -1, 3, 3, -3, -1, -1, -3, -1, -3\}$, and p=20; or
the sequence $\{s_n\}$ is $\{-3, 1, 3, 3, -1, -1, -3, 3, 3, -3, 3, -3\}$, and p=21; or
the sequence $\{s_n\}$ is $\{-3, -1, -1, -3, -3, -1, -3, 3, 1, 3, -1, -3\}$, and p=22; or
the sequence $\{s_n\}$ is $\{-3, 3, 3, 3, -1, -3, -3, -1, -3, 1, 3, -3\}$, and p=23; or
the sequence $\{s_n\}$ is $\{3, -1, -3, 3, -3, -1, 3, 3, 3, -3, -1, -3\}$, and p=24; or
the sequence $\{s_n\}$ is $\{-3, -1, 1, -3, 1, 3, 3, -1, -3, 3, 3\}$, and p=25; or
the sequence $\{s_n\}$ is $\{-3, -1, 3, 1, -3, -1, -3, 3, 1, 3, 3, 1\}$, and p=26; or the sequence $\{s_n\}$ is $\{-3, 3, -3, 3, -3, -3, 3, -1, -1, 1, 3, -3\}$, and p=27; or the sequence $\{s_n\}$ is $\{-3, -3, 3, 3, 3, -3, -1, 1, -3, 3, 1, -3\}$, and p=28; or the sequence $\{s_n\}$ is $\{1, -1, 3, 1, 1, -1, -1, -1, 1, 3, -3, 1\}$, and p=29; or the sequence $\{s_n\}$ is $\{-3, 3, 1, -1, 3, 3, -3, 1, -1, 1, -1, 1\}$, and p=30.

Alternatively, a combination of the sequence $\{s_n\}$ and p is at least one of the following combinations:

the sequence $\{s_n\}$ is $\{-3, 3, 1, -1, 3, 3, -3, 1, -1, 1, -1, 1\}$, and p=1; or the sequence $\{s_n\}$ is $\{-3, 3, 1, -3, 1, 3, -1, -1, 1, 3, 3, 3\}$, and p=2; or the sequence $\{s_n\}$ is $\{-3, 3, 3, 1, -3, 3, -1, 1, 3, -3, 3, -3\}$, and p=3; or the sequence $\{s_n\}$ is $\{-3, -1, -3, -1, -1, -3, 3, 3, -1, -1, 1, -3\}$, and p=4; or the sequence $\{s_n\}$ is $\{-1, -3, 3, -1, -3, -3, -3, -1, 1, -1, 1, -3\}$, and p=5; or the sequence $\{s_n\}$ is $\{-3, -3, 3, 1, -3, -3, -3, -1, 3, -1, 1, 3\}$, and p=6; or the sequence $\{s_n\}$ is $\{1, -1, 3, -1, -1, -1, -3, -1, 1, 1, 1, -3\}$, and p=7; or the sequence $\{s_n\}$ is $\{-3, -1, -1, 1, 3, 1, 1, -1, 1, -1, -3, 1\}$, and p=8; or the sequence $\{s_n\}$ is $\{-3, -1, -1, -3, -3, -1, -3, 3, 1, 3, -1, -3\}$, and p=9; or the sequence $\{s_n\}$ is $\{-1, 1, 1, -1, 1, 3, 3, -1, -1, -3, 1, -3\}$, and p=10; or the sequence $\{s_n\}$ is $\{-3, 3, -3, 3, 3, -3, -1, -1, 3, 3, 1, -3\}$, and p=11; or the sequence $\{s_n\}$ is $\{-3, -3, 3, -3, -1, 3, 3, 3, -1, -3, 1, -3\}$, and p=12; or the sequence $\{s_n\}$ is $\{3, 1, 3, 1, 3, -3, -1, 1, 3, 1, -1, -3\}$, and p=13; or the sequence $\{s_n\}$ is $\{-3, -1, 3, -3, -3, -1, -3, 1, -1, -3, 3, 3\}$, and p=14; or the sequence $\{s_n\}$ is $\{-3, 3, 1, 3, -3, 1, 1, 1, 3, -3, 3\}$, and p=15; or the sequence $\{s_n\}$ is $\{-3, 1, -3, -3, -3, 3, -3, -1, 1, 1, 1, -3\}$, and p=16; or the sequence $\{s_n\}$ is $\{-1, -1, -1, -1, 1, -3, -1, 3, 3, -1, -3, 1\}$, and p=17; or the sequence $\{s_n\}$ is $\{-1, 1, 3, -3, 1, -1, 1, -1, -1, -3, 1, -1\}$, and p=18; or the sequence $\{s_n\}$ is $\{-3, 1, 3, 3, -1, -1, -3, 3, 3, -3, 3, -3\}$, and p=19; or the sequence $\{s_n\}$ is $\{-3, 1, -1, -1, 3, 3, -3, -1, -1, -3, -1, -3\}$, and p=20; or the sequence $\{s_n\}$ is $\{-3, -3, -1, 3, 3, 3, -3, 3, -3, 1, -1, -3\}$, and p=21; or the sequence $\{s_n\}$ is $\{-3, -1, 3, 1, -3, -1, -3, 3, 1, 3, 3, 1\}$, and p=22; or the sequence $\{s_n\}$ is $\{-3, 3, 3, 3, -1, -3, -3, -1, -3, 1, 3, -3\}$, and p=23; or the sequence $\{s_n\}$ is $\{3, -1, -3, 3, -3, -1, 3, 3, 3, -3, -1, -3\}$, and p=24; or the sequence $\{s_n\}$ is $\{-3, -1, 1, -3, 1, 3, 3, 3, -1, -3, 3, 3\}$, and p=25; or the sequence $\{s_n\}$ is $\{1, 3, -3, 1, 3, 3, 3, 1, -1, 1, -1, 3\}$, and p=26; or the sequence $\{s_n\}$ is $\{-3, 3, 1, 3, -1, -1, -3, -3, -1, 3, 1, -3\}$, and p=27; or the sequence $\{s_n\}$ is $\{-3, -3, 3, 3, 3, -3, -1, 1, -3, 3, 1, -3\}$, and p=28; or the sequence $\{s_n\}$ is $\{1, -1, 3, 1, 1, -1, -1, -1, 1, 3, -3, 1\}$, and p=29; or the sequence $\{s_n\}$ is $\{-3, 3, -3, 3, -3, -3, 3, -1, -1, 1, 3, -3\}$, and p=30.

The sequence $\{h_m\}$ is mapped to M subcarriers, and a center-frequency spacing of any two adjacent subcarriers in the M subcarriers is 2t times a subcarrier spacing, where t is a positive integer.

It should be noted that, in the formula $h_m = A \cdot z_m \cdot e^{j \cdot \alpha \cdot m}$, A may be 1 and/or $\alpha$ may be 0. Further, the first sequence and the second sequence may also be a same sequence, that is, A may be 1 and $\alpha$ may be 0.

Optionally, when M=36, an element $y_m$ in the sequence $\{y_m\}$ satisfies $$y_m = k_q(m \mod 31), k_q(i) = e^{-j\frac{\pi \cdot q \cdot i \cdot (i+1)}{31}},$$

i is an integer and $0 \leq i \leq 30$. The sequence $\{g_m\}$ is mapped to 36 subcarriers, a center-frequency spacing of any two adjacent subcarriers in the 36 subcarriers is 2t times a subcarrier spacing, and t is a positive integer.

Based on this implementation, it can be ensured that there is relatively high cross-correlation between sending signals when a sending signal generated based on $\{s_n\}$ and a sending signal generated based on p use a same mapping manner, thereby reducing interference between neighboring cells.

It should be noted that A and a in the formula $f_n = A \cdot x_n \cdot e^{j \cdot \alpha \cdot n}$ that the element $f_n$ satisfies, the formula $g_m = A \cdot y_m \cdot e^{j \cdot \alpha \cdot n}$ that the element $g_m$ satisfies, and the formula $h_m = A \cdot z_m \cdot e^{j \cdot \alpha \cdot n}$ that the element $h_m$ satisfies may be the same or different, or A and a in two of the formulas are the same. For example, the formula that the element $f_n$ satisfies may be represented as $f_n = A \cdot x_n \cdot e^{j \cdot \alpha \cdot n}$ and the formula that the element $g_m$ satisfies may be represented as $g_m = B \cdot y_m \cdot e^{j \cdot \beta \cdot n}$. The formula that the element $h_m$ satisfies may be represented as $h_m = C \cdot z_m \cdot e^{j \cdot \gamma \cdot n}$. For C and $\gamma$ herein, refer to definitions of A and $\alpha$ above. For brevity, A and $\alpha$ are used for expression in all the three formulas in the specification.

That is, a combination of the sequence $\{s_n\}$ and p is at least one of the following combinations:

a sequence whose $\{s_n\}$ index is 29, and p=1; or
a sequence whose $\{s_n\}$ index is 27, and p=2; or
a sequence whose $\{s_n\}$ index is 24, and p=3; or
a sequence whose $\{s_n\}$ index is 3, and p=4; or
a sequence whose $\{s_n\}$ index is 11, and p=5; or
a sequence whose $\{s_n\}$ index is 15, and p=6; or
a sequence whose $\{s_n\}$ index is 26, and p=7; or
a sequence whose $\{s_n\}$ index is 23, and p=8; or
a sequence whose $\{s_n\}$ index is 28, and p=9; or
a sequence whose $\{s_n\}$ index is 5, and p=10; or
a sequence whose $\{s_n\}$ index is 7, and p=11; or
a sequence whose $\{s_n\}$ index is 19, and p=12; or
a sequence whose $\{s_n\}$ index is 22, and p=13; or
a sequence whose $\{s_n\}$ index is 17, and p=14; or
a sequence whose $\{s_n\}$ index is 12, and p=15; or
a sequence whose $\{s_n\}$ index is 4, and p=16; or
a sequence whose $\{s_n\}$ index is 1, and p=17; or
a sequence whose $\{s_n\}$ index is 16, and p=13; or
a sequence whose $\{s_n\}$ index is 21, and p=19; or
a sequence whose $\{s_n\}$ index is 20, and p=20; or
a sequence whose $\{s_n\}$ index is 6, and p=21; or
a sequence whose $\{s_n\}$ index is 2, and p=22; or
a sequence whose $\{s_n\}$ index is 9, and p=23; or
a sequence whose $\{s_n\}$ index is 25, and p=24; or a sequence whose {$s_n$} index is 14, and p=25; or
a sequence whose {$s_n$} index is 10, and p=26; or
a sequence whose {$s_n$} index is 8, and p=27; or
a sequence whose {$s_n$} index is 13, and p=23; or
a sequence whose {$s_n$} index is 0, and p=29; or
a sequence whose {$s_n$} index is 18, and p=30.

Alternatively, a combination of the sequence {$s_n$} and p is at least one of the following combinations:
a sequence whose {$s_n$} index is 2, and p=1; or
a sequence whose {$s_n$} index is 27, and p=2; or
a sequence whose {$s_n$} index is 24, and p=3; or
a sequence whose {$s_n$} index is 3, and p=4; or
a sequence whose {$s_n$} index is 5, and p=5; or
a sequence whose {$s_n$} index is 15, and p=6; or
a sequence whose {$s_n$} index is 26, and p=7; or
a sequence whose {$s_n$} index is 6, and p=3; or
a sequence whose {$s_n$} index is 7, and p=9; or
a sequence whose {$s_n$} index is 8, and p=10; or
a sequence whose {$s_n$} index is 10, and p=11; or
a sequence whose {$s_n$} index is 11, and p=12; or
a sequence whose {$s_n$} index is 12, and p=13; or
a sequence whose {$s_n$} index is 16, and p=14; or
a sequence whose {$s_n$} index is 17, and p=15; or
a sequence whose {$s_n$} index is 4, and p=16; or
a sequence whose {$s_n$} index is 1, and p=17; or
a sequence whose {$s_n$} index is 18, and p=18; or
a sequence whose {$s_n$} index is 19, and p=19; or
a sequence whose {$s_n$} index is 20, and p=20; or
a sequence whose {$s_n$} index is 21, and p=21; or
a sequence whose {$s_n$} index is 22, and p=22; or
a sequence whose {$s_n$} index is 9, and p=23; or
a sequence whose {$s_n$} index is 25, and p=24; or
a sequence whose {$s_n$} index is 14, and p=25; or
a sequence whose {$s_n$} index is 23, and p=26; or
a sequence whose {$s_n$} index is 28, and p=27; or
a sequence whose {$s_n$} index is 13, and p=28; or
a sequence whose {$s_n$} index is 0, and p=29; or
a sequence whose {$s_n$} index is 29, and p=30.

Alternatively, a combination of the sequence {$s_n$} and p is at least one of the following combinations:
a sequence whose {$s_n$} index is 29, and p=1; or
a sequence whose {$s_n$} index is 27, and p=2; or
a sequence whose {$s_n$} index is 24, and p=3; or
a sequence whose {$s_n$} index is 8, and p=4; or
a sequence whose {$s_n$} index is 11, and p=5; or
a sequence whose {$s_n$} index is 15, and p=6; or
a sequence whose {$s_n$} index is 26, and p=7; or
a sequence whose {$s_n$} index is 17, and p=8; or
a sequence whose {$s_n$} index is 22, and p=9; or
a sequence whose {$s_n$} index is 5, and p=10; or
a sequence whose {$s_n$} index is 7, and p=11; or
a sequence whose {$s_n$} index is 19, and p=12; or
a sequence whose {$s_n$} index is 12, and p=13; or
a sequence whose {$s_n$} index is 18, and p=14; or
a sequence whose {$s_n$} index is 3, and p=15; or
a sequence whose {$s_n$} index is 2, and p=16; or
a sequence whose {$s_n$} index is 1, and p=17; or
a sequence whose {$s_n$} index is 16, and p=18; or
a sequence whose {$s_n$} index is 21, and p=19; or
a sequence whose {$s_n$} index is 20, and p=20; or
a sequence whose {$s_n$} index is 6, and p=21; or
a sequence whose {$s_n$} index is 23, and p=22; or
a sequence whose {$s_n$} index is 9, and p=23; or
a sequence whose {$s_n$} index is 25, and p=24; or
a sequence whose {$s_n$} index is 14, and p=25; or
a sequence whose {$s_n$} index is 10, and p=26; or
a sequence whose {$s_n$} index is 4, and p=27; or
a sequence whose {$s_n$} index is 13, and p=28; or
a sequence whose {$s_n$} index is 0, and p=29; or
a sequence whose {$s_n$} index is 28, and q=30.

The sequence {$g_m$} is mapped to M subcarriers, and a center-frequency spacing of any two adjacent subcarriers in the M subcarriers is 2t times a subcarrier spacing, where t is a positive integer.

When M=36, an element $y_m$ in the sequence {$y_m$} satisfies $$y_m = k_q(m \mod 31), k_q(i) = e^{-j\frac{\pi \cdot q \cdot i \cdot (i+1)}{31}},$$

i is an integer, and $0 \leq i \leq 30$. The sequence {$g_m$} is mapped to 36 subcarriers, a center-frequency spacing of any two adjacent subcarriers in the 36 subcarriers is 2t times a subcarrier spacing, and t is a positive integer.

Optionally, the second sequence in this embodiment of the present invention may be used to send uplink control information or a reference signal.

The following further provides how the foregoing sequence group is applied to the embodiments of the present invention with reference to the foregoing embodiment.

Figure 4:
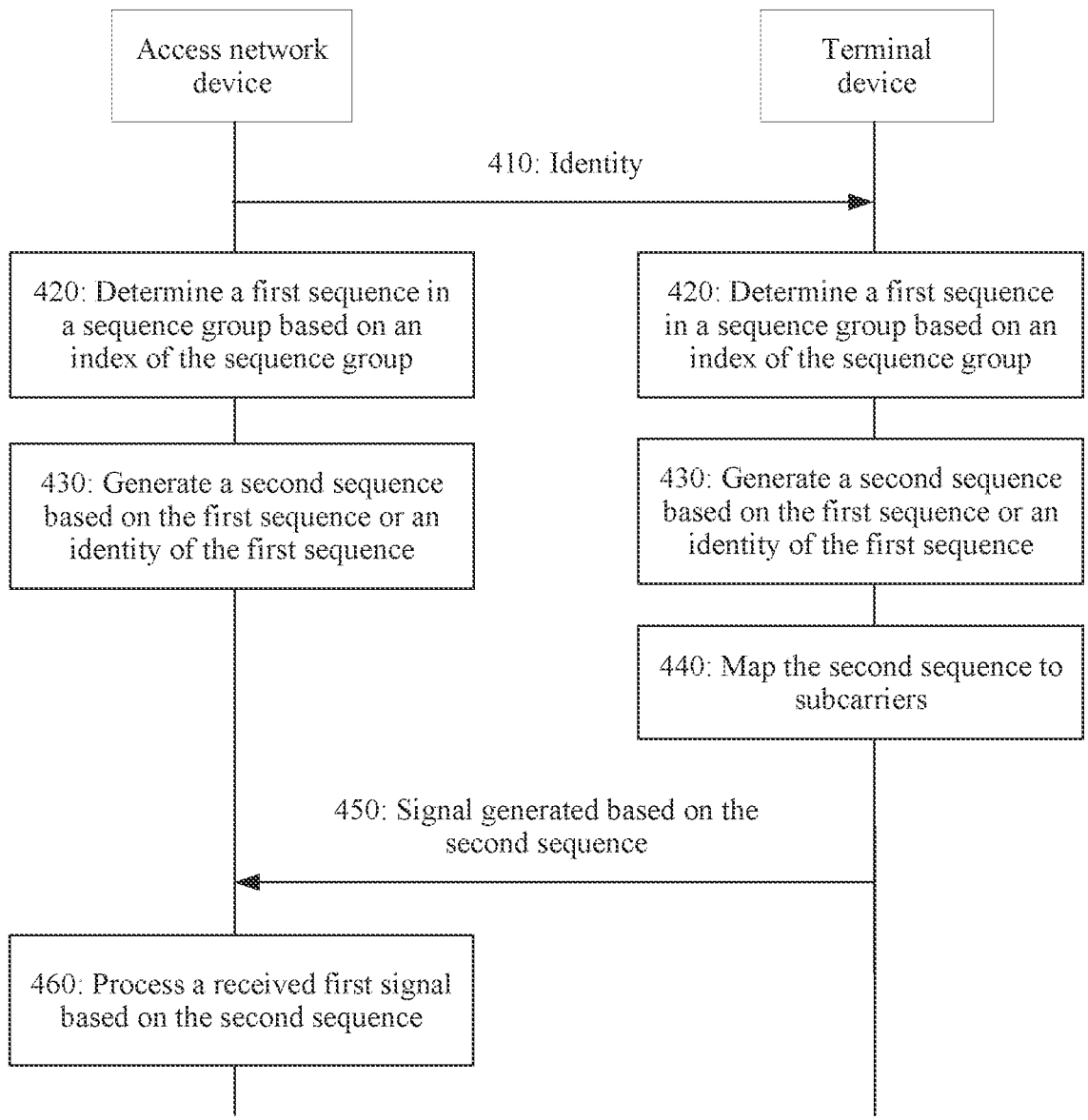
FIG. 4 is a schematic signaling diagram of a method according to an embodiment of the present invention.

This embodiment provides a sequence determining method. FIG. 4 is a schematic signaling diagram of the method according to this embodiment of the present invention. It should be noted that some steps in FIG. 4 and in the following are optional, and there is no limitation that all steps need to be included in this embodiment of the present invention. In addition, sequence numbers of steps are merely used for description and do not represent a sequence.

Step 410: An access network device sends an identity to a terminal device. The terminal device receives the identity. This step is optional.

The access network device may send the identity to the terminal device by using higher layer signaling.

For example, the higher layer signaling may be a radio resource control (RRC) message.

For the identity, refer to the foregoing description, and details are not described herein again.

When the identity is a cell identity, this step may be that the access network device indicates the identity to the terminal device by using a synchronization signal, and the terminal device may obtain the cell identity by detecting the synchronization signal.

The action in this step may be implemented by the transceiver 301 in the terminal device 104 described above. Certainly, the action in this step may be implemented by the modem processor 304 and the transceiver 301 in the terminal device 104 described above. The action in this step may be implemented by the transceiver 202 in the access network device 102 described above. Certainly, the action in this step may be implemented by the processor 201 and the transceiver 202 in the access network device 102 described above.

Step 420: Determine a first sequence in a sequence group based on an index of the sequence group.

It should be noted that, in this step, determining the first sequence in the sequence group based on the index of the sequence group may be:
determining an index of the first sequence in the sequence group based on the index of the sequence group.

Alternatively, in this step, determining the first sequence in the sequence group based on the index of the sequence group may be:

determining an element in the first sequence in the sequence group based on the index of the sequence group.

It should be noted that the first sequence and a second sequence have a same index. Therefore, the index of the first sequence and an index of the second sequence may be the same in this embodiment. Therefore, step 420 may also be determining an index of a sequence based on the index of the sequence group, and the index may be the index of the second sequence.

Further, if the index of the sequence group is determined based on an identity, this step may include: determining the index of the sequence group based on the identity and the foregoing method; and determining the index of the first sequence in the sequence group or determining the element in the first sequence in the sequence group based on the index of the sequence group and a length of a to-be-sent signal.

For example, if a quantity of elements included in the to-be-sent signal is N, the first sequence is the foregoing sequence $\{x_n\}$. If the quantity of elements included in the to-be-sent signal is M, the first sequence is the foregoing sequence $\{y_m\}$.

Optionally, step 420 may include: determining the first sequence in the sequence group based on the index of the sequence group and a mapping manner.

Therefore, in this optional implementation, same sequence group numbers may be corresponding to different first sequences, and these different first sequences are corresponding to different mapping manners. Therefore, when determining the first sequence, the access network device and the terminal device may determine the first sequence based on the sequence group number and the mapping manner.

The mapping manner may refer to a center-frequency spacing of any two adjacent subcarriers that is used to map a to-be-sent signal. In this embodiment of the present invention, the mapping manner is also referred to as a comb structure.

Different mapping manners are used to distinguish between different grouping manners. This can ensure that there is relatively high cross-correlation between sequences in a same group in a mapping manner of continuous mapping or equally-spaced mapping, thereby reducing interference between neighboring cells.

Further, the mapping manner in this embodiment of the present invention may be one time a subcarrier spacing. This is also referred to as continuous mapping or a 1-comb structure. Alternatively, the mapping manner in this embodiment of the present invention may be two times a subcarrier spacing. This is also referred to as a 2-comb structure.

Optionally, the comb structure may include a 1-comb structure, a 2-comb structure, a 4-comb structure, and the like. This may be understood as follows: Subcarriers required for mapping are sorted in ascending or descending order, and for a given subcarrier spacing (for example, a subcarrier spacing of 15 kHz or a subcarrier spacing of a 30 kHz), a center-frequency difference of any two adjacent subcarriers is one time the subcarrier spacing, that is, the subcarriers are equally-spaced and have a spacing of one time the subcarrier spacing, which is a 1-comb structure; a center-frequency difference of any two adjacent subcarriers is two times the subcarrier spacing, that is, the subcarriers are equally-spaced and have a spacing of two times the subcarrier spacing, which is a 2-comb structure; a center-frequency difference of any two adjacent subcarriers is four times the subcarrier spacing, that is, the subcarriers are equally-spaced and have a spacing of four times the subcarrier spacing, which is a 4-comb structure.

Optionally, in an implementation, the terminal device and the access network device determine sequences with a length N from 30 sequence groups based on a sequence length N that needs to be used, further determine 30 sequences from the sequences with a length N according to a comb structure of a to-be-sent signal, and then determine one sequence from the 30 sequences based on the index of the sequence group.

Optionally, in another implementation, the terminal device and the access network device directly determine one sequence through table lookup based on a sequence length N that needs to be used, the index of the sequence group, and a comb structure of a to-be-sent signal.

This step may be performed by both the access network device and the terminal device. Specifically, the action in this step may be implemented by the modem processor 304 of the terminal device 104, and may be implemented by the processor 201 of the access network device 102.

Step 430: Generate a second sequence based on the first sequence or an identity of the first sequence.

When step 420 is determining the identity of the first sequence in the sequence group based on the index of the sequence group, step 430 may be generating the second sequence based on the identity of the first sequence, or step 430 may include determining the first sequence based on the identity of the first sequence and generating the second sequence based on the first sequence.

Therefore, in this embodiment of the present invention, the second sequence may be directly generated based on the identity of the first sequence. In this embodiment, the first sequence may also be first generated based on the identity of the first sequence, and then the second sequence is generated based on the first sequence.

When step 420 is determining the element in the first sequence in the sequence group based on the index of the sequence group, step 430 may be generating the second sequence based on the first sequence.

This step may be performed by both the access network device and the terminal device. Specifically, the action in this step may be implemented by the modem processor 304 of the terminal device 104, and may be implemented by the processor 201 of the access network device 102.

Step 440: The terminal device maps the second sequence to subcarriers.

In this step, a mapping manner used by the terminal device to map the second sequence to subcarriers is the same as the mapping manner described above.

The second sequence is the sequence $\{f_n\}$, the sequence $\{f_n\}$ is mapped to N subcarriers, and a center-frequency spacing of any two adjacent subcarriers in the N subcarriers is 2t times a subcarrier spacing or t times a subcarrier spacing; or, the second sequence is the sequence $\{g_m\}$, the sequence $\{g_m\}$ is mapped to M subcarriers, and a center-frequency spacing of any two adjacent subcarriers in the M subcarriers is t times a subcarrier spacing.

Alternatively, the second sequence is the sequence $\{f_n\}$, the sequence $\{f_n\}$ is mapped to N subcarriers, and a center-frequency spacing of any two adjacent subcarriers in the N subcarriers is 2t times a subcarrier spacing or t times a subcarrier spacing; or, the second sequence is the sequence {$g_m$}, the sequence {$g_m$} is mapped to M subcarriers, and the M subcarriers are consecutive subcarriers.

t is a positive integer.

When N=12 and M=36, the sequence {$f_n$} is mapped to 12 subcarriers, and a center-frequency spacing of any two adjacent subcarriers in the 12 subcarriers is 2t times a subcarrier spacing or t times a subcarrier spacing; or, the second sequence is the sequence {$g_m$}, the sequence {$g_m$} is mapped to 36 subcarriers, and a center-frequency spacing of any two adjacent subcarriers in the 36 subcarriers is t times a subcarrier spacing.

Alternatively, the second sequence is the sequence {$f_n$}, the sequence {$f_n$} is mapped to 12 subcarriers, and a center-frequency spacing of any two adjacent subcarriers in the 12 subcarriers is 2t times a subcarrier spacing or t times a subcarrier spacing; or, the second sequence is the sequence {$g_m$}, the sequence {$g_m$} is mapped to 36 subcarriers, and the 36 subcarriers are consecutive subcarriers.

t is a positive integer.

Step 440 may include the following: The terminal device maps a sequence {$f_n$} with a length N to N subcarriers to generate an N-point frequency-domain signal.

Optionally, in an implementation, the terminal device determines a length-12 sequence {$x_n$}, and generates a sequence {$f_n$} based on {$x_n$} after determining a cyclic shift c corresponding to the sequence {$x_n$} based on an implicit association manner configured by a network device or a predefined implicit association manner. A generation formula is as follows: $f_n = A \cdot x_n \cdot e^{j \cdot \alpha \cdot n}$. $e^{j \cdot \alpha \cdot n}$ means performing cyclic shifting on the sequence {$x_n$}, and $$\alpha = \frac{2 \cdot \pi \cdot c}{12}, c = 0, 1, \ldots, 11.$$

Figure 5:
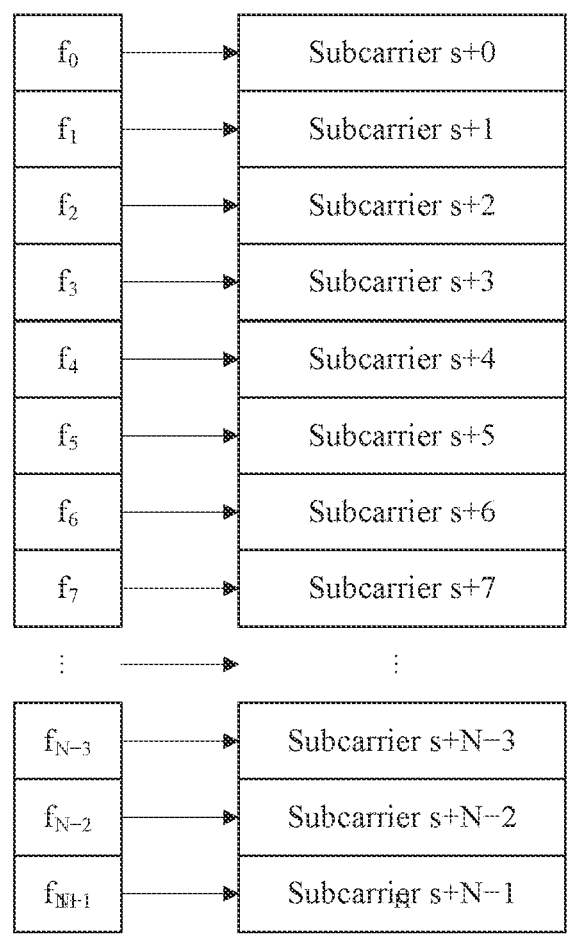
FIG. 5 is a schematic diagram of a frequency-domain subcarrier mapping manner according to an embodiment of the present invention.
Figure 6:
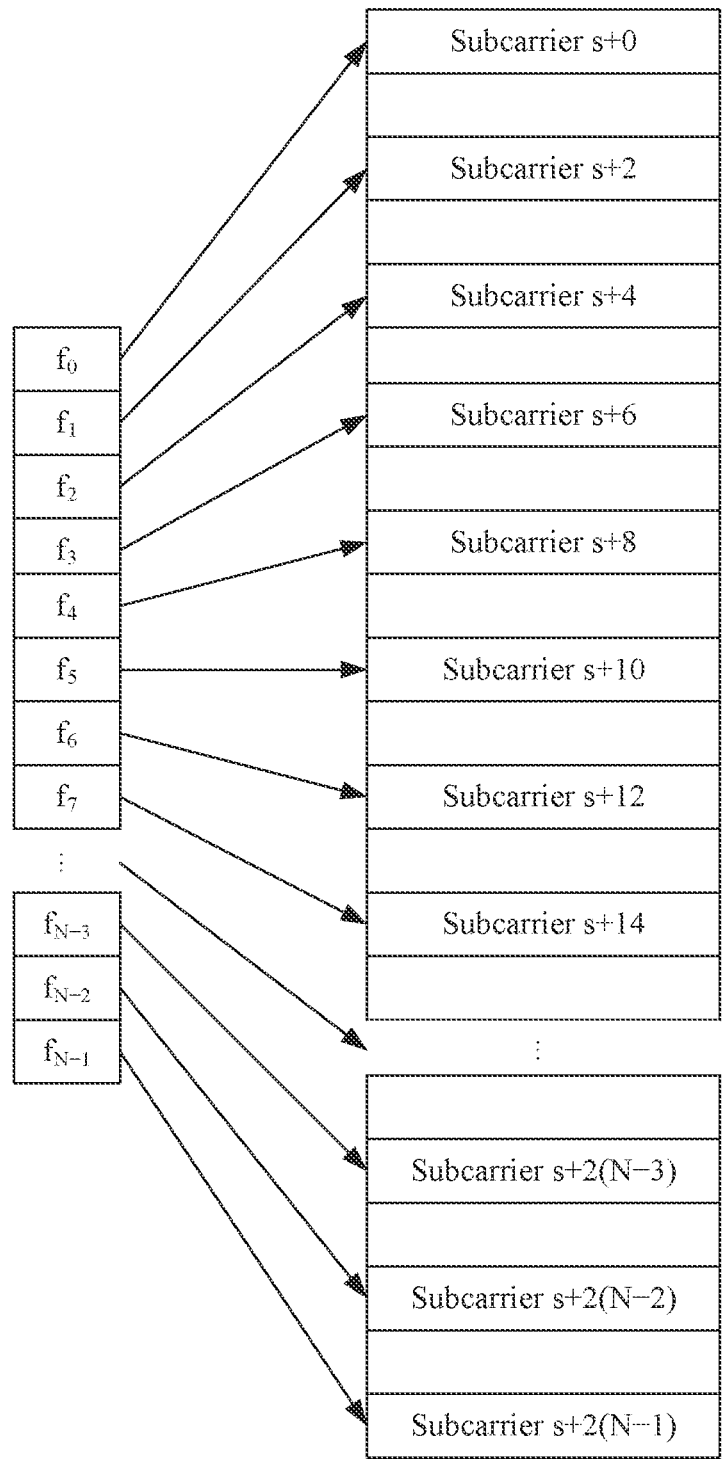
FIG. 6 is a schematic diagram of a frequency-domain subcarrier mapping manner according to another embodiment of the present invention.

Optionally, N or M elements in the second sequence may be respectively mapped to equally-spaced N or M subcarriers. Subcarriers required for mapping are sorted in ascending or descending order, and for a given subcarrier spacing (for example, a subcarrier spacing of 15 kHz or a subcarrier spacing of a 30 kHz), a center-frequency difference of any two adjacent subcarriers is t times the subcarrier spacing. When t=1, it may be understood that a signal is mapped to consecutive frequency-domain subcarriers, as shown in FIG. 5. Optionally, when t=2, it may be understood that a signal is mapped to inconsecutive frequency-domain subcarriers, and an index difference of occupied frequency-domain subcarriers is 2, as shown in FIG. 6.

It should be noted that, in this embodiment of the present invention, the mapping manner for the second sequence is not limited to the foregoing manners.

The action in this step may be implemented by the modem processor 304 in the terminal device 104 described above.

Step 450: The terminal device sends a signal generated based on the second sequence.

This step may include the following: The terminal device transforms an N- or M-point frequency-domain signal into a time-domain signal by using inverse fast Fourier transform (IFFT), and adds a cyclic prefix to the time-domain signal, so as to generate a first signal, and the terminal device sends the first signal by using radio frequency.

The action in this step may be implemented by the transceiver 301 in the terminal device 104 described above. Certainly, the action in this step may be implemented by the modem processor 304 and the transceiver 301 in the terminal device 104 described above.

Step 460: The access network device processes a received first signal based on the second sequence.

Specifically, this step may include the following:

The access network device receives the first signal carried on N subcarriers and obtains N elements in the sequence {$f_n$}; or, the access network device receives the first signal carried on M subcarriers and obtains M elements in the sequence {$g_m$}.

Optionally, a process in which the access network device receives the first signal carried on the N subcarriers is that the access network device obtains a time-domain signal and removes a cyclic prefix. Then, the access network device performs K-point fast Fourier transform (FFT) on the signal from which the cyclic prefix is removed, so as to obtain an N-point frequency-domain signal, where K is greater than or equal to N. Then, the access network device receives the first signal carried on the N subcarriers, where the first signal is a sequence that includes N elements. For example, the receiving device receives the signal on the N subcarriers according to locations that are predefined or configured by a base station and that are of the N subcarriers in subcarriers in a communication system.

Further, the access network device processes the first signal according to the N elements in the sequence {$f_n$}.

Optionally, the access network device determines channel state information based on a relationship between the sequence {$f_n$} and the first signal, or the network device determines information about a modulated symbol or the like carried on the sequence based on a relationship between the sequence {$f_n$} and the first signal.

The case of the sequence {$g_m$} is similar to that of the sequence {$f_n$}, and details are not described again in the specification.

The action in this step may be implemented by the transceiver 202 in the access network device 102 described above. Certainly, the action in this step may be implemented by the processor 201 and the transceiver 202 in the access network device 102 described above.

It should be noted that, in this embodiment of the present invention, there is no sequence between steps 410 to 430 performed by the access network device and steps that are performed by the terminal device and that are corresponding to the terminal device in the method. Steps 410 to 430 may be performed before the terminal device sends the first signal, or may be performed after the terminal device sends the first signal. This is not limited in this embodiment of the present invention, provided that steps 410 to 430 are performed before the access network device uses the second sequence to process the first signal.

An embodiment of the present invention further provides an apparatus (for example, an integrated circuit, a wireless device, or a circuit module) configured to implement the foregoing method. The apparatus implementing the method described in this specification may be an independent device, or may be a part of a relatively large device. The device may be (i) an independent IC; (ii) a set that has one or more ICs and that can include a memory IC configured to store data and/or an instruction; (iii) an RFIC, for example, an RF receiver or an RF transmitter; (iv) an ASIC, for example, a mobile station modem; (v) a module that can be built into another device; (vi) a receiver, a cellular phone, a wireless device, a handheld machine, or a mobile unit; or (vii) the like.

The method and apparatus that are provided in the embodiments of the present invention may be applied to the terminal device or the access network device (both the terminal device and the access network device may be referred to as a wireless device). The terminal device, the access network device, or the wireless device may include a hardware layer, an operating system layer that is running on the hardware layer, and an application layer that is running on the operating system layer. The hardware layer includes hardware such as a central processing unit (CPU), a memory management unit (MMU), and a memory (also referred to as a main memory). Operating systems may be any one or more computer operating systems that process a service by using a process, for example, a Linux operating system, a Unix operating system, an Android operating system, an iOS operating system, or a Windows operating system. The application layer includes applications such as a browser, an address book, word processing software, and instant messaging software. In addition, a specific structure of an entity for performing the method is not limited in the embodiments of the present invention, provided that the entity can perform communication according to the wireless communication method in the embodiments of the present invention by running a program of code recording the method in the embodiments of the present invention. For example, the wireless communication method in the embodiments of the present invention may be performed by the terminal device, the access network device, or a function module that is in the terminal device or the access network device and that can invoke a program and execute the program.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

In addition, aspects or features in the embodiments of the present invention may be implemented as a method, an apparatus or a product that uses standard programming and/or engineering technologies. The term "product" used in this application covers computer programs that can be accessed from any computer readable component, carrier or medium. For example, the computer-readable medium may include but is not limited to: magnetic storage components (for example, a hard disk, a floppy disk, or a magnetic tape), optical discs (for example, compact discs (CD), digital versatile discs (DVD), smart cards and flash memory components (for example, erasable programmable read-only memory (EPROM), cards, sticks, or key drives). In addition, various storage media described in this specification may indicate one or more devices and/or other machine-readable media that is used to store information. The term "machine readable medium" may include but is not limited to radio channels, and various other media that can store, contain and/or carry instructions and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be general-purpose computers, dedicated computers, computer networks, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a Solid State Disk (SSD)), or the like.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The software product is stored in a storage medium, and includes several instructions for instructing a computer device (which may be a personal computer, a server, an access network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention.

What is claimed is:

1. A method, comprising:
determining an index v of a sequence group, wherein the sequence group comprises a sequence $\{x_n\}$ and a sequence $\{y_m\}$;
generating a second sequence based on the index v of the sequence group, wherein the second sequence is at least one of a second sequence $\{f_n\}$ or a second sequence $\{g_m\}$; and
transmitting uplink control information or a reference signal based on the second sequence, wherein:
the sequence $\{x_n\}$ corresponds to a second sequence $\{f_n\}$, and the sequence $\{y_m\}$ corresponds to a second sequence $\{g_m\}$, wherein $f_n$ is an element in the sequence $\{f_n\}$, $g_m$ is an element in the sequence $\{g_m\}$, a length of the second sequence $\{f_n\}$ is N, a length of the second sequence $\{g_m\}$ is M, n and m are integers, $0 \le n \le N-1$, and $0 \le m \le M-1$;
the element $f_n$ satisfies $f_n = A \cdot x_n \cdot e^{j \cdot \alpha \cdot n}$;
the element $g_m$ satisfies $g_m = A \cdot y_m \cdot e^{j \cdot \alpha \cdot m}$;
A is a non-zero complex number, $\alpha$ is a real number, and $j = \sqrt{-1}$;
an element $x_n$ in the sequence $\{x_n\}$ satisfies $x_n = u \cdot e^{\pi \cdot j \cdot s_n/4}$, u is a non-zero complex number, and $s_n$ is an element in a sequence $\{s_n\}$;
an element $y_m$ in the sequence $\{y_m\}$ satisfies $$y_m = k_q(m \bmod M_{prime}), k_q(i) = e^{-j \frac{\pi \cdot q \cdot i \cdot (i+1)}{M_{prime}}},$$

i is an integer, $0 \le i \le M_{prime}-1$, $M_{prime}$ is a largest prime number smaller than M; and
when N=18 and M=36, a combination of the sequence $\{s_n\}$ and q is one of following combinations, wherein the following combinations belong to a combination set, and the following combinations comprise:
the sequence $\{s_n\}$ is $\{-1, 3, -1, -3, 3, 1, -3, -1, 3, -3, -1, -1, 1, 1, 1, -1, -1, -1\}$, and q=1;
the sequence $\{s_n\}$ is $\{3, -3, 3, -1, 1, 3, -3, -1, -3, -3, -1, -3, 3, 1, -1, 3, -3, 3\}$, and q=2;
the sequence $\{s_n\}$ is $\{-3, 3, 1, -1, -1, 3, -3, -1, 1, 1, 1, 1, 1, -1, 3, -1, -3, -1\}$, and q=3;
the sequence $\{s_n\}$ is $\{1, 1, -1, -1, -3, -1, 1, -3, -3, -3, 1, -3, -1, -1, 1, -1, 3, 1\}$, and q=5;
the sequence $\{s_n\}$ is $\{-3, 3, -1, 1, 3, 1, -3, -1, 1, 1, -3, 1, 3, 3, -1, -3, -3, -3\}$, and q=7;
the sequence $\{s_n\}$ is $\{3, -1, 3, 1, -3, -3, -1, 1, -3, -3, 3, 3, 3, 1, 3, -3, 3, -3\}$, and q=10;
the sequence $\{s_n\}$ is $\{-3, -3, -3, 1, -3, 3, 1, 1, 3, -3, -3, 1, 3, -1, 3, -3, -3, 3\}$, and q=11;
the sequence $\{s_n\}$ is $\{-3, -3, 3, 3, 3, -1, -1, -3, -1, -1, 3, 1, -3, -3, -1, 3, -1\}$, and q=12;
the sequence $\{s_n\}$ is $\{-3, -1, -3, -3, 1, 1, -1, -3, -1, -3, -1, -1, 3, 3, -1, 3, 1, 3\}$, and q=13;
the sequence $\{s_n\}$ is $\{-3, 3, -1, -3, -1, -3, 1, 1, -3, -3, -1, -1, 3, -3, 1, 3, 1, 1\}$, and q=15;
the sequence $\{s_n\}$ is $\{-3, 1, -3, -1, -1, 3, 1, -3, -3, -3, -1, -3, -3, 1, 1, 1, -1, -1\}$, and q=19;
the sequence $\{s_n\}$ is $\{3, 3, 3, -3, -1, -3, -1, 3, -1, 1, -1, -3, 1, -3, -3, -1, 3, 3\}$, and q=20; and
the sequence $\{s_n\}$ is $\{-3, 3, 1, -1, -1, -1, -1, 1, -1, 3, 3, -3, -1, 1, 3, -1, 3, -1\}$, and q=30.

2. The method of claim 1, wherein the following combinations further comprises:
the sequence $\{s_n\}$ is $\{3, -3, 1, 1, 3, -1, 1, -1, -1, -3, 1, 1, -1, 3, 3, -3, 3, -1\}$, and q=6;
the sequence $\{s_n\}$ is $\{-3, 1, -3, -3, 1, -3, -3, 3, 1, -3, -1, -3, -3, -3, -1, 1, 1, 3\}$, and q=9;
the sequence $\{s_n\}$ is $\{1, 1, -3, -3, -3, -3, 1, 3, -3, 3, 3, 1, -3, -1, 3, -1, -3, 1\}$, and q=14;
the sequence $\{s_n\}$ is $\{-3, -1, 3, 3, -1, 3, -1, -3, -1, 1, -1, -3, -1, -1, -1, 3, 3, 1\}$, and q=18;
the sequence $\{s_n\}$ is $\{-3, 1, 1, -3, 1, 1, 3, -3, -1, -3, -1, 3, -3, 3, -1, -1, -1, -3\}$, and q=21;
the sequence $\{s_n\}$ is $\{3, -1, -1, 1, -3, -1, -3, -1, -3, -3, -1, -3, 1, 1, 1, -3, -3, 3\}$, and q=25;
the sequence $\{s_n\}$ is $\{-3, -1, -1, -3, 1, -3, 3, -1, -1, -3, 3, 3, -3, -1, 3, -1, -1, -1\}$, and q=27;
the sequence $\{s_n\}$ is $\{-3, -3, 3, 3, -3, 1, 3, -1, -3, 1, -1, -3, 3, -3, -1, -1, -1, 3\}$, and q=28; or
the sequence $\{s_n\}$ is $\{-1, -3, 1, -3, -3, -3, 1, 1, 3, 3, -3, 3, 3, -3, -1, 3, -3, 1\}$, and q=29.

3. The method of claim 1, wherein q=v+1.

4. The method of claim 1, wherein $$q = \left\lfloor M_{prime} \cdot \frac{v+1}{31} + 1/2 \right\rfloor, M_{prime} = 31.$$

5. The method of claim 1, wherein the determining a second sequence based on the index v of the sequence group, comprises:
determining the sequence $\{s_n\}$ based on the index v, wherein the sequence $\{s_n\}$ defines the sequence $\{x_n\}$ in the sequence group; and
generating the second sequence $\{f_n\}$ based on the sequence $\{s_n\}$.

6. The method of claim 1, wherein
the second sequence is the sequence $\{f_n\}$, the sequence $\{f_n\}$ is mapped N subcarriers, and a center-frequency spacing of any two adjacent subcarriers in the N subcarriers is 2t times a subcarrier spacing; or the second sequence is the sequence $\{g_m\}$, the sequence $\{g_m\}$ is mapped to M subcarriers, and the M subcarriers are consecutive subcarriers, wherein t is a positive integer; or
the second sequence is the sequence $\{f_n\}$, the sequence $\{f_n\}$ is mapped N subcarriers, and a center-frequency spacing of any two adjacent subcarriers in the N subcarriers is 2t times a subcarrier spacing; or the second sequence is the sequence $\{g_m\}$, the sequence $\{g_m\}$ is mapped to M subcarriers, and a center-frequency spacing of any two adjacent subcarriers in the M subcarriers is t times a subcarrier spacing, wherein t is a positive integer.

7. The method of claim 1, wherein A is 1, a constant, or a modulated symbol, or a value determined based on a power control parameter.

8. An apparatus, comprising:
a non-transitory storage medium including executable instructions; and
at least one processor;
wherein the executable instructions, when executed by the at least one processor, cause the apparatus to:
determine an index v of a sequence group, wherein the sequence group comprises a sequence $\{x_n\}$ and a sequence $\{y_m\}$;
generate a second sequence based on the index v of the sequence group, wherein the second sequence is at least one of a second sequence $\{f_n\}$ or a second sequence $\{g_m\}$; and
transmit uplink control information or a reference signal based on the second sequence, wherein:
the sequence $\{x_n\}$ corresponds to a second sequence $\{f_n\}$, and the sequence $\{y_m\}$ corresponds to a second sequence $\{g_m\}$, wherein $f_n$ is an element in the sequence $\{f_n\}$, $g_m$ is an element in the sequence $\{g_m\}$, a length of the second sequence $\{f_n\}$ is N, a length of the second sequence $\{g_m\}$ is M, n and m are integers, $0 \leq n \leq N-1$, and $0 \leq m \leq M-1$;
the element $f_n$ satisfies $f_n = A \cdot x_n \cdot e^{j \cdot \alpha \cdot n}$;
the element $g_m$ satisfies $g_m = A \cdot y_m \cdot e^{j \cdot \alpha \cdot m}$;
A is a non-zero complex number, $\alpha$ is a real number, and $j=\sqrt{-1}$;
an element $x_n$ in the sequence $\{x_n\}$ satisfies $x_n = u \cdot e^{\pi \cdot j \cdot s_n / 4}$, u is a non-zero complex number, and $s_n$ is an element in a sequence $\{s_n\}$;
an element $y_m$ in the sequence $\{y_m\}$ satisfies $$y_m = k_q(m \bmod M_{prime}), k_q(i) = e^{-j \cdot \frac{\pi \cdot q \cdot i \cdot (i+1)}{M_{prime}}},$$

i is an integer, $0 \leq i \leq M_{prime}-1$, $M_{prime}$ is a largest prime number smaller than M; and
when N=18 and M=36, a combination of the sequence $\{s_n\}$ and q is one of following combinations, wherein the following combinations belong to a combination set, and the following combinations comprise:
the sequence $\{s_n\}$ is $\{-1, 3, -1, -3, 3, 1, -3, -1, 3, -3, -1, -1, 1, 1, 1, -1, -1, -1\}$, and q=1;
the sequence $\{s_n\}$ is $\{3, -3, 3, -1, 1, 3, -3, -1, -3, -3, -1, -3, 3, 1, -1, 3, -3, 3\}$, and q=2;
the sequence $\{s_n\}$ is $\{-3, 3, 1, -1, -1, 3, -3, -1, 1, 1, 1, 1, 1, -1, 3, -1, -3, -1\}$, and q=3;
the sequence $\{s_n\}$ is $\{1, 1, -1, -1, -3, -1, 1, -3, -3, -3, 1, -3, -1, -1, 1, -1, 3, 1\}$, and q=5;
the sequence $\{s_n\}$ is $\{-3, 3, -1, 1, 3, 1, -3, -1, 1, 1, -3, 1, 3, 3, -1, -3, -3, -3\}$, and q=7;
the sequence $\{s_n\}$ is $\{3, -1, 3, 1, -3, -3, -1, 1, -3, -3, 3, 3, 3, 1, 3, -3, 3, -3\}$, and q=10;
the sequence $\{s_n\}$ is $\{-3, -3, -3, 1, -3, 3, 1, 1, 3, -3, -3, 1, 3, -1, 3, -3, -3, 3\}$, and q=11;
the sequence $\{s_n\}$ is $\{-3, -3, 3, 3, 3, -1, -1, -3, -1, -1, -1, 3, 1, -3, -3, -1, 3, -1\}$, and q=12;
the sequence $\{s_n\}$ is $\{-3, -1, -3, -3, 1, 1, -1, -3, -1, -3, -1, -1, 3, 3, -1, 3, 1, 3\}$, and q=13;
the sequence $\{s_n\}$ is $\{-3, 3, -1, -3, -1, -3, 1, 1, -3, -3, -1, -1, 3, -3, 1, 3, 1, 1\}$, and q=15;
the sequence $\{s_n\}$ is $\{-3, 1, -3, -1, -1, 3, 1, -3, -3, -3, -1, -3, -3, 1, 1, 1, -1, -1\}$, and q=19;
the sequence $\{s_n\}$ is $\{3, 3, 3, -3, -1, -3, -1, 3, -1, 1, -1, -3, 1, -3, -3, -1, 3, 3\}$, and q=20; and
the sequence $\{s_n\}$ is $\{-3, 3, 1, -1, -1, -1, -1, 1, -1, 3, 3, -3, -1, 1, 3, -1, 3, -1\}$, and q=30.

9. The apparatus of claim 8, wherein the following combinations further comprises:
the sequence $\{s_n\}$ is $\{3, -3, 1, 1, 3, -1, 1, -1, -1, -3, 1, 1, -1, 3, 3, -3, 3, -1\}$, and q=6;
the sequence $\{s_n\}$ is $\{-3, 1, -3, -3, 1, -3, -3, 3, 1, -3, -1, -3, -3, -3, -1, 1, 1, 3\}$, and q=9;
the sequence $\{s_n\}$ is $\{1, 1, -3, -3, -3, -3, 1, 3, -3, 3, 3, 1, -3, -1, 3, -1, -3, 1\}$, and q=14;
the sequence $\{s_n\}$ is $\{-3, -1, 3, 3, -1, 3, -1, -3, -1, 1, -1, -3, -1, -1, -1, 3, 3, 1\}$, and q=18;
the sequence $\{s_n\}$ is $\{-3, 1, 1, -3, 1, 1, 3, -3, -1, -3, -1, 3, -3, 3, -1, -1, -1, -3\}$, and q=21;
the sequence $\{s_n\}$ is $\{3, -1, -1, 1, -3, -1, -3, -1, -3, -3, -1, -3, 1, 1, 1, -3, -3, 3\}$, and q=25;
the sequence $\{s_n\}$ is $\{-3, -1, -1, -3, 1, -3, 3, -1, -1, -3, 3, 3, -3, -1, 3, -1, -1, -1\}$, and q=27;
the sequence $\{s_n\}$ is $\{-3, -3, 3, 3, -3, 1, 3, -1, -3, 1, -1, -3, 3, -3, -1, -1, -1, 3\}$, and q=28; or
the sequence $\{s_n\}$ is $\{-1, -3, 1, -3, -3, -3, 1, 1, 3, 3, -3, 3, 3, -3, -1, 3, -3, 1\}$, and q=29.

10. The apparatus of claim 8, wherein q=v+1.

11. The apparatus of claim 8, wherein $$q = \left\lfloor M_{prime} \cdot \frac{v+1}{31} + 1/2 \right\rfloor, M_{prime} = 31.$$

12. The apparatus of claim 8, wherein the determining a second sequence based on the index v of the sequence group, comprises:
determining the sequence $\{s_n\}$ based on the index v, wherein the sequence $\{s_n\}$ defines the sequence $\{x_n\}$ in the sequence group; and
generating the second sequence $\{f_n\}$ based on the sequence $\{s_n\}$.

13. The apparatus of claim 8, wherein
the second sequence is the sequence $\{f_n\}$, the sequence $\{f_n\}$ is mapped N subcarriers, and a center-frequency spacing of any two adjacent subcarriers in the N subcarriers is 2t times a subcarrier spacing; or the second sequence is the sequence $\{g_m\}$, the sequence $\{g_m\}$ is mapped to M subcarriers, and the M subcarriers are consecutive subcarriers, wherein t is a positive integer; or
the second sequence is the sequence $\{f_n\}$, the sequence $\{f_n\}$ is mapped N subcarriers, and a center-frequency spacing of any two adjacent subcarriers in the N subcarriers is 2t times a subcarrier spacing; or the second sequence is the sequence $\{g_m\}$, the sequence $\{g_m\}$ is mapped to M subcarriers, and a center-frequency spacing of any two adjacent subcarriers in the M subcarriers is t times a subcarrier spacing, wherein t is a positive integer.

14. The apparatus of claim 8, wherein A is 1, a constant, or a modulated symbol, or a value determined based on a power control parameter.

15. A non-transitory computer-readable storage medium comprising instructions which, when executed by a computer, cause the computer to carry out the following:
determining an index v of a sequence group, wherein the sequence group comprises a sequence $\{x_n\}$ and a sequence $\{y_m\}$;

generating a second sequence based on the index v of the sequence group, wherein the second sequence is at least one of a second sequence $\{f_n\}$ or a second sequence $\{g_m\}$; and transmitting uplink control information or a reference signal based on the second sequence, wherein:

the sequence $\{x_n\}$ corresponds to a second sequence $\{f_n\}$, and the sequence $\{y_m\}$ corresponds to a second sequence $\{g_m\}$, wherein $f_n$ is an element in the sequence $\{f_n\}$, $g_m$ is an element in the sequence $\{g_m\}$, a length of the second sequence $\{f_n\}$ is N, a length of the second sequence $\{g_m\}$ is M, n and m are integers, $0 \leq n \leq N-1$, and $0 \leq m \leq M-1$;

the element $f_n$ satisfies $f_n = A \cdot x_n \cdot e^{j \cdot \alpha \cdot n}$;

the element $g_m$ satisfies $g_m = A \cdot y_m \cdot e^{j \cdot \alpha \cdot m}$;

A is a non-zero complex number, $\alpha$ is a real number, and $j = \sqrt{-1}$;

an element $x_n$ in the sequence $\{x_n\}$ satisfies $x_n = u \cdot e^{\pi \cdot j \cdot s_n / 4}$, u is a non-zero complex number, and $s_n$ is an element in a sequence $\{s_n\}$;

an element $y_m$ in the sequence $\{y_m\}$ satisfies $$y_m = k_q(m \bmod M_{prime}), k_q(i) = e^{-j \cdot \frac{\pi \cdot q \cdot i \cdot (i+1)}{M_{prime}}},$$

i is an integer, $0 \leq i \leq M_{prime}-1$, $M_{prime}$ is a largest prime number smaller than M; and when N=18 and M=36, a combination of the sequence $\{s_n\}$ and q is one of following combinations, wherein the following combinations belong to a combination set, and the following combinations comprise:

the sequence $\{s_n\}$ is $\{-1, 3, -1, -3, 3, 1, -3, -1, 3, -3, -1, -1, 1, 1, 1, -1, -1, -1\}$, and q=1;

the sequence $\{s_n\}$ is $\{3, -3, 3, -1, 1, 3, -3, -1, -3, -3, -1, -3, 3, 1, -1, 3, -3, 3\}$, and q=2;

the sequence $\{s_n\}$ is $\{-3, 3, 1, -1, -1, 3, -3, -1, 1, 1, 1, 1, 1, -1, 3, -1, -3, -1\}$, and q=3;

the sequence $\{s_n\}$ is $\{1, 1, -1, -1, -3, -1, 1, -3, -3, -3, 1, -3, -1, -1, 1, -1, 3, 1\}$, and q=5;

the sequence $\{s_n\}$ is $\{-3, 3, -1, 1, 3, 1, -3, -1, 1, 1, -3, 1, 3, 3, -1, -3, -3, -3\}$, and q=7;

the sequence $\{s_n\}$ is $\{3, -1, 3, 1, -3, -3, -1, 1, -3, -3, 3, 3, 3, 1, 3, -3, 3, -3\}$, and q=10;

the sequence $\{s_n\}$ is $\{-3, -3, -3, 1, -3, 3, 1, 1, 3, -3, -3, 1, 3, -1, 3, -3, -3, 3\}$, and q=11;

the sequence $\{s_n\}$ is $\{-3, -3, 3, 3, 3, -1, -1, -3, -1, -1, -1, 3, 1, -3, -3, -1, 3, -1\}$, and q=12;

the sequence $\{s_n\}$ is $\{-3, -1, -3, -3, 1, 1, -1, -3, -1, -3, -1, -1, 3, 3, -1, 3, 1, 3\}$, and q=13;

the sequence $\{s_n\}$ is $\{-3, 3, -1, -3, -1, -3, 1, 1, -3, -3, -1, -1, 3, -3, 1, 3, 1, 1\}$, and q=15;

the sequence $\{s_n\}$ is $\{-3, 1, -3, -1, -1, 3, 1, -3, -3, -3, -1, -3, -3, 1, 1, 1, -1, -1\}$, and q=19;

the sequence $\{s_n\}$ is $\{3, 3, 3, -3, -1, -3, -1, 3, -1, 1, -1, -3, 1, -3, -3, -1, 3, 3\}$, and q=20; and the sequence $\{s_n\}$ is $\{-3, 3, 1, -1, -1, -1, -1, 1, -1, 3, 3, -3, -1, 1, 3, -1, 3, -1\}$, and q=30.

16. The non-transitory computer-readable storage medium of claim 15, wherein the following combinations further comprises:

the sequence $\{s_n\}$ is $\{3, -3, 1, 1, 3, -1, 1, -1, -1, -3, 1, 1, -1, 3, 3, -3, 3, -1\}$, and q=6;

the sequence $\{s_n\}$ is $\{-3, 1, -3, -3, 1, -3, -3, 3, 1, -3, -1, -3, -3, -3, -1, 1, 1, 3\}$, and q=9;

the sequence $\{s_n\}$ is $\{1, 1, -3, -3, -3, -3, 1, 3, -3, 3, 3, 1, -3, -1, 3, -1, -3, 1\}$, and q=14;

the sequence $\{s_n\}$ is $\{-3, -1, 3, 3, -1, 3, -1, -3, -1, 1, -1, -3, -1, -1, -1, 3, 3, 1\}$, and q=18;

the sequence $\{s_n\}$ is $\{-3, 1, 1, -3, 1, 1, 3, -3, -1, -3, -1, 3, -3, 3, -1, -1, -1, -3\}$, and q=21;

the sequence $\{s_n\}$ is $\{3, -1, -1, 1, -3, -1, -3, -1, -3, -3, -1, -3, 1, 1, 1, -3, -3, 3\}$, and q=25;

the sequence $\{s_n\}$ is $\{-3, -1, -1, -3, 1, -3, 3, -1, -1, -3, 3, 3, -3, -1, 3, -1, -1, -1\}$, and q=27;

the sequence $\{s_n\}$ is $\{-3, -3, 3, 3, -3, 1, 3, -1, -3, 1, -1, -3, 3, -3, -1, -1, -1, 3\}$, and q=28; or the sequence $\{s_n\}$ is $\{-1, -3, 1, -3, -3, -3, 1, 1, 3, 3, -3, 3, 3, -3, -1, 3, -3, 1\}$, and q=29.

17. The non-transitory computer-readable storage medium of claim 15, wherein q=v+1, or wherein $$q = \left\lfloor M_{prime} \cdot \frac{v+1}{31} + 1/2 \right\rfloor, M_{prime} = 31.$$

18. The non-transitory computer-readable storage medium of claim 15, wherein the determining a second sequence based on the index v of the sequence group, comprises:

determining the sequence $\{s_n\}$ based on the index v, wherein the sequence $\{s_n\}$ defines the sequence $\{x_n\}$ in the sequence group; and generating the second sequence $\{f_n\}$ based on the sequence $\{s_n\}$.

19. The non-transitory computer-readable storage medium of claim 15, wherein the second sequence is the sequence $\{f_n\}$, the sequence $\{f_n\}$ is mapped N subcarriers, and a center-frequency spacing of any two adjacent subcarriers in the N subcarriers is 2t times a subcarrier spacing; or the second sequence is the sequence $\{g_m\}$, the sequence $\{g_m\}$ is mapped to M subcarriers, and the M subcarriers are consecutive subcarriers, wherein t is a positive integer; or the second sequence is the sequence $\{f_n\}$, the sequence $\{f_n\}$ is mapped N subcarriers, and a center-frequency spacing of any two adjacent subcarriers in the N subcarriers is 2t times a subcarrier spacing; or the second sequence is the sequence $\{g_m\}$, the sequence $\{g_m\}$ is mapped to M subcarriers, and a center-frequency spacing of any two adjacent subcarriers in the M subcarriers is t times a subcarrier spacing, wherein t is a positive integer.

20. The non-transitory computer-readable storage medium of claim 15, wherein A is 1, a constant, or a modulated symbol, or a value determined based on a power control parameter.

* * * * *